May 25, 1965 W. F. GUNKEL ETAL 3,185,981
DOPPLER NAVIGATION SYSTEM
Filed Oct. 7, 1959 32 Sheets-Sheet 6

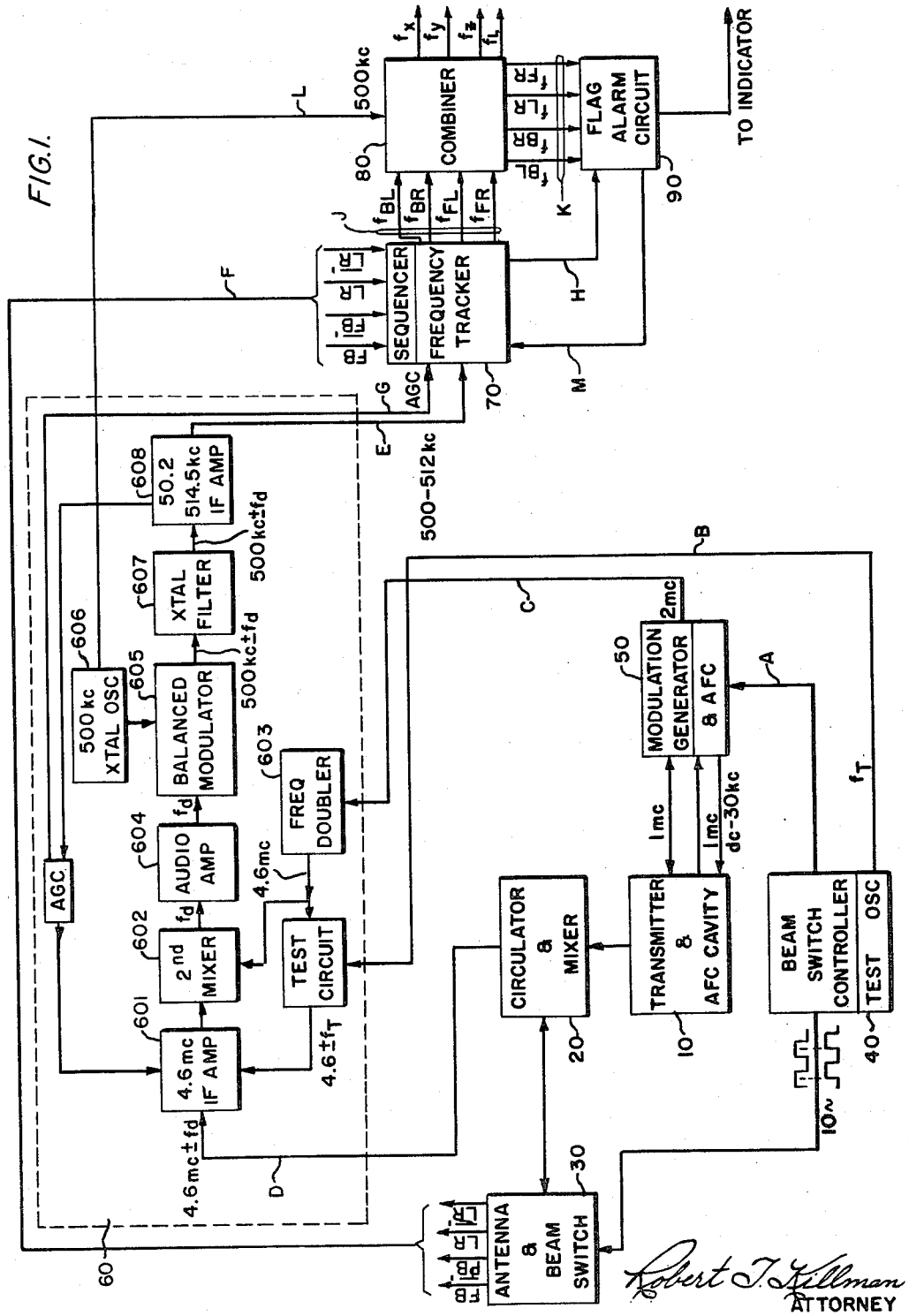

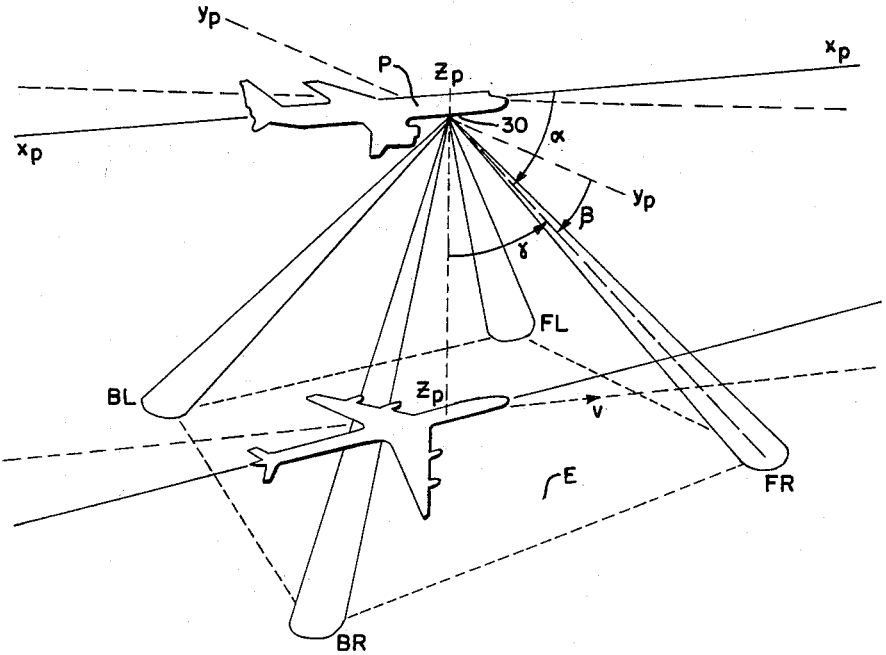
FIG.A.
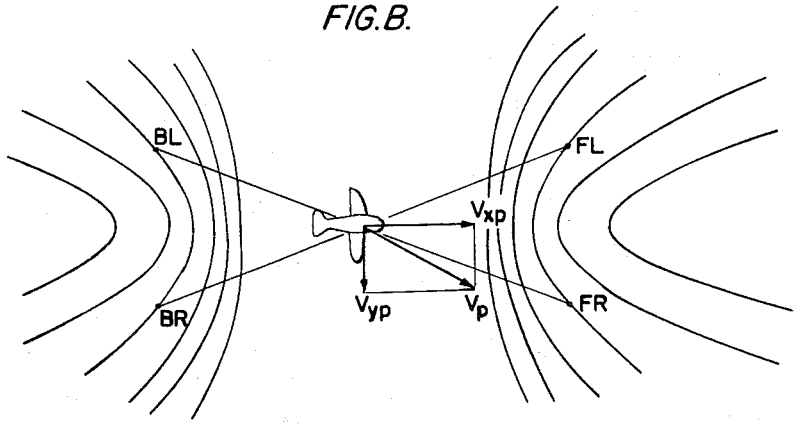
FIG.B.
| DRIFT | NO DRIFT |
|---|---|
| $f_{FL} = +4kc$ | $f_{FL} = +5kc$ |
| $f_{FR} = +6kc$ | $f_{FR} = +5kc$ |
| $f_{BR} = -4kc$ | $f_{BR} = -5kc$ |
| $f_{BL} = -6kc$ | $f_{BL} = -5kc$ |

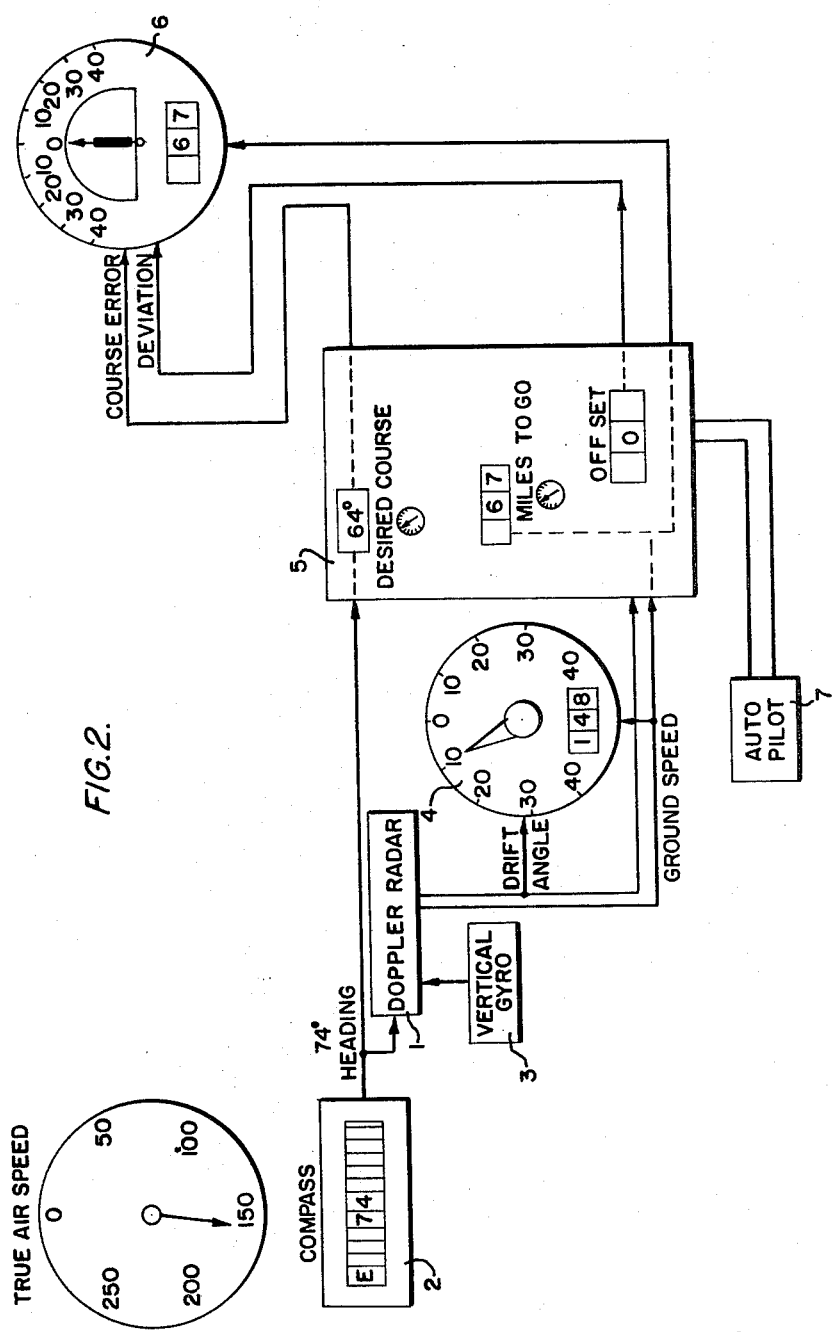

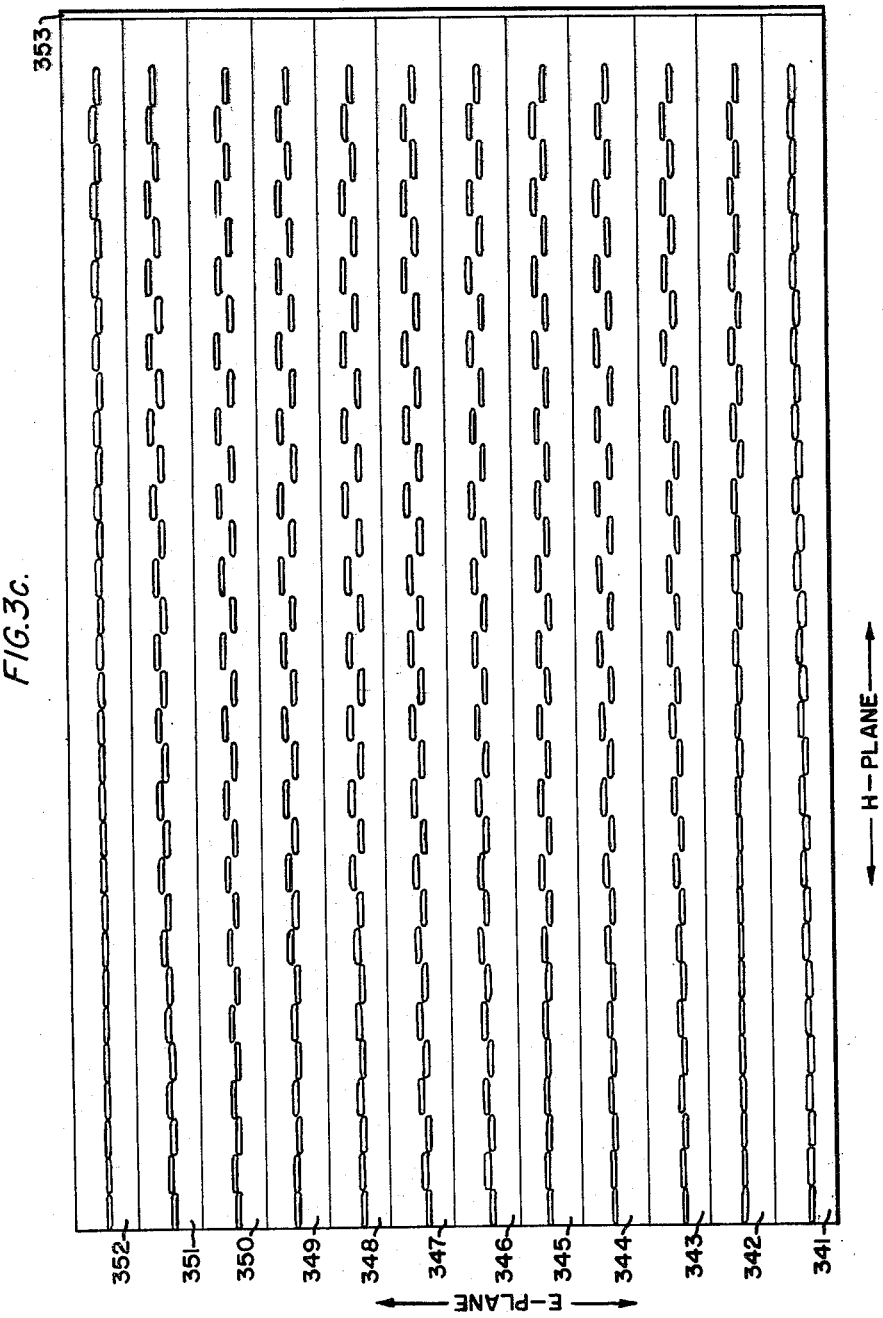

Robert J. Killman
ATTORNEY

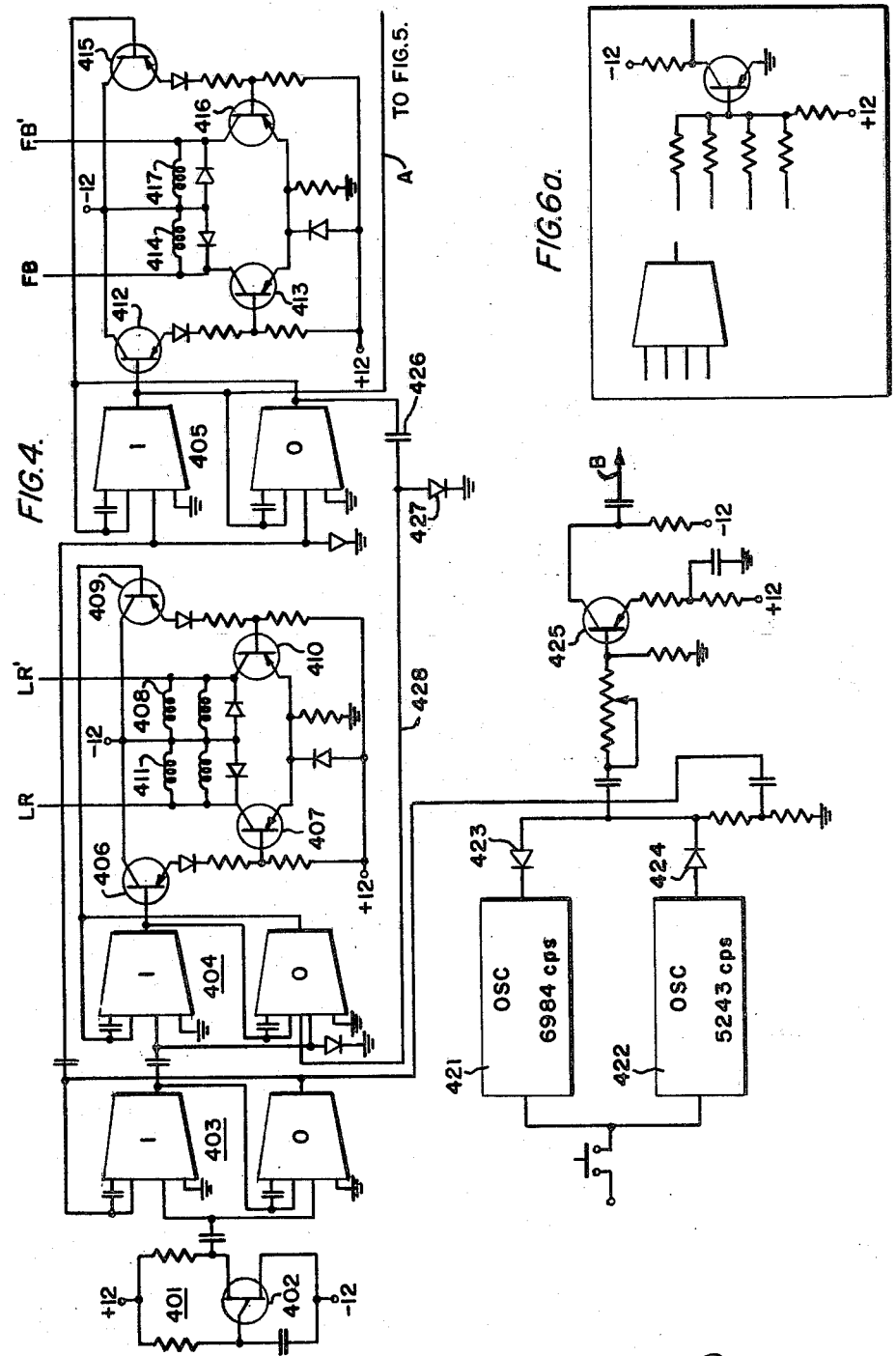

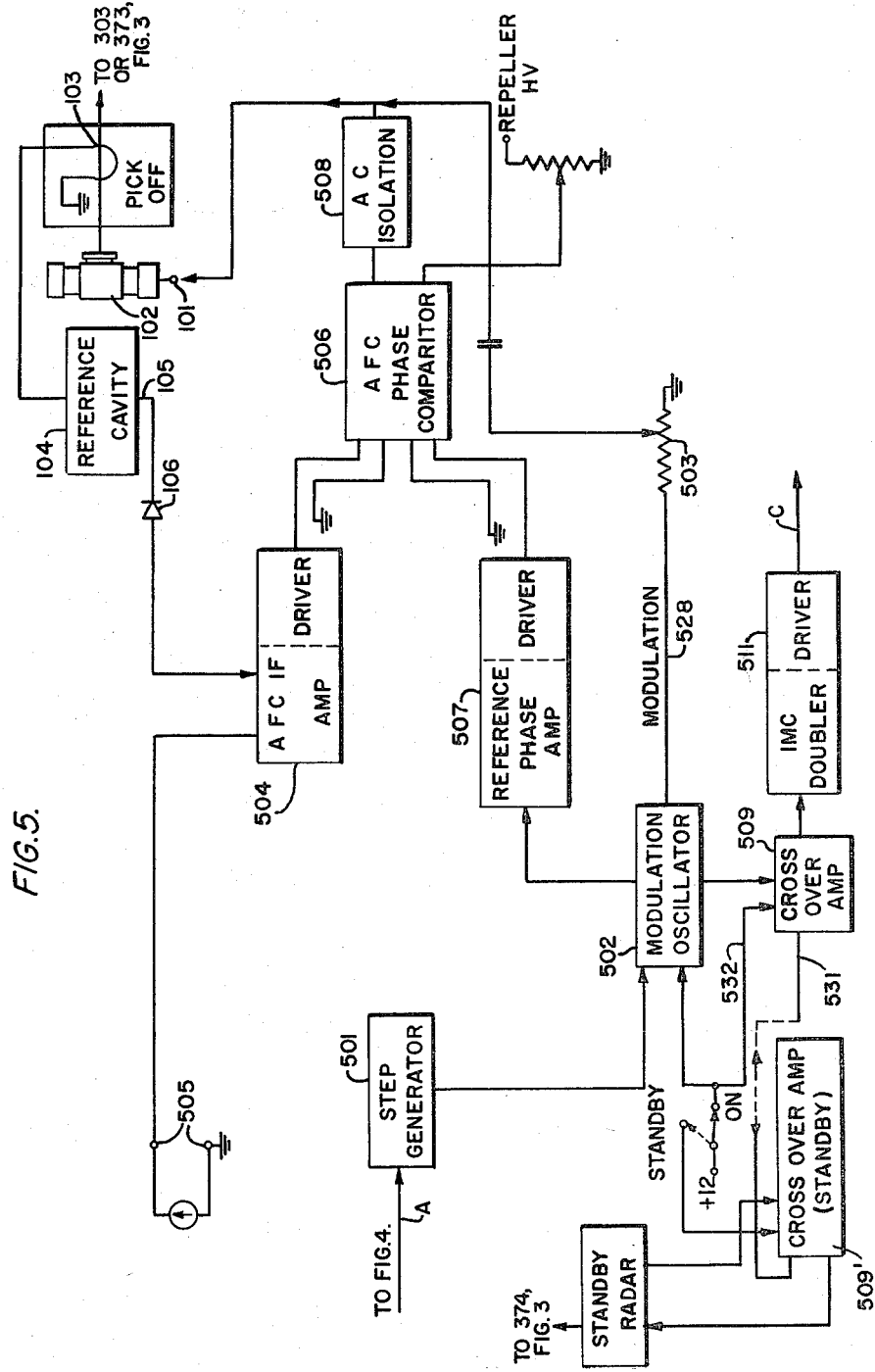

May 25, 1965   W. F. GUNKEL ETAL   3,185,981
DOPPLER NAVIGATION SYSTEM
Filed Oct. 7, 1959   32 Sheets-Sheet 10

Robert T. Killman
ATTORNEY

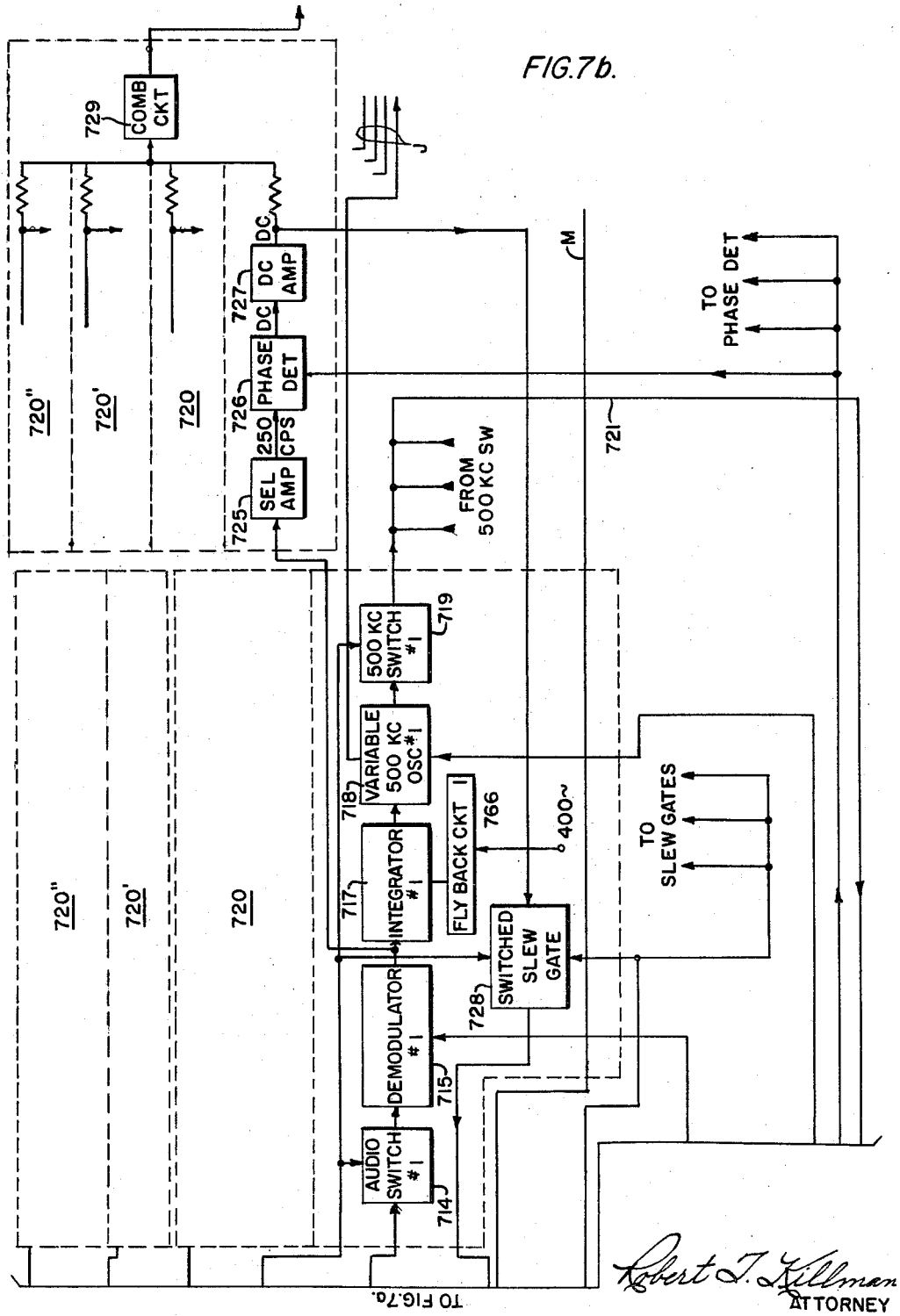

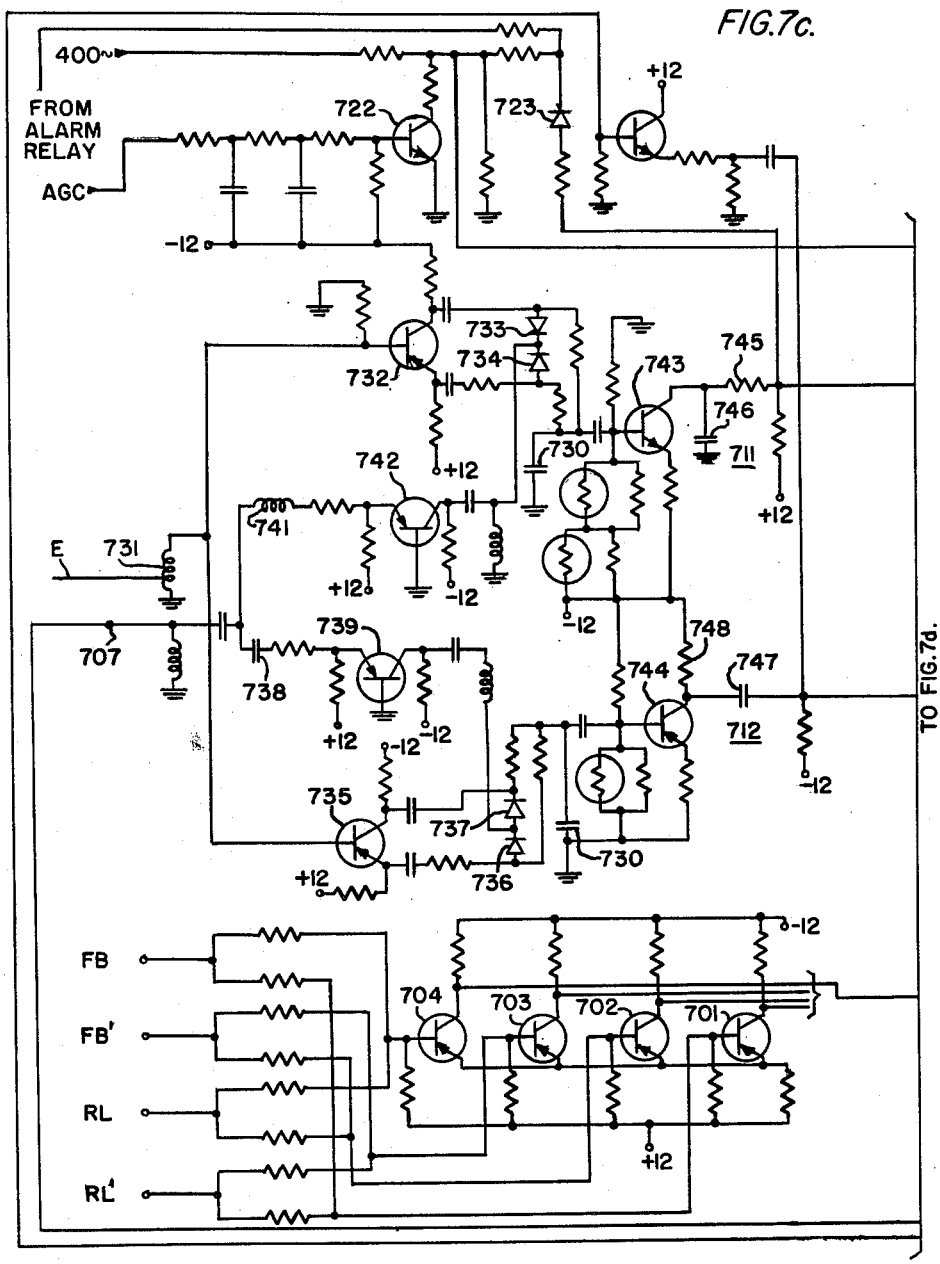

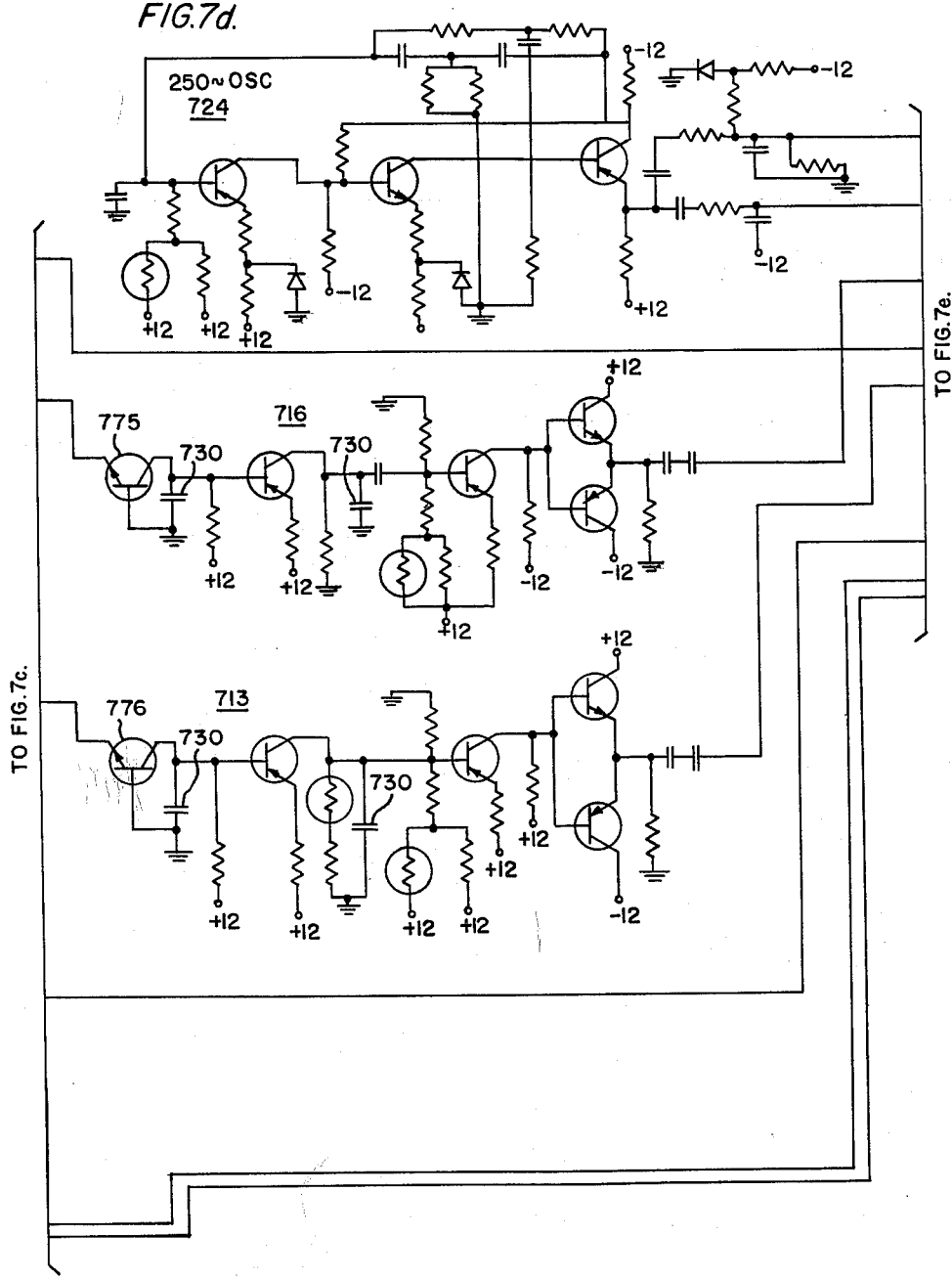

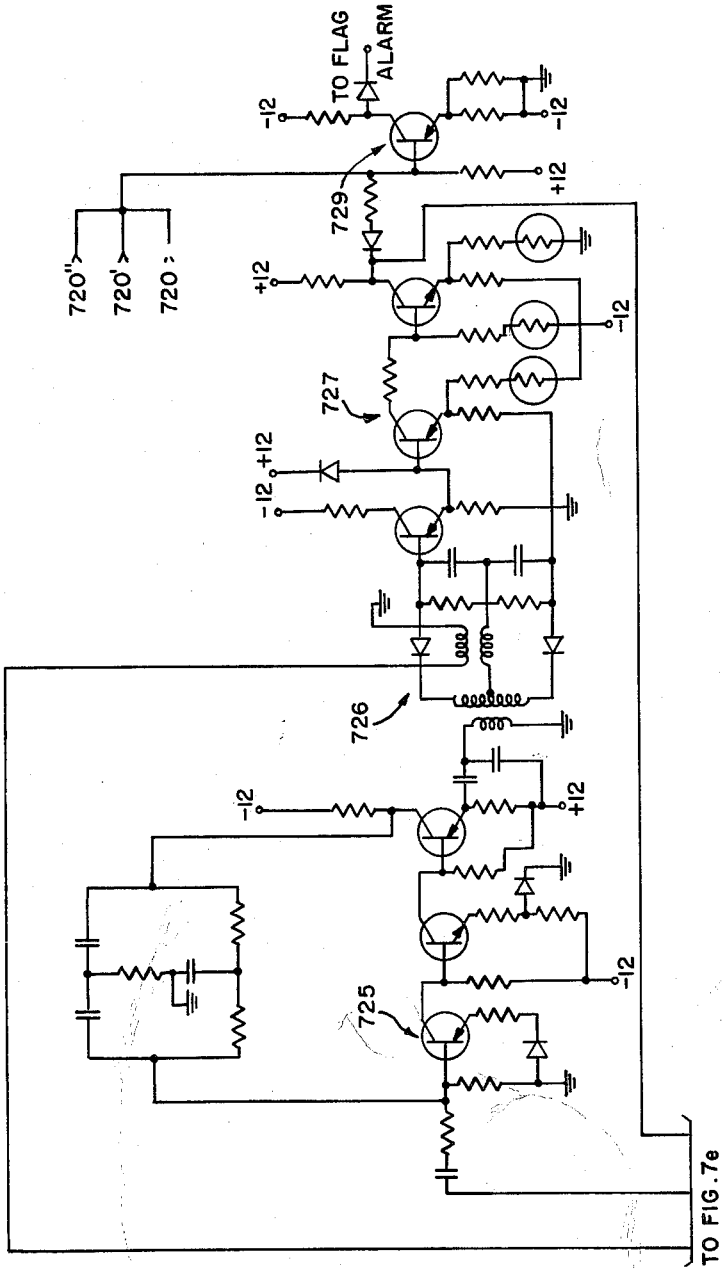

May 25, 1965   W. F. GUNKEL ETAL   3,185,981
DOPPLER NAVIGATION SYSTEM
Filed Oct. 7, 1959   32 Sheets-Sheet 18

TO FIG. 8.

Robert T. Killman
ATTORNEY

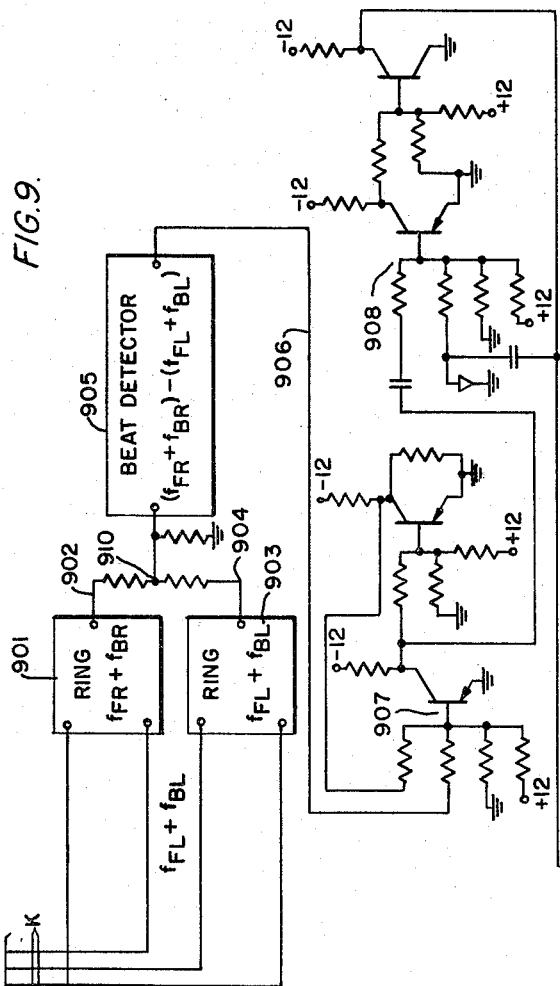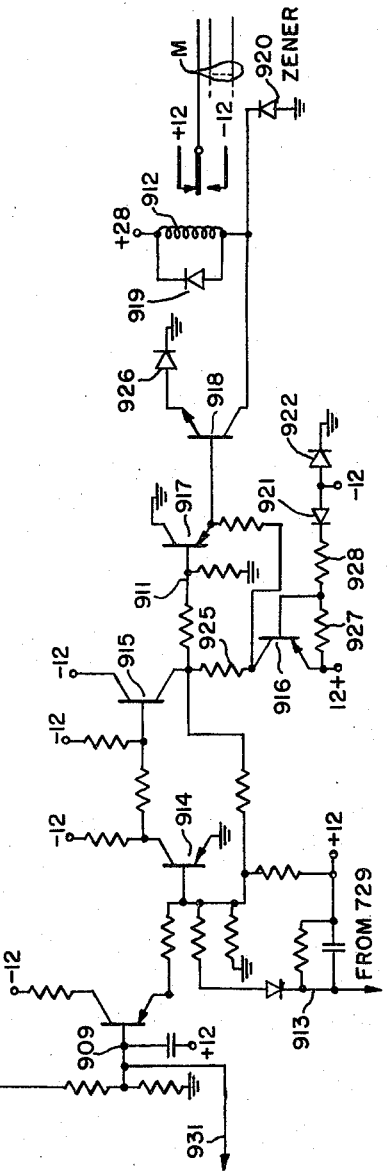
FIG. 9.

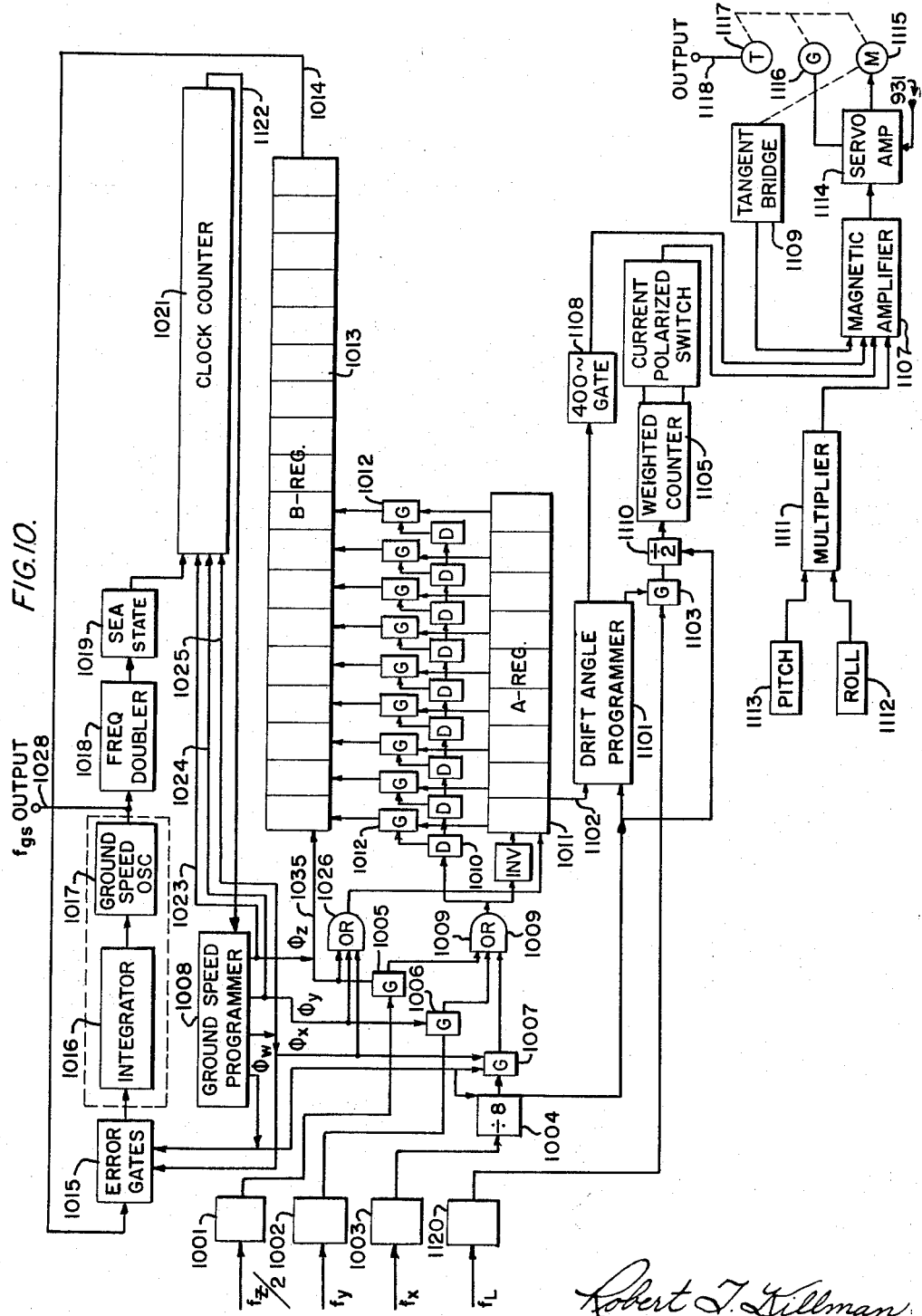

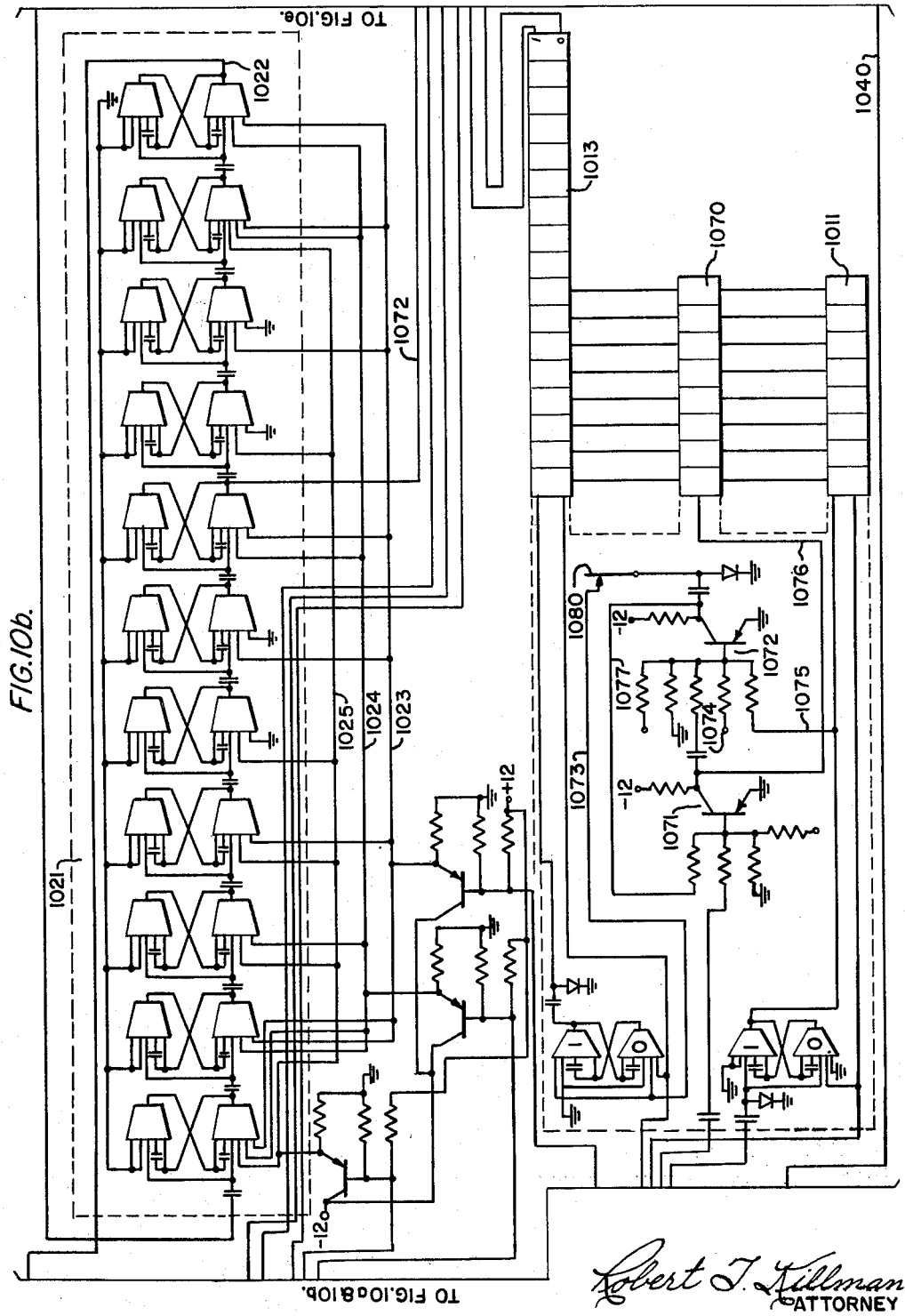

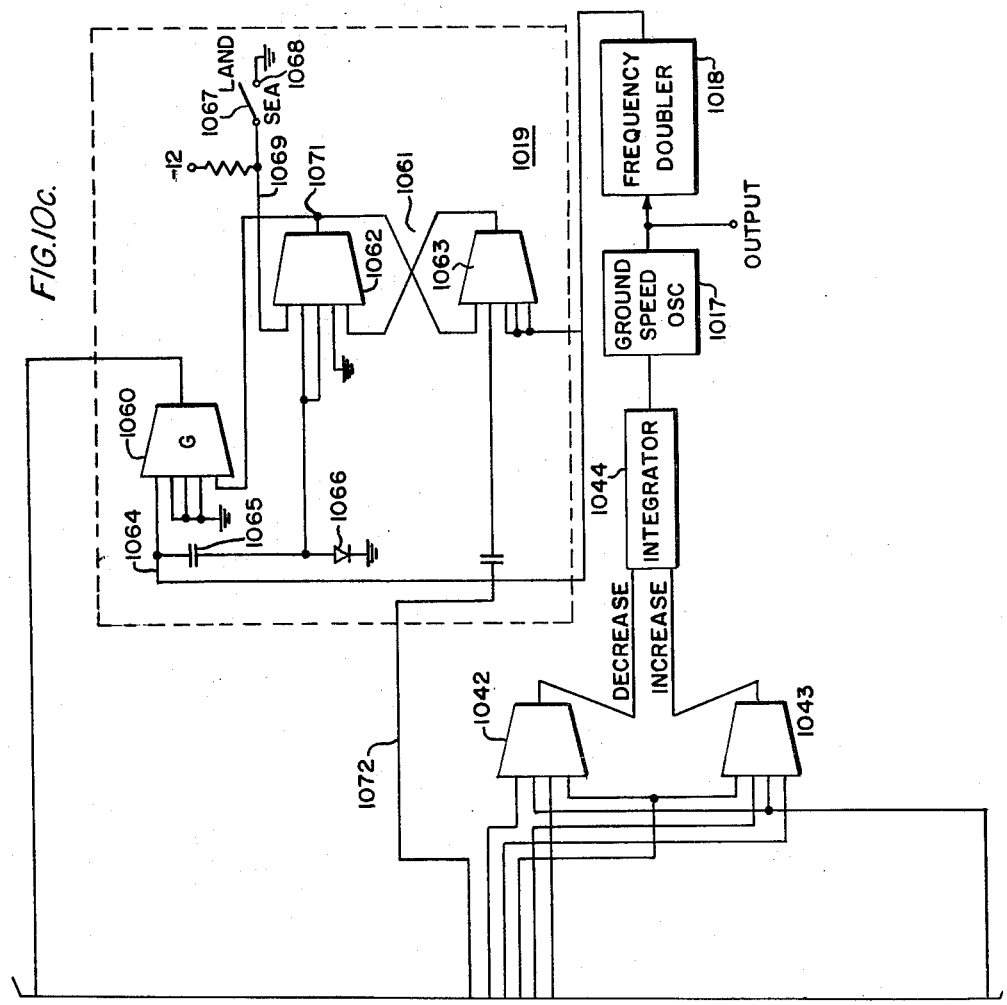

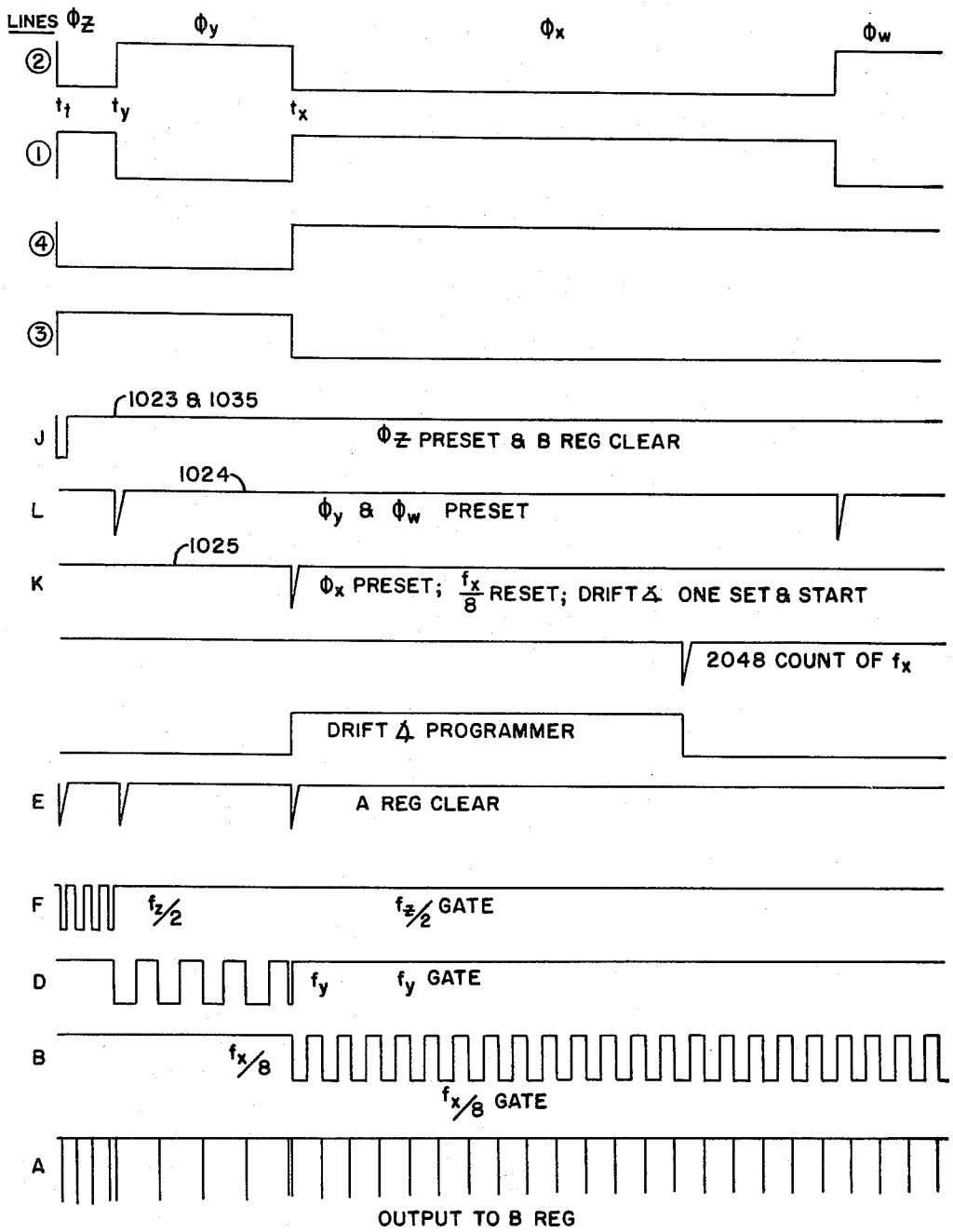

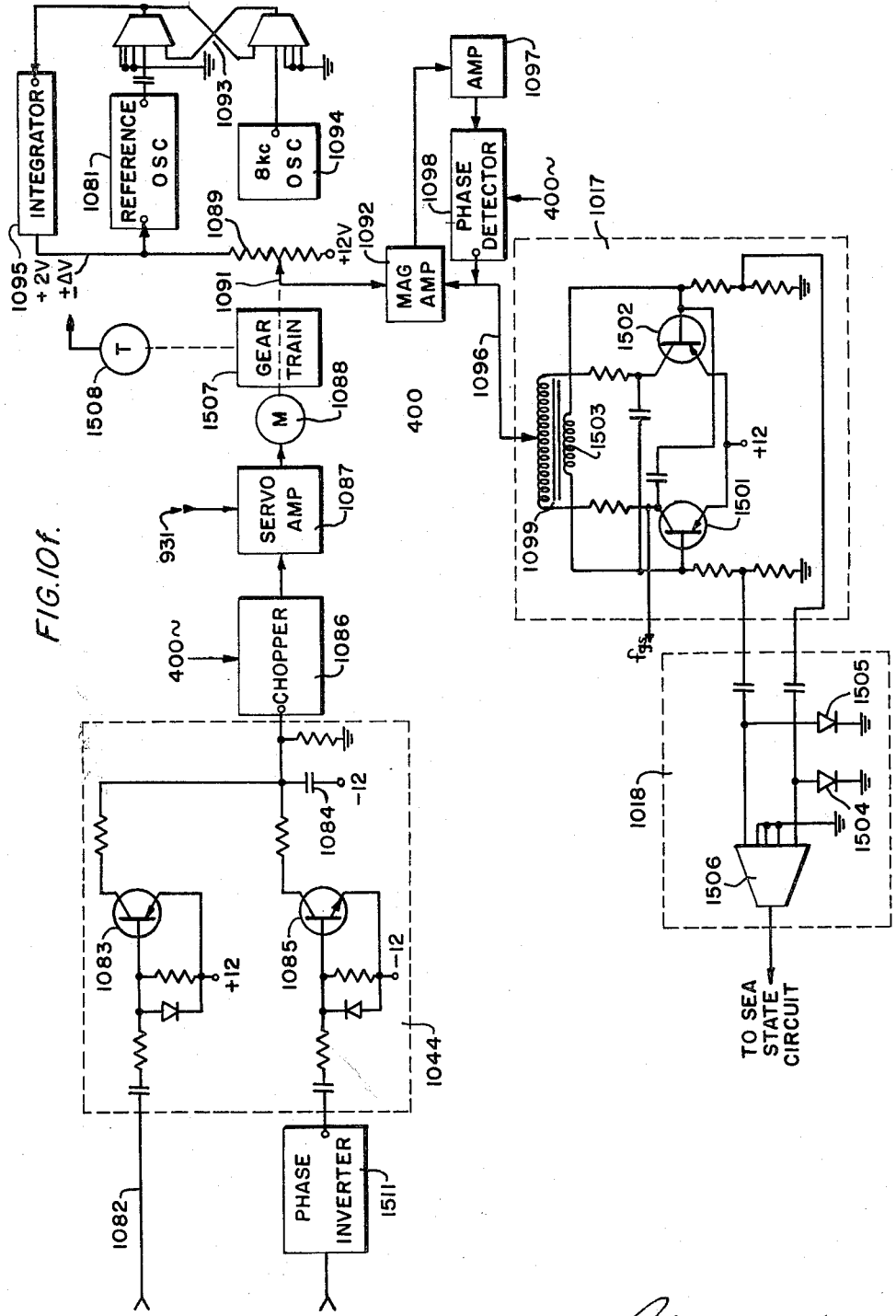

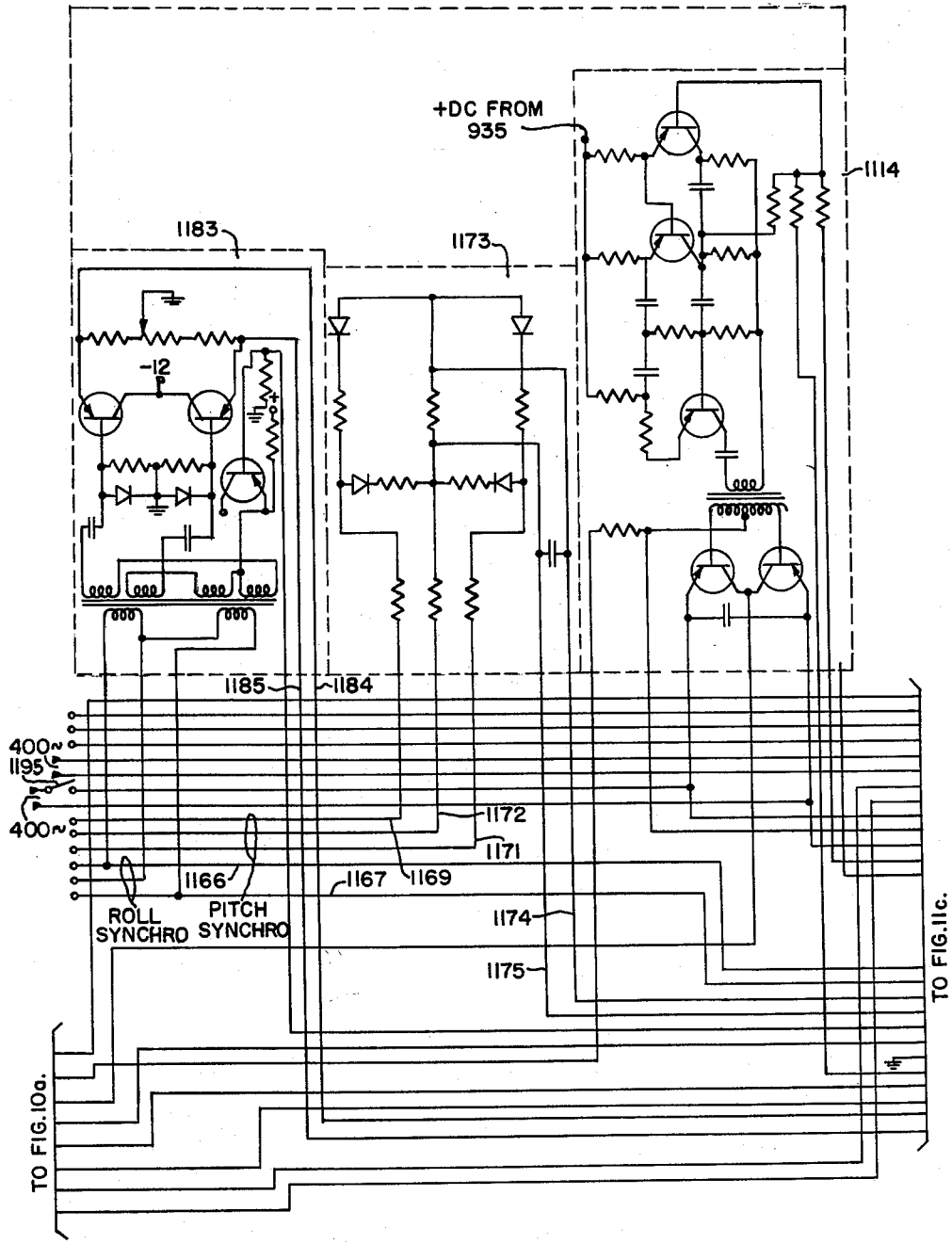

May 25, 1965

W. F. GUNKEL ETAL 3,185,981

DOPPLER NAVIGATION SYSTEM

Filed Oct. 7, 1959

Robert J. Killman
ATTORNEY

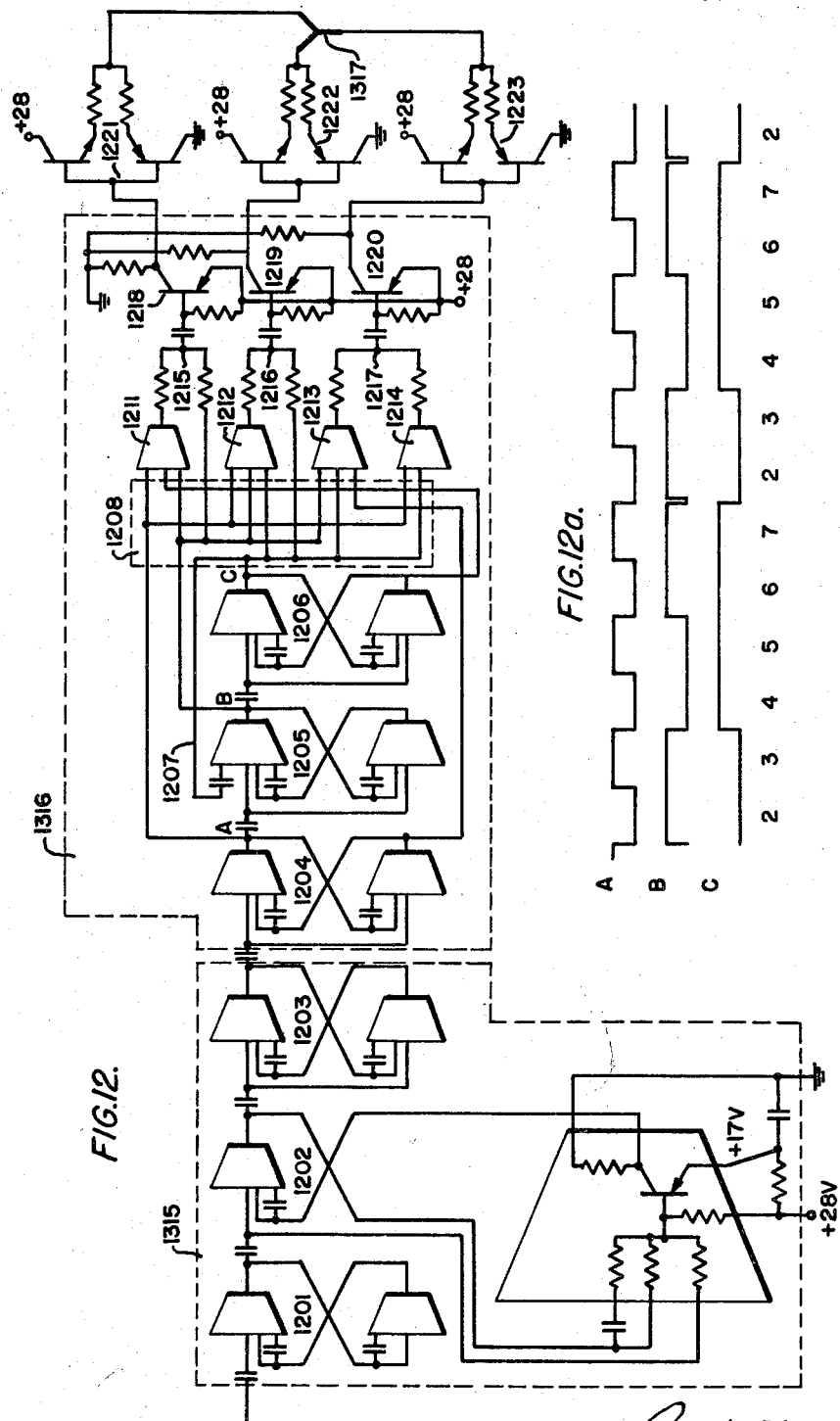

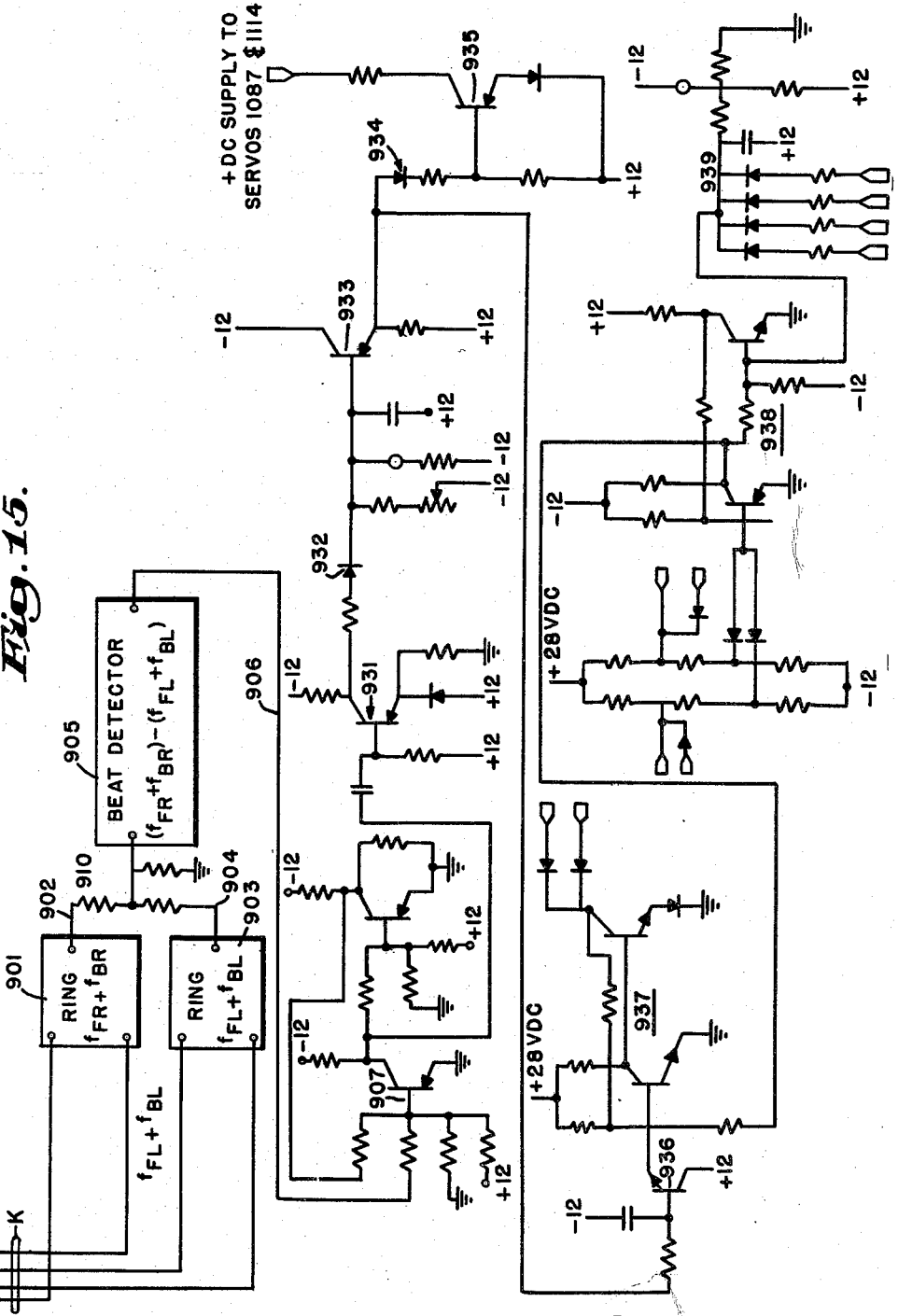

United States Patent Office 3,185,981
Patented May 25, 1965

3,185,981
DOPPLER NAVIGATION SYSTEM
William F. Gunkel, Baltimore, Robert E. Willey, Parkville, Charles L. Christianson and Ernest O. Kirner, Towson, James H. Jackson, Lutherville-Timonium, Burton L. Cordry, Glenarm, Nicholas M. Papanicolaou, Baltimore, Carl C. Bath, Towson, and Wilbur A. Visher, Lutherville-Timonium, Md., assignors to The Bendix Corporation, Towson, Md., a corporation of Delaware
Filed Oct. 7, 1959, Ser. No. 845,034
91 Claims. (Cl. 343—9)

This invention relates to navigation systems and more particularly to self-contained navigation systems which determine the velocity vector of the vehicle in which the equipment is installed. In aircraft this determination is made by radiating energy to the ground and processing the reflected energy to extract the information contained therein due to the Doppler frequency shift which results due to the relative motion of the vehicle and the surface of the earth.

Doppler navigation systems which have been employed in the past have been characterized by two general features, one of which is the utilization of a movable two-beam antenna system which can be oriented to direct the beams symmetrically on opposite sides of the ground track of the vehicle. For this orientation, systems of this type develop identical Doppler signals from each antenna and utilize this fact to maintain the antennas so oriented and derive from such orientation the information relative to drift angle of the craft. To obtain the magnitude of velocity, namely, ground speed, it is necessary to compare the Doppler shift between a forward and rearward directed beam. Systems of the prior art have generally employed the so-called Janus technique of simultaneously radiating the forward and rearward beam and simultaneously comparing the returned energy of these beams in order to avoid the resuirement for a stable source aboard the aircraft to demodulate coherently the returned signal.

It is an object of the present invention to provide a new and improved FM-CW Doppler navigation system which utilizes a fixed antenna with stabilization of the data derived therefrom in a non-Janus system.

A further object of the invention is the provision of improved solid-state circuits and combinations throughout the system which provide an extremely compact, reliable and accurate Doppler navigation system.

Another object of the invention is the provision of a Doppler system having an improved antenna array and feed system for providing sequentially shifted beam positions.

A further object of the invention is the provision of a Doppler system having a transmitter which is frequency stabilized to provide coherent detection and modulated in frequency in accordance with a predetermined program to eliminate altitude holes in the response of the system.

An additional object of the invention is the provision in a Doppler system of a receiver which recovers Doppler frequency components which are substantially below the noise level in the receiver input circuits.

An additional object is to provide Doppler receiver and frequency processing circuits which operate to provide coherent algebraic manipulation of the data frequencies derived from the beam positions of the antenna.

Another object of the invention is the provision of a Doppler system having an improved frequency tracker which generates oscillator frequencies corresponding to the center of the Doppler spectrum of each of the antenna beams.

A still further object of the invention is the provision of a Doppler system having digital computation devices for independently computing ground speed and drift angle values with extreme accuracy.

Another object of the invention is the provision of an improved Doppler system capable of utilizing a simplified novel navigational computer operating from a digital ground speed signal.

Still another object of the invention is the provision of means for correcting the data processing circuits of a Doppler system to compensate for flying over the smooth surface of the sea.

A further object is to provide a Doppler navigation system which can be readily adapted to dual system operation.

An additional object of the invention is the provision of improved novel component circuits which provide improved operation for their particular function which contributes to the overall improved operation of the system.

These and other objects of the invention will be apparent from the following detailed description taken in conjunction with the accompanying drawings wherein:

FIG. A is a perspective diagram of an aircraft in flight illustrating the geometry of the navigation problem;

FIG. B is a plan view of the aircraft relative to the field of constant Doppler hyperbolas;

FIG. 1 is a block diagram of the data acquisition portion of the system;

FIG. 2 is a block diagram of a complete navigation system including the indicator and autopilot;

Figure 3:
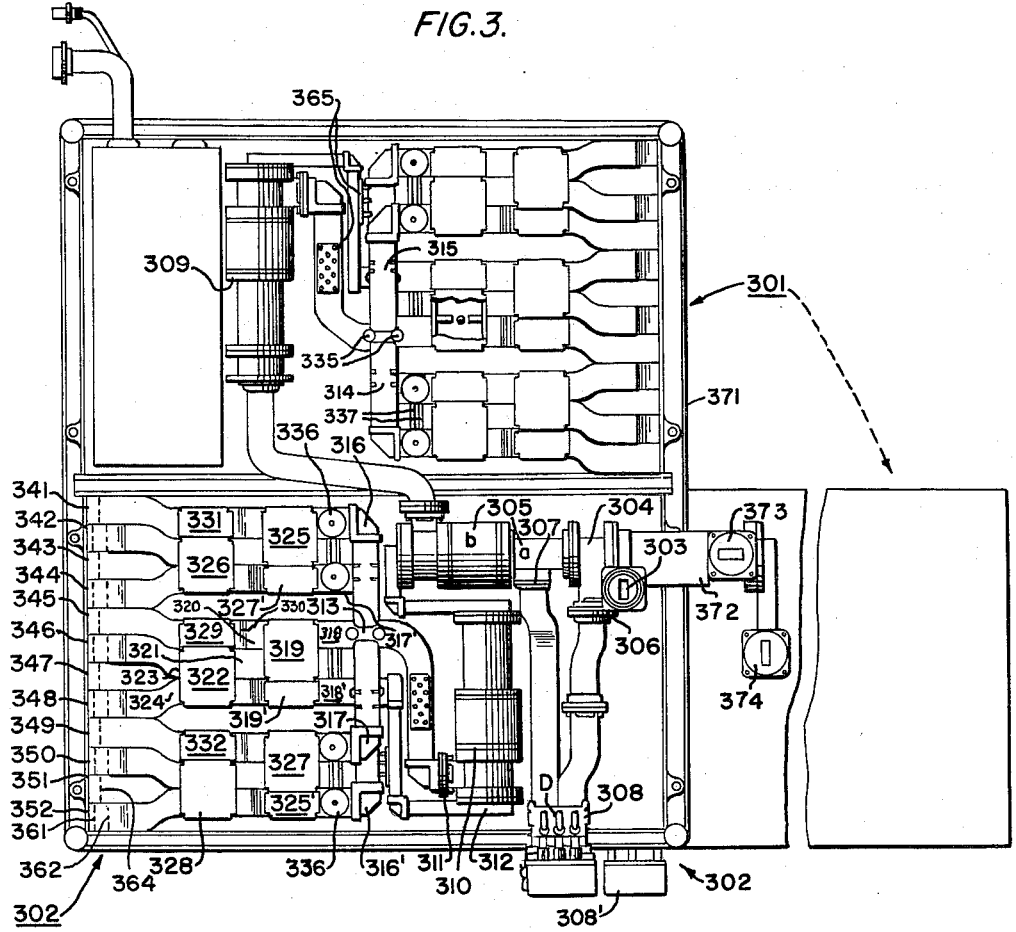
FIGS. 3, 3a and 3b are respectively plan, end elevation, and side elevation views of the antenna array.
Figure 3A:
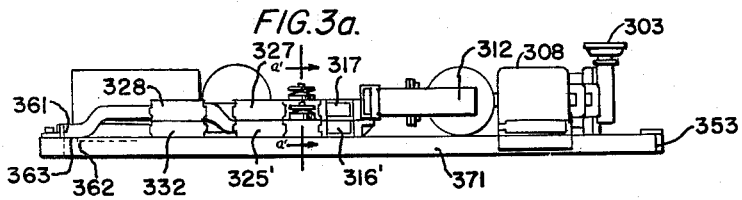
Figure 3A:
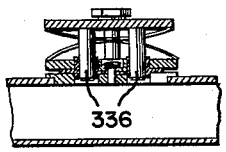
Figure 3B:
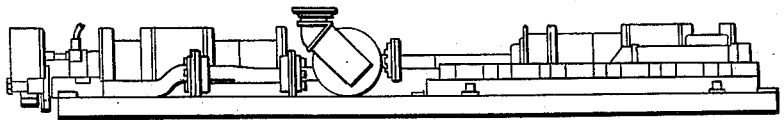
Figure 3D:
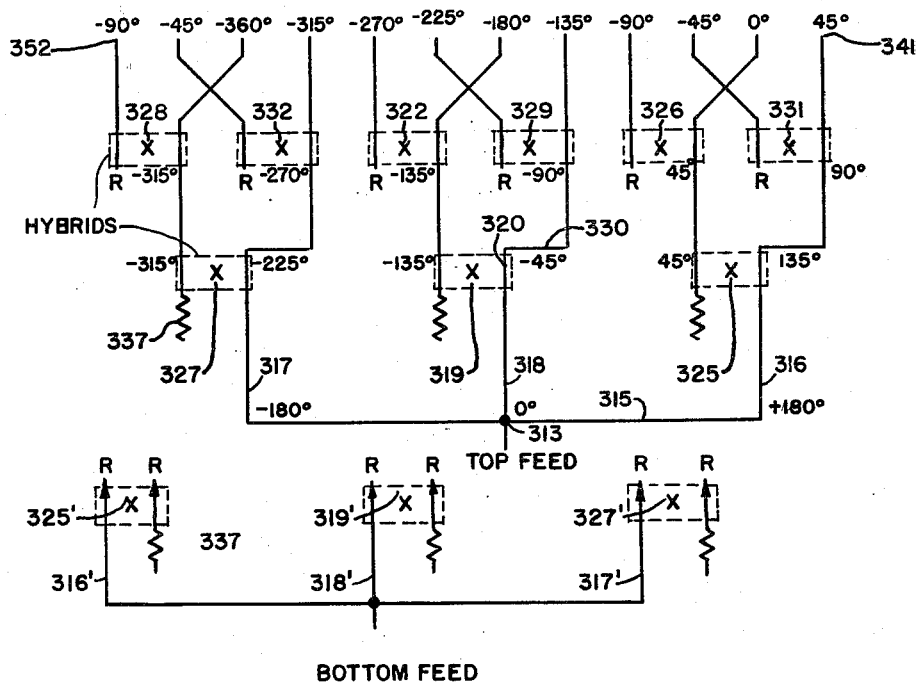
Figure 5C:
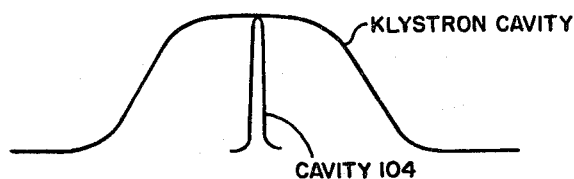
Figure 5A:
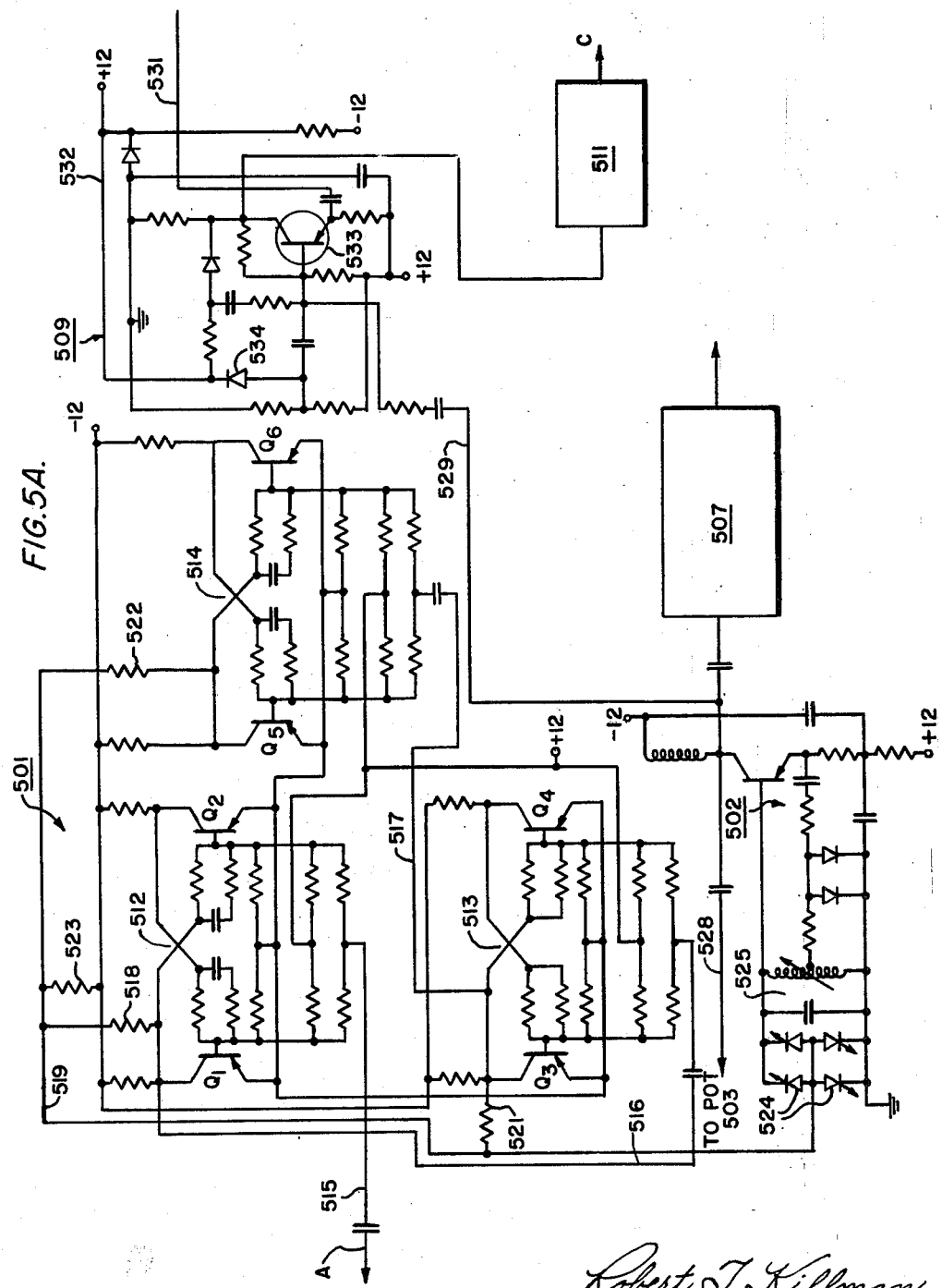
Figure 4A:
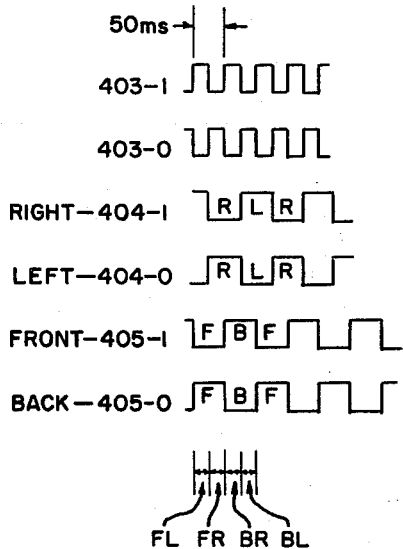
Figure 5B:
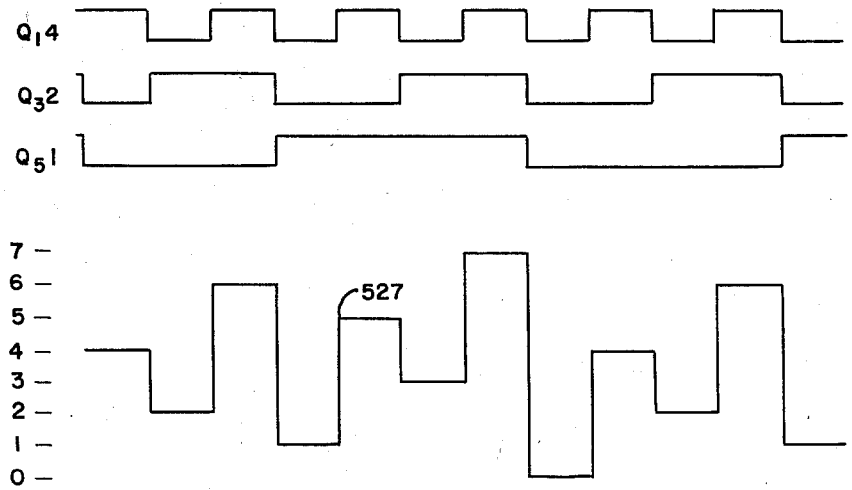
Figure 7A:
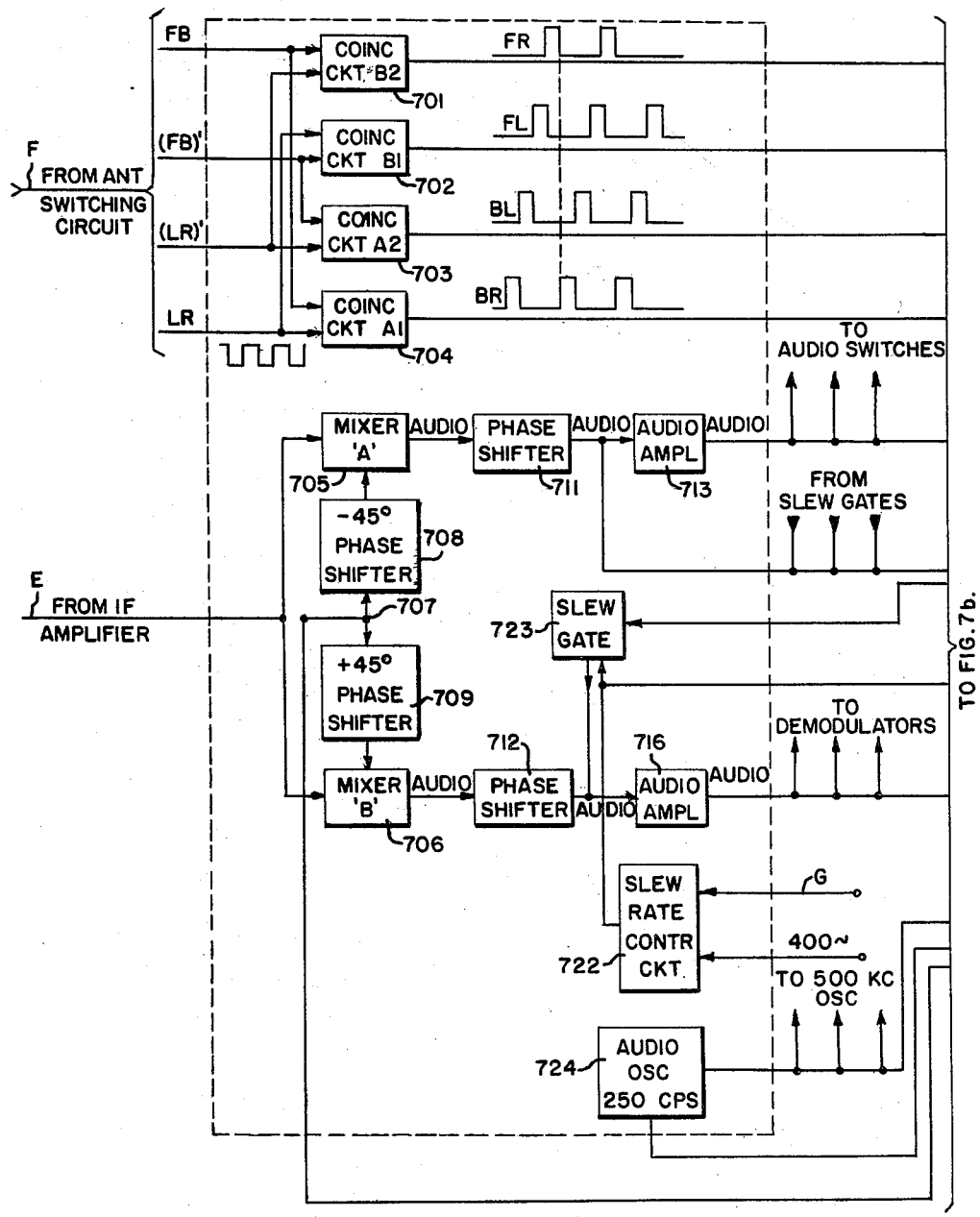

FIG. 3a' is a detailed sectional view of a phase adjusting device;

FIG. 3c is a plan view of the slot array of the antenna;

FIG. 3d is a phasing diagram of the antenna shown schematically;

FIG. 4 is a wiring diagram, partly schematic, of the beam switch generator and test oscillator circuits;

FIG. 4a is a wave diagram of the beam switch waves applied to the ferrite switches in the antenna;

FIG. 5 is a block diagram, partly schematic, of the transmitter, AFC loop, modulation circuits, and the dual system operation connections;

FIG. 5a is a schematic diagram of the modulation generator and cross-amplifier;

FIG. 5b is a wave diagram for the modulation wave generator drawn to the same time scale as the beam switch waveforms of FIG. 4a;

FIG. 5c is a response characteristic of the transmitter klystron and the reference cavity;

FIGS. 6a, 6b, 6c and 6d are diagrams of logic circuits used in the invention;

FIGS. 7a and 7b taken together are a block diagram of the sequencer, frequency tracker and frequency lock detector circuits;

FIGS. 7c, d, e and f constitute a schematic wiring diagram of the circuits of FIGS. 7a and 7b.

Figure 8:
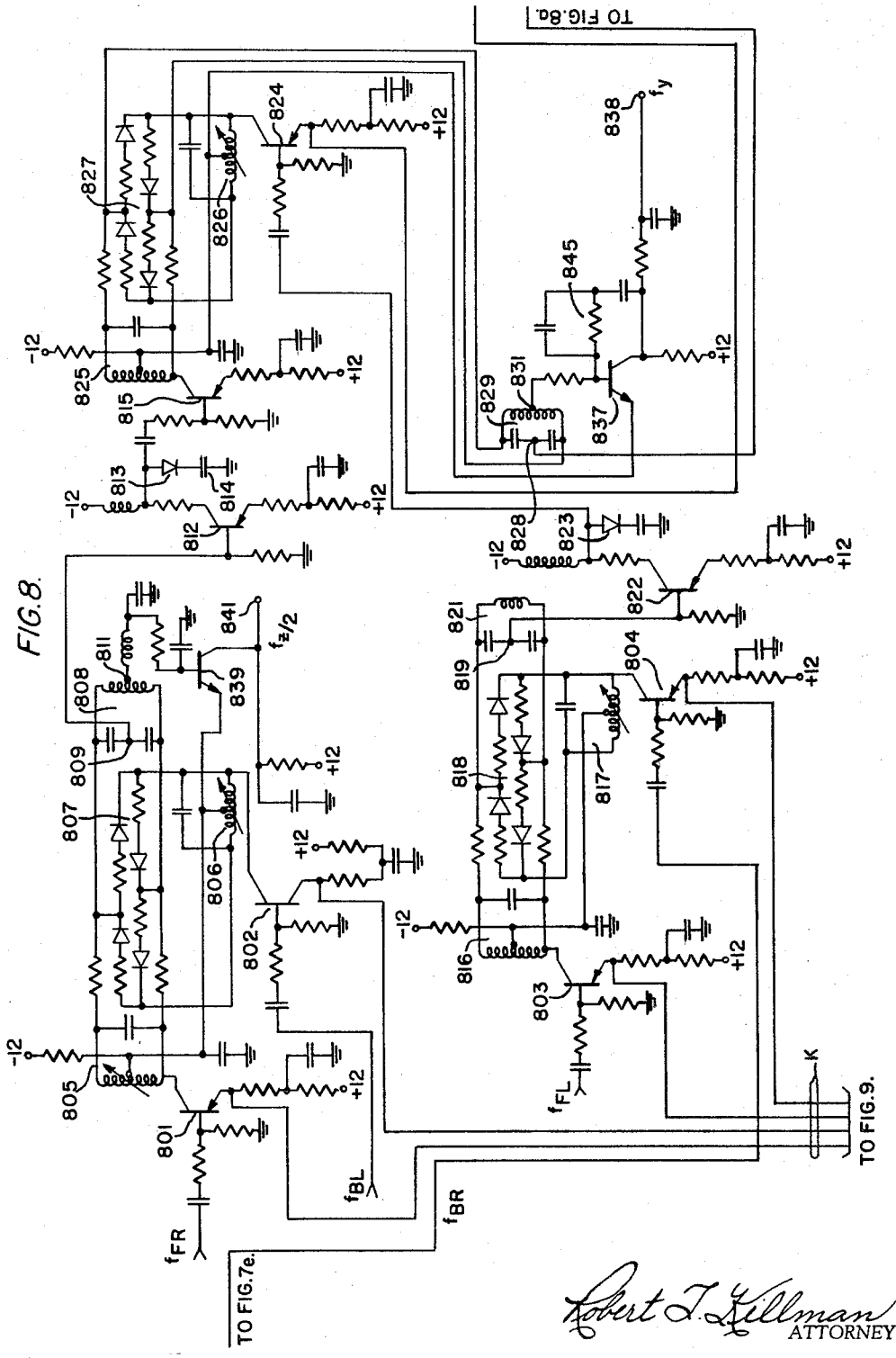
Figure 8A:
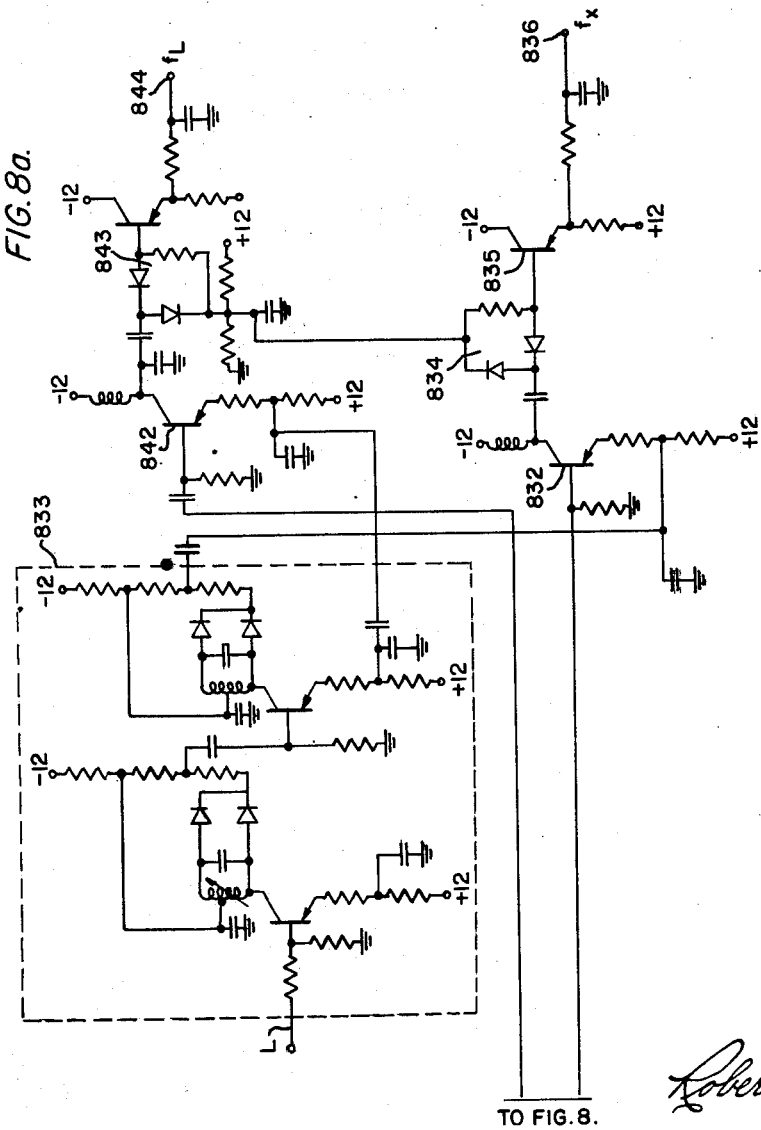
Figure 10A:
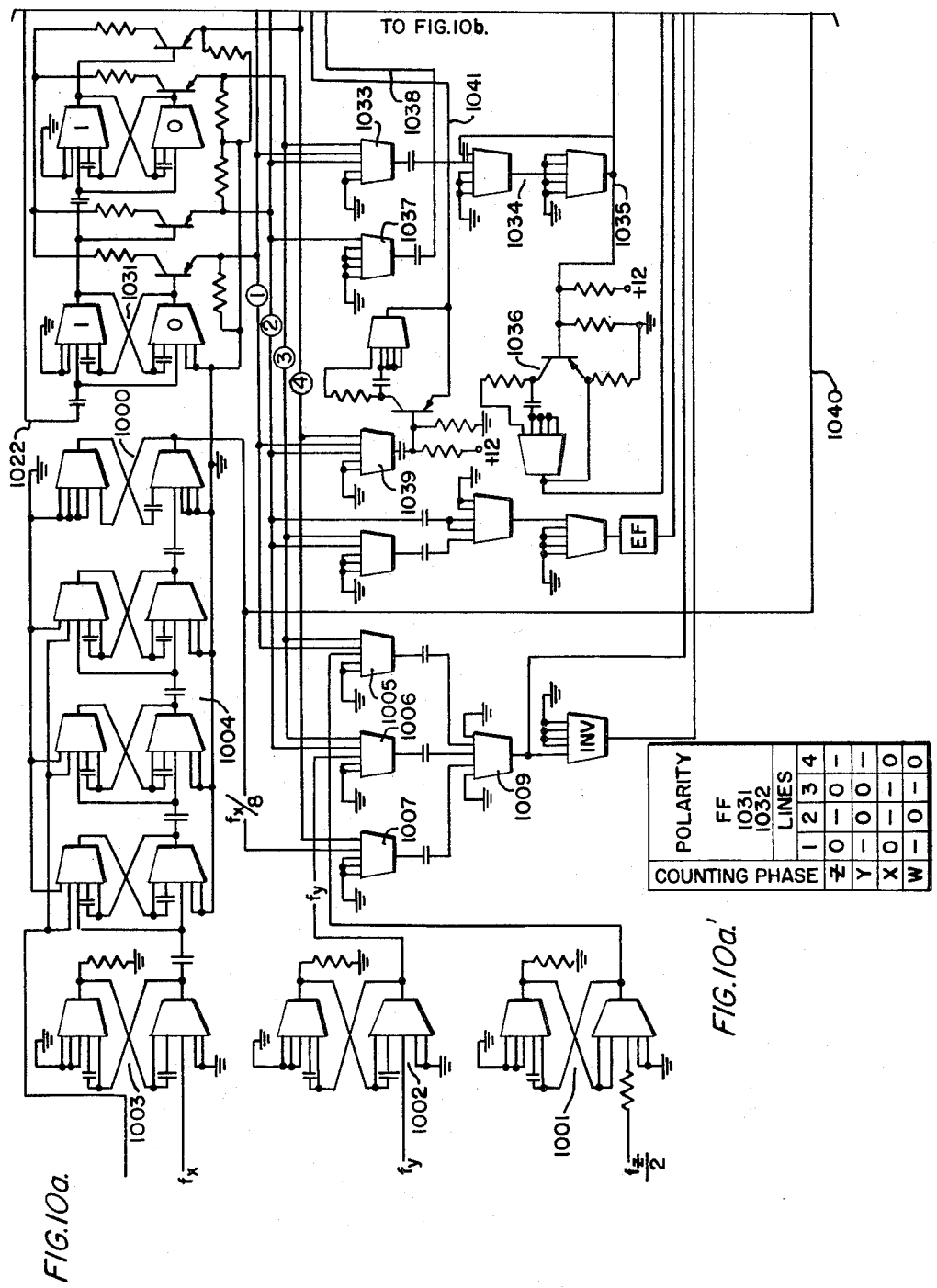
Figure 10D:
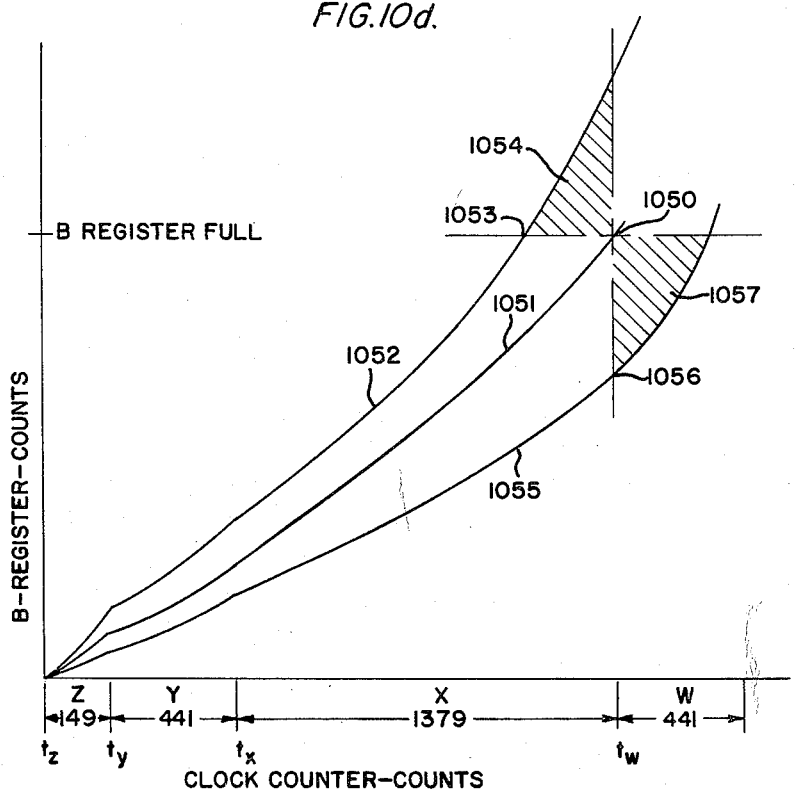
Figure 11A:
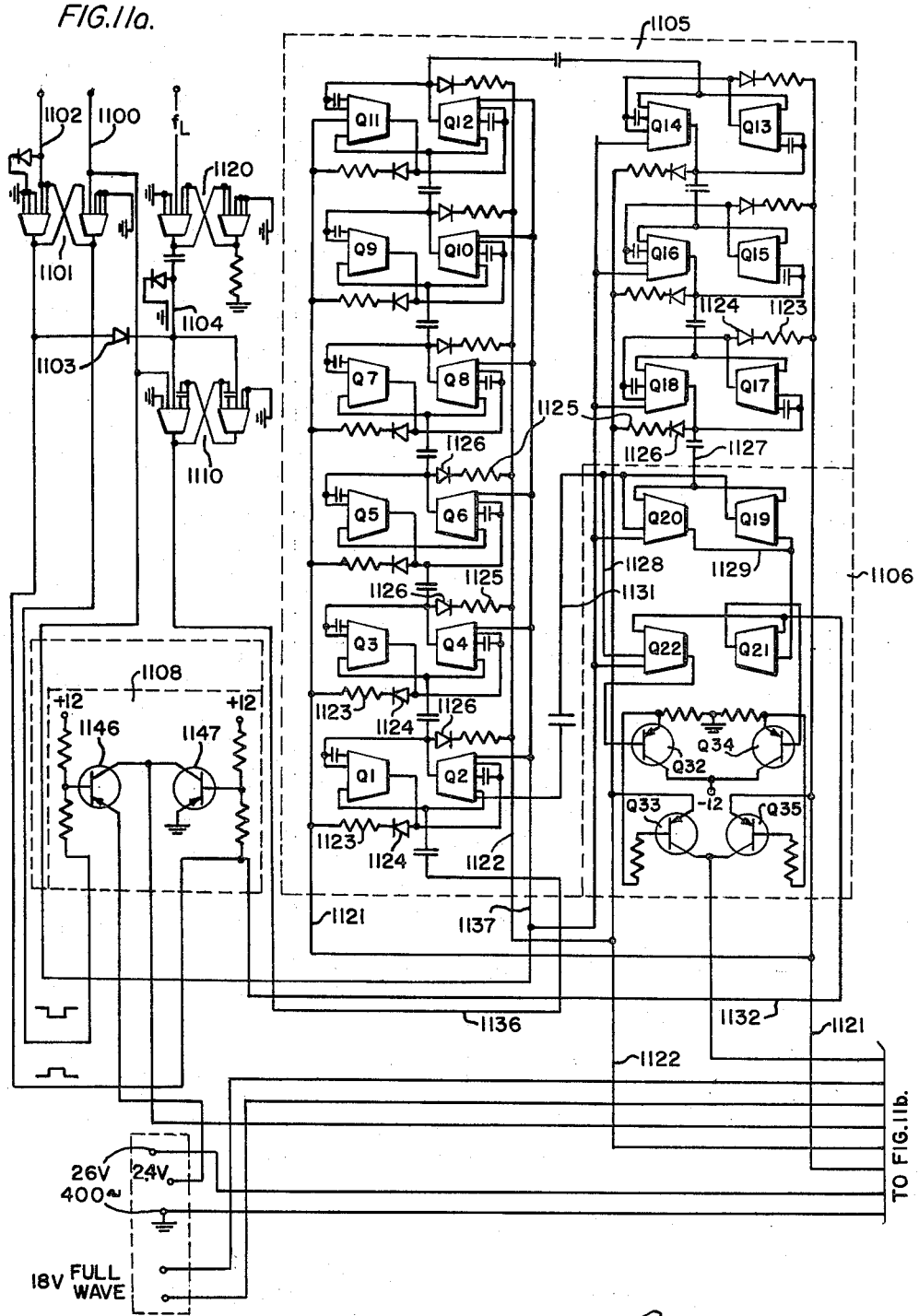
Figure 11C:
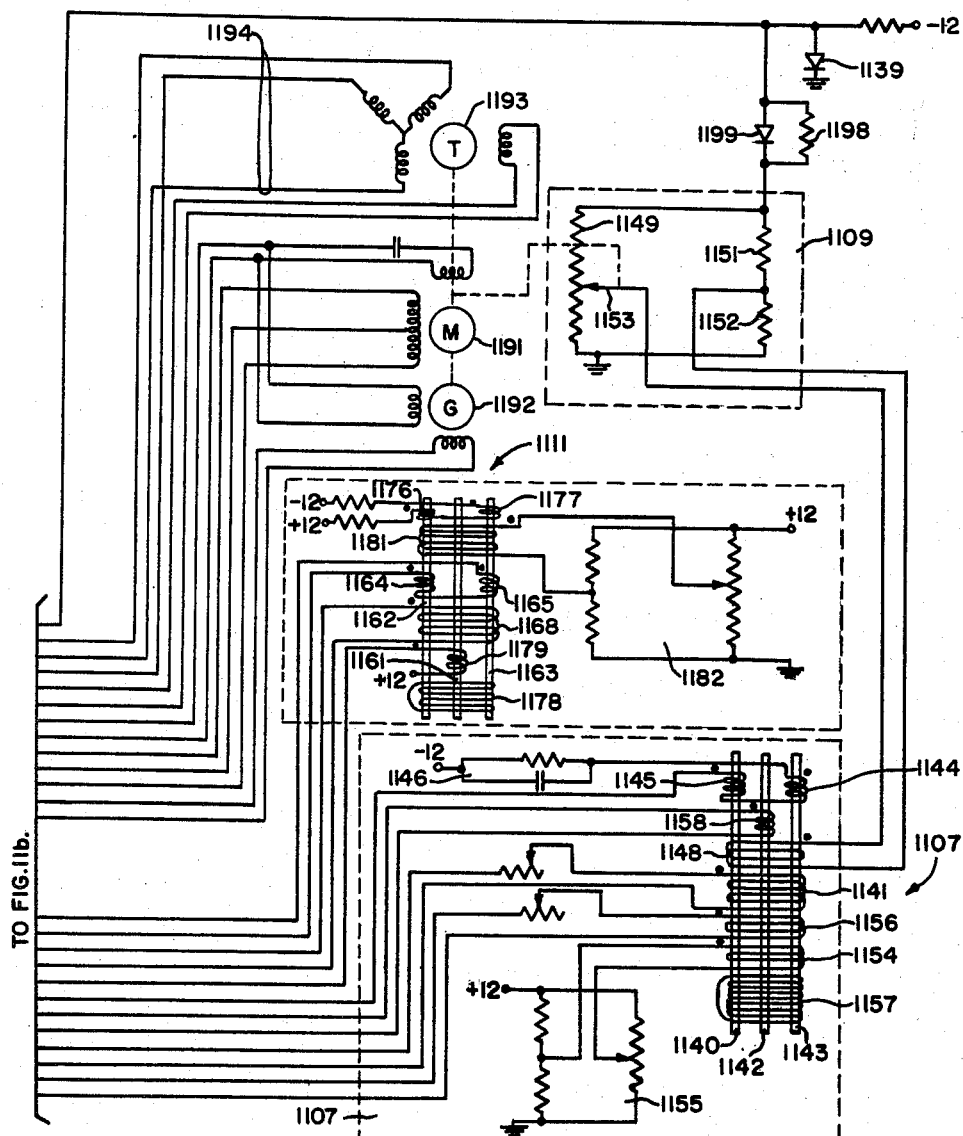
Figure 11D:
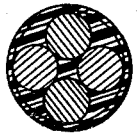
Figure 13:
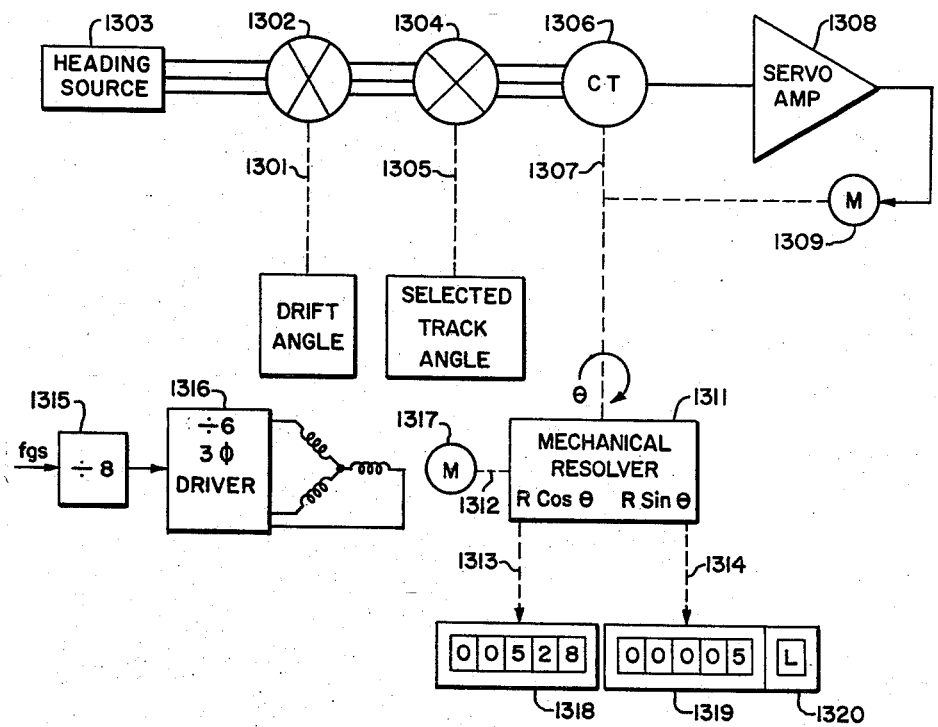
Figure 14:
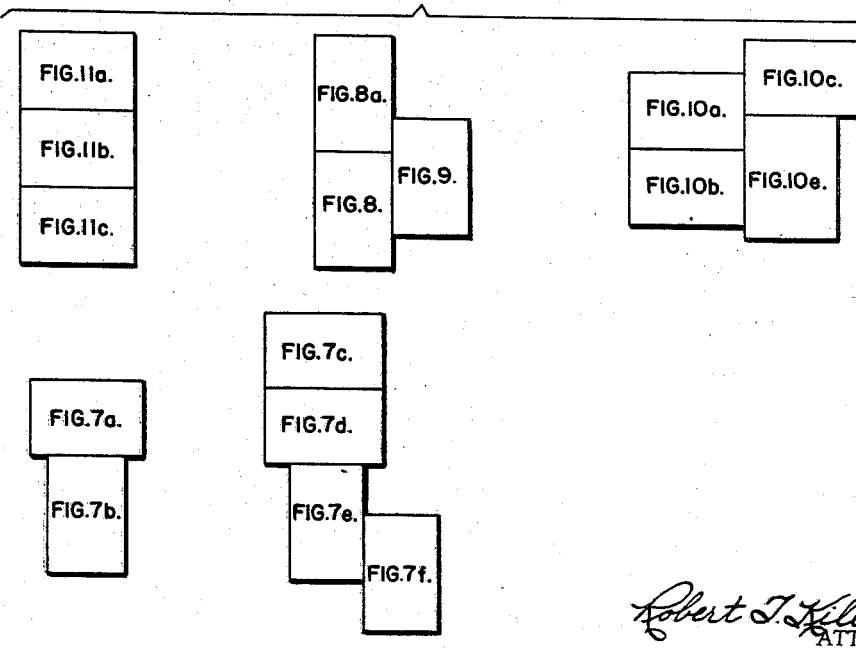

FIGS. 8 and 8a taken together are a schematic diagram of a portion of the frequency combiner circuits;

FIG. 9 is a schematic diagram of the remainder of the frequency combiner circuits and the flag alarm circuit;

FIG. 10 is a block diagram of the computer and output portions of the system;

FIGS. 10a, b and c are logic diagrams, partly schematic, of the ground speed computer;

FIG. 10a' is a legend for describing the ground speed programmer operation;

FIG. 10d is a phase diagram indicating the operation of the counters of the ground speed computer;

FIG. 10e is a waveform timing diagram for the ground speed and drift angle computers;

FIG. 10f is a block diagram of the digital-to-shaft position ground speed converter;

FIGS. 11a, b and c are a schematic diagram of the drift angle computer;

FIG. 11d is a sectional view of a tetrafilar wire;

FIG. 12 is a logic diagram of the three-phase converter for the ground speed signal;

FIG. 12a is a waveform diagram for the circuit of FIG. 12;

FIG. 13 is a block diagram of a navigational computer utilizing the output of the Doppler system;

FIG. 14 is a diagram showing the relation for assembling the drawing sheets for FIGS. 7, 8, 10 and 11; and FIG. 15 is a circuit alternative to FIG. 9.

Theory of operation

The navigation system of the present invention operates with respect to a geometrical configuration as shown in FIG. A in which an aircraft P is flying relative to the surface of the earth E. The plane's own coordinates are labeled $x_p$-$x_p$ coinciding with the longitudinal axis of the plane P, a vertical axis $z_p$-$z_p$ and a horizontal axis $y_p$-$y_p$ perpendicular to the $x_p$ axis. This set of coordinates has at its origin the antenna 30 which radiates the four pencil shaped beams designated FL, FR, BR and BL. Each of these beams is positioned relative to the plane's coordinate system by angles $\alpha$, $\beta$ and $\gamma$ where $\alpha$ is the angle between the $x$ axis and the axis of the beam, $\beta$ is the angle between the $y$ axis and the axis of the beam, and $\gamma$ is the angle between the $z$ axis and the axis of the beam. In FIG. A these angles for the front-right beam FR are shown. The front-left (FL) and front-right (FR) beams are positioned symmetrically with respect to the vertical plane through the $x$-axis of the aircraft and thus lie on a constant Doppler hyperbola. The back-left (BL) and back-right (BR) beams are symmetrically positioned and thus also lie on a constant Doppler hyperbola. The front beams are inclined forward by the same angle that the back beams are inclined rearward. In accordance with the well known equation for the Doppler frequency shift due to forward motion and since the front and side angular displacement for each beam is the same the returned energy from the front beams will be increased in frequency by the same amount that the energy returned to the back beams is decreased in frequency.

The equation for the Doppler shift is:

$$f_d = \frac{2f_v \cos \phi}{c} = \frac{2v \cos \phi}{\lambda} \quad (1)$$

where $f_d$ = Doppler frequency shift
$\lambda$ = wavelength
$v$ = aircraft speed
$f$ = transmitter frequency
$\phi$ = angle between the beam and the direction of $v$
$c$ = velocity of radio propagation From Equation 1 the Doppler shift for the respective beam positions in the configuration shown in FIG. A can be shown to be:

$$f_{FL} = \frac{2}{\lambda}(V_{XP} \cos \alpha - V_{YP} \cos \beta - V_{ZP} \cos \gamma)$$

$$f_{FR} = \frac{2}{\lambda}(V_{XP} \cos \alpha + V_{YP} \cos \beta - V_{ZP} \cos \gamma)$$

$$f_{BL} = \frac{2}{\lambda}(V_{XP} \cos \alpha + V_{YP} \cos \beta + V_{ZP} \cos \gamma)$$

$$f_{BR} = \frac{2}{\lambda}(V_{XP} \cos \alpha - V_{YP} \cos \beta + V_{ZP} \cos \gamma)$$

(2)

where $V_{XP}$, $V_{YP}$ and $V_{ZP}$ are the velocities of the aircraft P with respect to the plane's own coordinate axes $X_p$, $Y_p$ and $Z_p$. Solving Equations 2 simultaneously for the components of velocity of the aircraft P along its own coordinate axis provides the following equations:

$$V_{XP} = \frac{\lambda}{8 \cos \alpha}(f_{FL} + f_{FR} + f_{BL} + f_{BR}) = k_1 f_x \quad (3)$$

$$V_{YP} = \frac{\lambda}{8 \cos \beta}(-f_{FL} + f_{FR} + f_{BL} - f_{BR}) = k_2 f_y \quad (4)$$

$$V_{ZP} = \frac{\lambda}{8 \cos \gamma}(-f_{FL} - f_{FR} + f_{BL} + f_{BR}) = k_3 f_z \quad (5)$$

$$0 = f_{FL} - f_{FR} + f_{BL} - f_{BR} \quad (6)$$

The significance of Equations 3, 4, 5 and 6 can be interpreted with reference to FIG. B which is a plan view of the aircraft in FIG. A. The aircraft is traveling at a velocity $V_p$ which has a velocity component $V_{XP}$ along the X axis and a velocity $V_{YP}$ along the Y axis. If $V_{YP}$ were zero (i.e. no drift) the Doppler shifts experienced by all four beams would be equal, the front beams being increased in frequency by, say, 5 kilocycles and the back beams being decreased by 5 kc. Where drift exists the component $V_{YP}$, if to the right, for example, produces a resultant decrease in velocity of the beam FL hence $f_{FL}$ equals, say, plus 4 kc. while the Y component of velocity as shown in FIG. B produces an increase in velocity for the beam FR. Thus the corresponding frequency $f_{FR}$ would equal 6 kc. With respect to the back beams the situation is just reversed. The $V_{YP}$ velocity component in effect decreases the speed of recession of the beam BR and $f_{BR}$ decreases to a Doppler shift of 4 kc. while $f_{BL}$ increases to 6 kc. shift. It is to be understood, of course, in FIG. B that the signs of the frequency shifts are to indicate the direction of shift from the transmitted frequency and that the quantities represented are not negative numbers. For the configuration of four beams shown in FIG. B the sum of all the frequencies for a given $V_{XP}$ will remain constant irrespective of drift velocity $V_{YP}$. This same consideration can be stated for conditions involving pitch and roll since rotational movement of the aircraft about its longitudinal or transverse axes merely shifts the beams with respect to the families of hyperbolas of constant Doppler shift indicated in FIG. B such that the sum of the shifts remains constant. Accordingly, a frequency which is proportional to the sum of the Doppler frequencies from all four beams is a frequency which is directly related to $V_{XP}$, the velocity of the aircraft along its own axis.

Ground speed computation—theory

The derivation of the ground speed of the aircraft P can be obtained from a consideration of a geometry of FIG. A. The velocity of the aircraft $V_P$ is a vector in the coordinate system of the aircraft. An identical vector V with components $V_X$, $V_Y$, $V_Z$ represents the velocity of the aircraft relative to the ground coordinates. Since these vectors are the same vector, they will be equal irrespective to the coordinate system in which they are described. Accordingly, they can be equated:

$$V = V_P \quad (7)$$

Since these vectors are equal, the sums of the squares of the vector components are likewise equal:

$$V_X^2 + V_Y^2 + V_Z^2 = V_{XP}^2 V_{YP}^2 + V_{ZP}^2 \quad (8)$$

Since ground velocity $V_G$ is defined as the sum of the X and Y velocity vectors in the ground coordinate system, the magnitude of the ground velocity or the ground speed $\overline{V}_G$ is:

$$\overline{V}_G = \sqrt{V_{PX}^2 + V_{YP}^2 + V_{ZP}^2 - V_Z^2} \quad (9)$$

Since we are here dealing with a system for a relatively high speed forward flying aircraft, the sums of the squares of the velocity components of the aircraft may be taken as equal to the square of the ground speed, neglecting the $V_Z$ term without significant loss in accuracy in the final solution. Thus:

$$\overline{V}_G{}^2 = V_{XP}{}^2 + V_{YP}{}^2 + V_{ZP}{}^2 \quad (10)$$

In view of Equations 3, 4 and 5, Equation 10 may be written:

$$\overline{V}_G{}^2 = k_1{}^2 f_x{}^2 + k_2{}^2 f_y{}^2 + k_3{}^2 f_z{}^2 \quad (11)$$

where $f_x$, $f_y$ and $f_z$ are frequencies proportional respectively to $V_{xp}$, $V_{yp}$ and $V_{zp}$ and $k_1$, $k_2$ and $k_3$ are the constants of proportionality, respectively.

The philosophy of the present invention for solving Equation 11 to obtain ground speed is to multiply both sides of Equation 11 by $n^2/f_{gs}{}^2$ and equate to $N^2 + \epsilon$.

Then 11 becomes $$\frac{n^2 V_G{}^2}{f_{gs}{}^2} = \frac{k_1{}^2 n^2 f_x{}^2}{f_{gs}{}^2} + \frac{k_2{}^2 n^2 f_y{}^2}{f_{gs}{}^2} + \frac{k_3{}^2 n^2 f_z{}^2}{f_{gs}{}^2} = N^2 + \epsilon \quad (12)$$

where N and $n$ are constants. A frequency $f_{gs}$ is generated and controlled by a feedback loop to force $\epsilon = 0$, where $$\overline{V}_G = \frac{N f_{gs}}{n} \quad (12')$$

A digital relation which can be employed for the solution of Equation 12 is:

$$\sum_1^m (m) = 1 + 2 + 3 + 4 + \ldots + m = \frac{m^2 + m}{2} \quad (13)$$

Equation 13 can be instrumented with a counter which counts $m$ while a second counter accumulates the summation of $m$. Thus terms of Equation 12 which are the squares of the ratios of two frequencies can be formed by counting $f_x$, $f_y$ and $f_z$ for periods of time determined by $k_1$, $k_2$ or $k_3$ and the ratio of $n$ to $f_{gs}$ and simultaneously obtaining the square in a second counter. After one complete computation involving the variables $f_x$, $f_y$ and $f_z$ the number in the second counter is compared with $N^2$. The difference ($\epsilon$) is used to change the $f_{gs}$ frequency in a direction to cause it to approach the condition where $\epsilon = 0$. For $\epsilon = 0$ Equation 12' holds and the frequency $f_{gs}$ is a digital measure of the ground speed $\overline{V}_G$. Obviously the result of Equation 13 may be instrumented to correct for the factor 2 and the $m$ term. The circuits for generating a frequency $f_{gs}$ which is a digital measure of ground speed are described in detail hereinafter in relation to the Ground Speed System.

*Drift angle computation-theory*

The expression for drift angle may be derived from the ground coordinate velocity components of the aircraft given by the following equations:

$$V_X = V_{XP} \cos P + V_{YP} \sin R \sin P + V_{ZP} \cos R \sin P$$

$$V_Y = V_{YP} \cos R - V_{ZP} \sin R \quad (14)$$

$$V_Z = V_{XP} \sin P - V_{YP} \cos P \sin R - V_{ZP} \cos P \cos R$$

Drift angle, $\delta$, is defined as follows:

$$\delta = \arctan \frac{V_Y}{V_X} \simeq \arctan \frac{V_{YP}}{V_{XP}} \quad (15)$$

In terms of the plane's coordinates the drift angle can be corrected with relatively simple means for pitch and roll by using the following expressions:

$$\delta = \arctan \left[ \frac{V_{YP}}{V_{XP}} - \sin P \sin R \right] \quad (16)$$

where P is the angle of pitch and R is the angle of roll. Taking the tangent of both sides of Equation 15 we have:

$$\tan \delta = \frac{V_{YP}}{V_{XP}} - \sin P \sin R \quad (17)$$

which can be rewritten as:

$$\tan \delta = k_4 \frac{f_y}{f_x} - \sin P \sin R \quad (17')$$

In Equation 17', $\delta$ is the drift angle, $k_4$ is a constant, P is the angle of pitch, R is the angle of roll, and $f_y$ and $f_x$ are the $V_{XP}$ and $V_{YP}$ frequencies from Equations 3 and 4. For the purpose of solving Equation 17' it is written in the form:

$$i_m = -\tan \delta + k_4 \frac{f_y}{f_x} - \sin P \sin R \quad (17'')$$

With the equation in this form a solution which keeps the current $i_m$ equal to zero can be obtained by supplying currents corresponding to the terms of the Equation 17'' to a summing device and producing a null.

Currents corresponding to the terms of 17'' are obtained as follows:

A current proportional to $\tan \delta$ is derived from a tangent bridge circuit which includes a linear potentiometer operated by a servo motor. The current proportional to $\tan \delta$ is supplied to one coil of a magnetic summing amplifier.

A current proportional to the product of $\sin P$ and $\sin R$ is obtained from aircraft attitude data supplied to a multiplier and applied to a second coil of the summing magnetic amplifier.

The remaining term of Equation 17'' must be obtained in a form which permits the determination of the sign of the drift angle. An examination of FIG. B shows that the frequency shift for the front-left and back-right beams increases when the drift is to the left while the frequency shift for the front-right and back-left beams increases when the drift is to the right. Accordingly, $f_x$ can be considered to comprise two components:

$$f_x = f_L + f_R \quad (18)$$

where:

$$f_L = f_{FL} + f_{BR} \quad (19)$$

$$f_R = f_{FR} + f_{BL} \quad (20)$$

Hence from Equation 4:

$$f_y = f_R - f_L \quad (21)$$

From Equations 18 and 21 the ratio of $f_y$ to $f_x$ is:

$$\frac{f_y}{f_x} = \frac{f_R - f_L}{f_L + f_R} \quad (22)$$

which is equivalent to:

$$\frac{f_y}{f_x} = \frac{\frac{f_R + f_L}{2} - f_L}{\frac{f_R + f_L}{2}} \quad (23)$$

Since $$\frac{f_x}{2} = \frac{f_R + f_L}{2} \quad (24)$$

Equation 23 will be positive or negative depending on whether $f_L$ is less than or greater than $f_x/2$.

Equation 23 may be written:

$$\frac{f_y}{f_x} = \frac{\frac{f_x}{2} - f_L}{f_x/2} \quad (25)$$

The quantity expressed by 25 can be computed digitally by a counter which counts $f_L$ during a predetermined count, $C_x$, of $f_x/2$. The latter condition makes $C_L$, the count of $f_L$, proportional to $f_L f_x$ and 25 can be written:

$$\frac{f_y}{f_x} = \frac{(C_x - C_L)}{C_x} \quad (26)$$

Thus a counter having a capacity of $C_x$ can be used to produce an output of $C_x - C_L$ for $C_x > C_L$ by utilizing the complement of the count $C_L$ at the end of $C_x$; an output of zero for $C_x = C_L$; and a direct count output of $C_L - C_X$ for $C_L > C_X$. A current proportional to these quantities can be derived from the counter by means of a binary weighting network connected to the counter stages.

If, also, the polarity of the current derived from the weighting network connected to the counter is reversed as the count $C_L$ goes through the value $C_X$ (i.e., when the counter is full) the output current will represent the $$\frac{f_y}{f_x}$$

term of the drift angle equation in both magnitude and sense. This current is supplied to a third coil of the summing device which solves Equation 17″. The output of the summing device drives the tangent potentiometer to the position at which $i_m=0$ and hence the angular position of the potentiometer indicates the magnitude and sense of the drift angle.

The circuits for obtaining drift angle are described in detail hereinafter in relation to the Drift Angle System.

*General system description*

The block diagram of the system is shown in FIGS. 1 and 10 which comprise the data acquisition and computation sections respectively. The general description of the blocks in FIGS. 1 and 10 will be expanded hereinafter in detail for a complete understanding of the invention. The particular disclosed embodiment of the invention operates at a microwave frequency generated by a transmitter 10 which supplies a CW frequency of 8,800 megacycles frequency modulated at approximately 1.1 mc. in a predetermined fashion. This frequency modulated CW signal is applied from the transmitter 10 to a circulator and mixer device 20 which channels the energy from the transmitter 10 to an antenna 30 and channels received energy from the antenna 30 to a mixer which operates with respect to the transmitter frequency to produce an FM spectrum including a double side band signal of the fourth harmonic of the modulation frequency, plus and minus the Doppler frequency.

The antenna 30 is a planar array of slot radiators which are fed from suitable wave guide paths which include controllable ferrite switches for the purpose of directing the beam from the antenna 30 in any one of four distinct directions. The ferrite switches for controlling the beam direction of the antenna 30 are sequentially energized from a beam switch controller 40 which generates a basic 10 pulse per second timing wave for rotating the beams from the antenna 30 through the four positions sequentially and for controlling other portions of the system in synchronism with the beam switching.

The transmitter 10 is frequency modulated by a modulation generator 50 and the center frequency of the CW carrier is maintained by an AFC loop to hold antenna beam angles constant while permitting FM. The effect of altitude holes which occur in any FM/CW system whenever the modulation on the return signal is in phase with the modulation on the transmitted signal is eliminated by means of a unique modulation technique employing a waveform synchronized with the beam switching.

The fourth harmonic of approximately 4.6 megacycles from the first mixer 20 is applied as an input to a receiver 60 which produces a single side band output signal on a 500 kc. sub-carrier, sequentially modulated with the Doppler frequency spectra from the four antenna beams.

The signal output from the receiver 60 is applied to a frequency tracker 70 with the signal fed in sequence to each of four trackers associated with the four antenna beams. The four frequency trackers each have an oscillator which is voltage controlled to be servoed to match the center of the Doppler spectra in the respective beams. Although the input to these trackers is the time shared signal spectra from the receiver, the tracking oscillators operate continuously to provide four frequencies associated with the four antenna beams, precisely equal to the frequency centers of the respective Doppler spectra. These four frequencies are designated $f_{BL}$, $f_{BR}$, $f_{FL}$, and $f_{FR}$ corresponding to the beam position from which they originate and are continuously available for use by the computer circuits which follow. These four frequencies are applied to a combiner 80 which combines algebraically the input frequencies in various sum and difference combinations to generate three output frequencies which represent the three coordinates of velocity of the aircraft in which the system of the invention is installed. A fourth combination of the input frequencies to the combiner 80 provides a known resultant when the system is operating correctly and hence can be utilized by a flag alarm circuit 90 to indicate malfunctioning of the equipment. The output frequencies of the combiner 80 designated $f_x$, $f_y$ and $f_z$, contain all of the information necessary to compute the magnitude of ground velocity or ground speed and are utilized in a computer 100, shown in block form in FIG. 10, to compute ground speed. To compute drift angle, $f_x$ and $f_y$ are utilized with aircraft attitude information as derived from a vertical reference device in a drift angle computer section of the computer 100. The quantities ground speed and drift angle are indicated in the cockpit of the aircraft and operate a navigational computer to supply information as to present position relative to a preassigned course.

The general arrangement of a complete navigation system for this purpose is shown in FIG. 2. The Doppler radar 1 receives heading information from a compass 2 and pitch and roll data from a vertical reference device 3. The radar 1 operates to produce ground speed and drift angle values which are indicated on an indicator 4. A navigation computer 5 receives ground speed and drift angle information from the radar 1 and heading information from the compass 2. The navigation computer 5 can be set for a desired course angle and distance and utilizes the input data to compute course error, miles to go to destination and the offset or distance off course. These quantities may be supplied to an indicator 6 for use by the pilot in making good the course or supplied to an autopilot 7 for automatic control of the aircraft. To enable the system to be used to navigate courses of two or more consecutive portions the navigation computer 5 can be substantially duplicated. The data for the next subsequent portion of the course can then be set into the idle half of the computer 5 and the flight data transferred to operate relative to the new course when the present course is completed as indicated by zero indications on the miles to go and offset indicators.

*Antenna array and feed system*

The antenna and feed system 30 are shown in top plan view in FIG. 3, in side elevation in FIG. 3a and in end elevation in FIG. 3b. The assembly consists of two identical units 301, 302 which are mounted in the side-by-side position shown or an end-to-end position implied by the dashed lead line from reference character 301, on the under surface of an aircraft with the lower surface of the antenna exposed toward the ground. The units 301 and 302 are reversed in position to provide the front-right and front-left beams from the unit 301 and the back-left and back-right beams from the unit 302. The unit 302 has mounted thereon an input waveguide coupling 303 which supplies energy from the transmitter klystron to a circulator 305. The circulator 305 passes input energy from the coupling 303 through an orthogonal coupler 305a to a ferrite rotator 305b which also functions as a front-back switch. A portion of the transmitter power input from the coupling 303 is furnished to a branch arm 306 through local oscillator coupler 304. Energy received by the antenna passes out a second branch arm 307 of the circulator 305a and the energies in branch arms 306 and 307 are applied to a mixer assembly 308. The output from the mixer 308 is obtained on line D which supplies the receiver 60.

For dual system operation a second mixer 308′ is located next to the mixer 308 and supplied through power dividing hybrid coupling devices, not shown, from the lines 306 and 307. The application of power from the two klystrons of a dual system is controlled by a ferrite switch 372 having two inputs 373 and 374. The ON system klystron is coupled to one input 373 and the STANDBY system is coupled to the input 374. Selection of the ON or STANDBY system klystron as a source of power applies a D.C. control to the switch 372 to couple the oscillating klystron to the input of the antenna operation.

The additional R.F. structure in the antenna system for dual operation is indicated for FIG. 3 only and is not shown in FIGS. 3a and 3b.

The circulator-switch 305 alternately supplies energy to a front left-right ferrite switch 309 and a back left-right ferrite switch 310. The left-right switches 309 and 310 operate in the same manner to shift the forward and rear beams obtained from antenna units 301 and 302, respectively, and hence a description relative to the unit 302 will suffice for both. Energy supplied to the rear antenna unit 302 by the energization of the front-back switch 305b to the back antenna condition passes through the left-right switch 310 to separate waveguide connectors 311, 312. Energy applied to the connector 311 passes through a three-way power divider 313. A pair of equal length side arms 314, 315 transmit energy to mitre corner elements 316, 317, respectively. A third output 318 of the power divider supplies energy to a short slot hybrid coupler 319 which supplies energy on a direct output 320 and a coupled output 321. The output 321 supplies another short slot coupler 322 which has a direct output 323 and a coupled output 324. Energy from the mitre corner 316 is similarly coupled to a short slot coupler 325 having a coupled output which feeds another slot coupler 326. Energy from the mitre corner 317 is applied to a short slot hybrid 327 which couples energy to feed another short slot hybrid coupler 328. Energy from the direct output 320 of the hybrid 319 is fed to another hybrid coupler 329 by means of an E plane bend 330. Similarly, the hybrids 325 and 327 supply the input to additional hybrids 331, 332. The arrangement of the six hybrids therefore provides three upper hybrids 326, 322 and 328 which are positioned over and offset approximately one waveguide width with respect to a lower set of hybrids 331, 329 and 332. The two outputs from each of the six hybrids are connected to feed alternate waveguide in a set of twelve parallel waveguides 341-352 the opposite wall of which has therein the slot array which forms the radiating elements of the antenna. The outputs of the upper set of hybrids supply alternate waveguides of the set 341-352 interdigitated with the feeds from the lower set of waveguides as shown.

The other output of the ferrite switch 310 supplying output waveguide 312 is coupled through H and E plane corners to a lower three-way power divider having outputs 318′, 316′ and 317′. It will be noted that 316′ and 317′ are interchanged relative to the elements 316 and 317 corresponding to the interchanged position of the feed lines 311 and 312 relative to the power dividers. Thus, the phasing in the waveguide antenna elements 341-352 for power fed into the upper input line 311 will be a phase progression in one direction while exactly the opposite phase progression across the elements 341-352 will occur for power fed into the input line 312. The corresponding hybrids 325′, 319′ and 327′ feed the output six hybrids 331, 326, 329, 322, 332 and 328 with a reversed phase progression across the twelve waveguides 341-352 in comparison to the phase progression which obtains when the waveguides are fed by the hybrids 319, 325 and 327.

The phasing of the array can be understood from a description of the components appearing in FIG. 3 and the schematic diagram of FIGS. 3d. In FIG. 3d, waveguides are represented as solid lines. The lines of the bottom feed arrangement are connected to the lines of the top feed arrangement at designated points R. Hybrid junctions are shown as dashed line boxes enclosing the symbol X. The power divider 313 has reflecting and matching posts 335 and adjustable phasing plungers 336 in the output lines from mitre corners 316 and 317. Thus, the phase at the input to hybrid 325 is plus 180 degrees relative to the input to hybrid 319 and the phase at the input of hybrid 327 is minus 180 degrees as obtained by suitable iris phasing devices in the lines 314, 315 and the adjustable plungers 336. The characteristic of the hybrid slot couplers is to introduce a lag of 45 degrees for the straight-through coupling and a lag of 90 additional degrees for the offset output branch. Accordingly, the output of hybrid 319 at 320 is minus 45 degrees relative to zero degrees input thereto and the output 321 is minus 135 degrees. Relative to the same reference phase the straight-through output of hybrid 325 is 135 degrees and the offset output thereof is 45 degrees. The E bend between hybrid 325 and hybrid 331 produces an additional 45 degrees to make the input to 331 90 degrees and a straight-through output thereof 45 degrees. Thus the phase of the output to the waveguide array 341 can be considered to be plus 45 degrees since the feed lengths from the six output hybrids are all the same electrical length and introduce no relative phase shift. This electrical length is achieved by an end wall termination 361 in the alternate guides which have E-plane bends which are connected to the even numbered waveguides 342-352, in conjunction with a common wall edge 362 which forms a communicating passage 363 between the feed guide and the respective array guide. The odd numbered feed guides 341-351 have a common wall edge 364 which makes the path length as long as that of the even numbered feed guides.

The offset output of hybrid 331 is −90 degrees lagging the straight-through output so the waveguide 343 has a reference phase of minus 45 degrees. The 45-degree input to hybrid 326 appears at the straight-through output thereof as zero degrees which establishes the phase at the input of waveguide 342 as zero degrees. The outset output of hybrid 326 establishes the phase at waveguide 344 as −90 degrees. The output of hybrid 319 at 320 is at minus 45 degrees and the E bend 330 makes the input to hybrid 329 minus 90 degrees. Accordingly, the straight-through output from the hybrid 329 is minus 135 degrees and the phase of waveguide 345 is this same phase. The offset output of hybrid 319 at 321 is minus 135 degrees which produces a straight-through output of hybrid 322 of minus 180 degrees. The offset of hybrid 322 is minus 270 degrees and the offset output of hybrid 329 is minus 225 degrees. In similar manner, it is apparent that the phase of the input of the remaining waveguides 349-352 progresses 45 degrees in phase to provide the desired phasing distribution. This phase progression directs the beam approximately 10 degrees from the normal to the plane of the antenna and a reversal of the phase progression reverses the 10 degree direction. The phase relations as just described are indicated in FIG. 3d which is a schematic diagram of the phasing waveguide connections.

In each instance the fourth arm of the input hybrids 325, 319, 327, 327′, 319′ and 325′ is terminated in a resistive load 337.

The power-division provided by the reflecting post 335 produces power levels in the waveguides 314 and 315 which is one-half that which proceeds through the output waveguide 318. Thus, normalized input to the waveguides 345, 346, 347 and 348 is unity power while the four waveguides on either side of the center four waveguides receive half power each.

FIG. 3c shows a plan view of the slot array formed in the exposed wall of the waveguides 341-352. The individual slot arrays in the respective waveguides 341-352 are designed for an H plane Tschebyscheff distribution with 30 db side lobes modified by the elimination of the two end slots which are normally energized to higher amplitude than adjacent slots. The unradiated portion of the power traveling down the waveguide arrays is absorbed in a resistive load which terminates each waveguide and is secured by the end plate 353. The slot spacing along the array was chosen so that the beam formed by the antenna is displaced approximately 23½ degrees from the normal to the array. To obtain this beam angle, close slot spacing along the array was required and the slot coupling was modified to take into account the mutual coupling therebetween. As previously stated, the center four arrays 345, 346, 347, 348 receive unity power while the outside four waveguides 349–352 and 341–344 receive half power relative to the center four. The array of slots in the center four waveguides 345–348 are identical as is the array in waveguides 344 and 349. Since waveguides 344 and 349, however, are fed at half power a taper in the E plane is accomplished by virtue of the half power feed to the outside four waveguides on each side of the four center waveguides and, in addition, the slot spacing relative to the center line in the outside three waveguides is reduced progressively to reduce the radiated power from the outside three waveguides. Thus, waveguide 343 couples more energy out than waveguide 342 which in turn radiates a greater amount of power than the outside waveguide 341 which has the slots closely spaced to the center line of the waveguide and thus radiates the least power. The excess power not radiated by the outside waveguides is dissipated in the load devices at the end of the waveguide adjacent plate 353. It will be noted that the spacing of slots from the center line of the respective waveguides at the end adjacent the terminating load device 353 couples more energy from the guide than the spacing of the slots at the input end thereof. This increased coupling compensates for the diminished amount of energy actually in the guide near the terminated end thereof and aids in producing the Tschebyscheff distribution in the H plane.

The phasing irises in branches 314 and 315 together with the spaced plungers 336 which are adjustably inserted in the feed waveguides provide the phasing adjustments to obtain the phase progression shown in FIG. 3d. To provide impedance matching triple stub tuning posts 365 are provided to project adjustably into the feed waveguides.

A pair of oppositely directed antennas as shown in FIG. 3 and controlled by the feed system described is well suited therefore to provide four beams equally spaced front and back and on the right and left sides of an aircraft which can be sequentially directed by suitably applied control signals to the ferrite switching devices 305, 309 and 310. As finally installed in the aircraft, the exact position or angular location of the beams can be adjusted by means of the phasing devices 336 which are provided on the branch feed lines for each of the right and left feed systems. For convenience, however, the beam position is established by factory adjustment of the antenna in a frame 371 in which it is shimmed and staked. The frame 371 containing the antenna may then be mounted in predetermined relation to the aircraft coordinates.

*Beam switch controller*

The beam switch controller 40 is shown in detail in FIG. 4 for providing the basic control of the beam switching and associated switching functions in the system. The control frequency is derived from a 40 cycle per second oscillator 401 which employs a double base diode 402 in a relaxation oscillator circuit. The frequency generated by the oscillator 401 is applied to a first flip-flop circuit 403 composed of a pair of ORN circuits. The 20 c.p.s. square wave generated by the flip-flop 403 is applied from the ONE output to a second flip-flop 404 while the ZERO output of flip-flop 403 is applied to a flip-flop 405. The ONE output of flip-flop 404 after suitable amplification in transistors 406, 407 controls the current in right antenna coils 411. The ZERO output of flip-flop 404 is amplified through transistors 409, 410 to control current flow through left antenna coils 408. These transistor circuits control the flow of current between On and Off conditions in the antenna coils 408 and 411 in accordance with the 404–1 and 404–0 waveforms shown in FIG. 4a. These waveforms are 10 cycle per second square waves which alternately select the right or left position for the antenna beam. The ONE output of flip-flop 405 is amplified in transistors 412, 413 to control current in the front antenna coil 414 and the ZERO output of flip-flop 405 is amplified in transistors 415, 416 and applied to control current in the back antenna coil 417.

The control of current in the front-back antenna coils 414, 417 is in accordance with the On-Off conditions represented by the 405–1 and 405–0 waveforms of FIG. 4a which are in a 90° phase relation with respect to the 404–1 and 404–0 waveforms. Thus, as shown and indicated in FIG. 4a, the individual antenna coils will draw current when the respective square wave is on the negative portion of the cycle and the position of the antenna beam therefore will be determined by the two waves which are negative at any given instant. The antenna beam position for a complete cycle will therefore consist of four intervals as indicated in FIG. 4a the interval FL being for beam position front-left, the interval FR for position front-right, BL for back-left and BR for back-right. A circuit to insure clockwise rotation of the antenna beam comprises a capacitor 426 connected to the ZERO output of flip-flop 405 and a diode 427. The capacitor 426 and diode 427 constitute a differentiating and clipping circuit to supply a negative pulse on line 428 to the input of the ZERO side of flip-flop 404 each time flip-flop 405 is set to ONE. Only if flip-flop 404 has the ZERO side conducting when a negative signal occurs on line 428 will no change occur. Consequently, when the equipment is initially energized and oscillator 401 commences the beam switch sequence, the negative pulses occurring on line 428 will rest flip-flop 404 in a manner to insure clockwise beam rotation. This cycle repeats for the 10 cycle square waves shown in FIG. 4a on a continuous basis.

In addition to controlling the front-back antenna coils, the flip-flop 405 has its ONE output connected to output line A for controlling the stepwave generator in the modulation generator circuit 50.

Associated with the beam switch controller circuit is a test circuit comprising a 6,984 cycle per second oscillator 421 and a 5,243 cycle per second oscillator 422. The outputs of oscillators 421, 422 are connected through oppositely poled diodes 423, 424, respectively, to an output transistor 425. The signals from the oscillators 421, 422 are alternately switched to the input of transistor 425 by means of the control square wave applied from the ZERO output of flip-flop 403. This square wave is a 20 cycle per second control wave which on alternate half cycles passes the outputs of the oscillators 421, 422 through the transistor 425 for use as a test signal at the receiver by connection over line B to amplitude modulate the fourth harmonic of the modulation frequency from oscillator 502. When this test circuit is energized, it introduces into the system signals which are equivalent to the Doppler signals received from the four beams for a 600 knot ground speed and a 20° left drift.

*Transmitter and modulation generator block diagram*

The transmitter 10 and modulation generator AFC loop 50 are shown in FIG. 5. The 10 cycle per second square wave on line A is applied to a step generator 501 which comprises three flip-flop circuits which count down to a frequency of approximately 1.25 cycles per second as the repetition interval for the modulation waveform. This circuit achieves an eight level square wave pattern by means of the circuit shown in FIG. 5a with the waveform being indicated in FIG. 5b. A one megacycle modulation oscillator 502 which is voltage tuned by the step wave from the generator 501 produces a sinusoidal frequency between 1.1 and 1.2 mc. at eight distinct modulation frequencies caused by the modulation wave from step generator 501. This sequence of modulation frequencies is applied with adjustable magnitude by means of potentiometer 503 to the repeller electrode 101 of a klystron 102 in the transmitter 10. The output of the klystron 102 is coupled to input coupling 303 in the antenna 30. A portion of the FM/CW wave supplied to the antenna 30 from the klystron 102 is sampled by a coupling device 103 and applied to a reference cavity 104. An output coupling 105 couples energy from the cavity 104 to a detector 106 which applies the resultant variable phase signal of approximately 1.1 mc. to an AFC-IF amplifier 504 in accordance with the klystron frequency relative to the peak resonance of the cavity 104. A signal is also supplied from the detector 106 to terminals 505 for a crystal current indicator to indicate oscillation in the klystron 102 of the transmitter 10. The amplified IF signal from the AFC amplifier 504 is applied to an AFC phase comparator 506 for comparison with an equal frequency signal from the modulation oscillator 502 which is amplified through a reference phase amplifier 507. The pass band of the AFC phase comparator 506 extends from D.C. to approximately 50 kc. for the purpose of obtaining AFC determination of the center frequency of operation and at the same time providing a high gain feedback correction loop which operates to reduce frequency deviations which occur at a rate within this pass band. Since most mechanical vibrations, power supply ripple, and similar disturbances which could affect transmitter frequency are within this frequency band, the actual frequency deviation due to these causes is reduced by a factor equal to the gain of the feedback loop. The output of the phase comparator 506 is passed through an A.C. isolation device 508 which isolates the comparator 506 from the one megacycle signal derived from potentiometer 503 and thus applies a phase correction signal to the repeller 101 of klystron 102 superposed on the one megacycle modulation signal.

With the arrangement shown and using a Bomac fixed tuned klystron tube type BL-829 a high degree of frequency control is obtained. To reduce incidental AM resulting from the FM voltage applied to the klystron, and maintain constant power output the internal cavity of the klystron is broadly tuned with a relatively flat-topped response characteristic. For accurate frequency control, however, the reference cavity 104 has a very sharp response characteristic and the control of the klystron 102 is centered at the peak of the sharp response characteristic of the cavity 104 as shown in FIG. 5c. This arrangement permits the AFC system to operate up to a response frequency of approximately 50 kc. which eliminates undesirable FM in the klystron due to mechanical resonance, power supply ripple and other low frequency disturbances and the like and at the same time enables the system to hold the klystron center frequency within one or two megacycles of 8800 mc. The short term stability of the klystron 102 is, therefore, sufficient to provide an accurate coherent source for use in recovering the Doppler modulation from return signals and the long term stability maintains the antenna beam angles constant.

The output of the modulation oscillator 502 is applied to a cross-over amplifier 509 also shown in FIG. 5A which provides interconnection for dual system operation and which applies the one megacycle modulation signal to a doubler circuit 511 from which is transmitted on line C a two megacycle signal to the receiver 60.

In FIG. 5A an eight level step generator 501 is shown to comprise three ORN circuit flip-flops 512, 513 and 514. A ten-cycle per second square wave from the ONE output of flip-flop 405 is applied to flip-flop 512 after differentiation on line 515. The output of flip-flop 512 is applied on line 516 to flip-flop 513 and the output of flip-flop 513 is applied on line 517 to the input of flip-flop 514. The collector of transistor $Q_1$ is connected through a resistor 518 to a line 519. The collector of transistor $Q_3$ in flip-flop 513 is connected through resistor 521 to line 519 and the collector of transistor $Q_5$ in flip-flop 514 is connected through resistor 522 to line 519. Line 519 is also connected through resistor 523 to the negative 12-volt supply bus.

Line 519 is connected to the junction of voltage variable capacitors 524 which are across the tank circuit 525 of an oscillator 502 which is nominally one megacycle. The operation of the step wave generator 501 for varying the oscillation frequency of the oscillator 502 can be explained with reference to FIG. 5b which is drawn to the same time scale as FIG. 4A. The output of the One side of flip-flop 405 triggers flip-flop 512 to produce at the collector of transistor $Q_1$ the waveform designated $Q_1$ in FIG. 5b. The action of the three flip-flops 512, 513 and 514 therefore provides at the ONE outputs of the corresponding transistors the waveforms indicated as $Q_1$, $Q_3$ and $Q_5$. The presence of the weighting resistors 518, 521 and 522 makes the contributions in voltage on line 519 from each of the transistors $Q_1$, $Q_3$ and $Q_5$ approximately a binary progression in which $Q_1$ contributes a value of four, $Q_5$ contributes a value of unity and $Q_3$ contributes a value of two. Combining the magnitudes of the waveforms $Q_1$, $Q_3$ and $Q_5$ in accordance with these weighting values produces the waveform 527 which is an eight value step wave which is repetitive after eight distinct intervals equal to the half period of the waveform $Q_1$. Accordingly, the modulation generator oscillator 502 is changed in frequency to eight discrete values by the action of the waveform 527 on the voltage controlled capacitors 524 and this modulation signal is applied to the modulation potentiometer 503 by line 528. The same modulation signal is applied by line 529 to a crossover amplifier 509 which supplies the modulation signal on output line 531 to the second transmitter of a dual installation. A dual installation provides maximum reliability by providing two complete systems connected to one antenna and controlled by cross-over amplifiers 509 and 509'. Conventionally, each system will be operated with the transmitter tube filament energized but operating potentials to the other klystron electrodes energized in only one transmitter. For this condition the modulation and receiving and computing circuits of both installations will operate with the ON transmitter to provide dual system operation. Should the transmitter fail a switch control is provided to select the STANDBY transmitting klystron and apply operative potential thereto. In normal operation, the cross-over amplifier in the ON system applies by line 531 a modulation signal to the STANDBY system's cross-over amplifier 509' at a point identical with line 531 shown in FIG. 5A. Upon selection of the STANDBY system's klystron transmitter for operation, a twelve-volt potential on line 532 is removed. Removal of this twelve-volt potential on line 532 permits transistor 533 to amplify the modulation signal incoming from the STANDBY system on line 531 and apply the same to frequency doubler 511. For the reverse condition, i.e., the transmitter of the ON system to be used with the frequency doubler, receiver and computer circuits of the STANDBY system, the stepped modulation signal goes out on line 531 and the twelve volt potential on line 532 is present. For this condition, the diode 534 is back biased, so that signals on line 529 are amplified in transistor 533. Collector signals at transistor 533 pass to the frequency doubler 511 while the signal at the emitter passes through line 531 to the STANDBY system. Accordingly, the modulation signal from the ON system circuits is applied to heterodyne the receiver of the STANDBY system.

*Receiver*

The receiver 60, shown in block diagram form in FIG. 1, receives an input signal on line D from the circulator and mixer 20. This signal is a Doppler spectrum on the fourth harmonic of the modulation frequency which is approximately 4.6 megacycles. The signal is selectively amplified in a 4.6 megacycle IF amplifier 601 and mixed in a second mixer 602 with the fourth harmonic of the modulation frequency obtained from a frequency doubler 603. The frequency doubler 603 doubles the second harmonic frequency applied thereto on line C from the modulation generator 50. The output of the mixer 602 is the audio Doppler frequency spectrum $f_d$ which is amplified in an audio amplifier 604 which supplies one input to balanced modulator 605. The action of the mixer 602 eliminates the effect of any energy which enters the receiver directly from the transmitter 10 or from reflections in the antenna 30 since these components will be heterodyned with the fourth harmonic of the modulation frequency and produce zero beat. Since the amplifier 604 is A.C. coupled and has only an audio response, any zero beat is not passed while the Doppler shifted energy produces an audio frequency Doppler spectrum without carrier. The other input to the balanced modulator 605 is obtained from a 500 kilocycle crystal controlled oscillator 606. The balanced modulator 605 produces an output of a 500 kilocycle carrier amplitude modulated with plus and minus the components of the Doppler frequency spectrum $f_d$. This signal is applied to a crystal single side band filter 607 which selects the upper side bands for transmission and applies the 500 kilocycle plus $f_d$ signal to an IF amplifier 608. The output of amplifier 608 is applied on line E to the frequency tracker 70.

*Sequencer and frequency tracker*

The sequencer and frequency tracker 70 are shown in a more detailed block diagram in FIGS. 7a and 7b. The sequencer and frequency tracker 70 receive the 500 kc. IF signal on line E, the antenna switching coil signals on line F and an AGC potential from the receiver on line G. The sequencer receives on line F a front-back square wave and a left-right square wave and the inverse waves, respectively, as derived from the antenna coil pickup circuits which waves correspond with those shown in FIG. 4a. The four lines from input F are connected to the decoder comprising coincident circuits 701, 702, 703 and 704. With the connections made as shown the output of the respective coincident circuits 701–704 are time sequential switching pulses corresponding in time with the four beam positions. The individual outputs from the coincident circuits 701–704, indicated by waveforms FR, FL, BL, BR in FIG. 7, are therefore available for switch control operation to enable circuits for an interval corresponding to one position of the antenna beam for each coincident circuit. One of the four tracker circuits will now be described in detail with the connections to the remaining three identical circuits indicated.

The 500 kc. IF signal on line E is applied to balanced diode mixers 705, 706 where it is compared with a voltage controlled oscillator signal applied to an input terminal 707 where it is split, passing both through a lagging 45° phase shifter 708 and a leading 45° phase shifter 709. The outputs of the mixers 705 and 706 are audio spectra which bear a 90° phase relationship to each other due to the phase differences of the inputs from terminal 707 to the mixers. This relative phase is such that the output of mixer 705 leads the output of mixer 706 by 90° when the frequency on line E is higher than the input on input terminal 707. Conversely the relative phase of the output of 705 lags the phase at the output of mixer 706 by 90° when the frequency on line E is lower than the frequency on input terminal 707. The resultant audio spectra are further shifted 90° in phase relative to each other by means of phase shifters 711 and 712. Each frequency component in the audio spectrum at the output of phase shifter 711 has a corresponding frequency component in the output of phase shifter 712. However, the relative phase between these two components will be either zero degrees or 180 degrees depending on the relative frequency of their equivalent component in the 500 kc. spectrum on line E and the oscillator frequency on input terminal 707. The output of phase shifter 711 is amplified in an audio amplifier 713 and passsed through an audio switch 714 to one input of a balanced demodulator 715. The output of the audio amplifier 713 is also applied to three other transistor audio switch circuits similar to switch 714 in identical tracking oscillator circuits 720, 720', 720'' for the remaining three beam positions. The output of the phase shifter 712 is amplified in an audio amplifier 716 and applied as the other input to the demodulator 715. The output of the amplifier 716 is also connected to the respective demodulators in trackers 720, 720', 720'' corresponding to the other beam positions. The output of the demodulator 715 is a D.C. voltage of either positive or negative polarity depending on the summation of effects of the relative phases of its two input spectra. This voltage is integrated in an integrator 717 and the integrated voltage therefrom is applied to a voltage controlled 500 kilocycle oscillator 718. The frequency of oscillator 718 is applied to the combiner 80 on line J along with the frequencies from the other oscillators in trackers 720, 720', 720'' corresponding to the other beam positions. The output of the oscillator 718 is transmitted through a diode switch 719 which is controlled by the output of coincident circuit 704 and is applied in time sequence with the switched output from the other voltage variable oscillators in trackers 720, 720', 720'' on line 721 as the input reference voltage at the point 707.

The acquisition of the Doppler spectra in the frequency trackers is accomplished by slewing the voltage controlled oscillator 718 and the corresponding oscillators in the trackers 720, 720', 720'' by means of a 400-cycle per second injected signal. This 400-cycle signal is passed through a slew rate control circuit 722 with a variable amplitude corresponding to the signal on line G from the receiver. Thus, the slew rate will be controlled by the AGC potential on line G to permit rapid slewing for strong signals and slow slewing for weak signals where acquisition is difficult. The slewing is accomplished by applying a 400-cycle per second signal through a slew gate 723 and switched slew gate 728 to supply an audio signal to the respective audio amplifiers 716 and 713. For no frequency correspondence between the input signals to the mixers 705, 706, the output of the demodulator 715 provides a D.C. slewing signal derived from the injected 400 c.p.s. to vary the frequency of voltage controlled oscillator 718 over a predetermined range of approximately 500 kc. to 520 kc. A frequency lock detector circuit is arranged to interrupt the slewing cycle when a spectrum signal has been acquired by the tracker. For this purpose a 250 cycle per second signal from an audio oscillator 724 is applied to frequency modulate the 500 kilocycle signal of the oscillator 718. When the slew voltage from the demodulator 715 has varied the frequency of the oscillator 718 to be equal to the center frequency of the spectrum on line E, the 250 cycle modulation appears at the output of the demodulator 715 as a 250 c.p.s. audio component. The output from the demodulator 715 is amplified in a selective amplifier 725 providing selective amplification of the 250 c.p.s. signal. The output of the amplifier 725 is applied to a coherent phase detector 726 which has a second 250 c.p.s. input from the oscillator 724. Since the phase of the demodulated 250 c.p.s. component is determined from the S-curve characteristic of the tracker loop, phase coherence between this component and the reference 250 c.p.s. from audio oscillator 724 can only occur when the voltage controlled oscillator frequency lies very near the center of the 500 kc. input spectrum to the tracker. Any noise component on or near 250 c.p.s. appearing at phase detector 726 gives an averaged output of zero since its phases are random with respect to the reference signal. The output of the phase detector 726 is amplified in a D.C. amplifier 727 and applied to a switched slew gate 728. The slew gate 728 is conditioned by the switching output of coincident circuit 704 to apply the 400 c.p.s. signal from the circuit 722 to the audio input of the amplifier 713. Thus, as each tracking oscillator in trackers 720, 720′, 720″ corresponding to the oscillator 718 is switched sequentially for tracking, a frequency slewing 400 c.p.s. signal will be applied so long as the output of phase detector 726 produces no D.C. voltage to the input of the slew gate 728. Upon the occurrence of correspondence between the frequency of oscillator 718 and the center of the spectrum applied on line E, the output from D.C. amplifier 727 disables the slew gate 728 to remove the 400 c.p.s. slewing voltage. The closed loop around oscillator 718 thereafter tracks the signal on lead E so long as a spectrum is present. The respective slew gate 728 in each tracker therefore terminates slewing in the tracker which is tracking but will reinstitute slewing for any tracker in which signal fails since the corresponding loss of the 250 c.p.s. signal in phase detector 726 reestablishes the application of slewing signals through gate 728.

An AND circuit 729 receives input voltages from D.C. amplifier 727 and the corresponding amplifiers in trackers 720, 720′, 720″. The output of circuit 729 is connected to a flag alarm circuit to indicate when less than four inputs exist (i.e. whenever all of the trackers are not tracking), and thereby supply on line M a 12-volt signal from the flag alarm relay to enable slew gate 723. When all trackers are tracking, the signal on line M disables slew gate 723 to remove the 400 c.p.s. slew signal from amplifier 716.

The synchronous detector of FIGS. 7a and b is shown in greater detail in FIGS. 7c and 7d. An input transformer 731, receives signals from line E and applies the signals to the base of a transistor 732 which acts as a phase splitter to supply balanced signals to a pair of diodes 733, 734. The transformer 731 supplies identical signals through a transistor 735 to a second pair of diodes 736, 737. From the input terminal 707 a leading signal is applied to the junction point of diodes 736, 737 by means of the capacitive network 738 and transistor 739. A lagging signal is applied by means of the inductive circuit 741 and transistor 742 to the junction of diodes 733, 734. The outputs of the two synchronous detector circuits just described are amplified respectively by transistors 743, 744 and produce identical amplitude output signals corresponding to the frequency difference between the frequencies applied to terminal 707 and the frequency components of the spectra on line E. The output signals of transistors 743 and 744 are in quadrature however, due to the 45° leading phase angle of the circuit 738 and the 45° lagging phase angle characteristic of the circuit 741. A further 90° phase shift is introduced between these signals by utilizing identical R-C current splitting networks in each channel. However, in one channel the signal current through the resistor is utilized while in the second, the current through the capacitor is utilized. The current through transistor 743 divides between resistor 745 and capacitor 746, one being displaced 90° in phase from the other. The current in resistor 745 flows to the emitter of a grounded base transistor 775 which operates as a low impedance current-fed device.

The current through transistor 744, on the other hand, splits between resistor 748 and capacitor 747, which are respectively identical in value with resistor 745 and capacitor 746. In this case it is the current through capacitor 747 which is fed to a grounded base transistor 776. Its input current is therefore displaced 90° with respect to that in transistor 775. These signals are translated through substantially identical channels to provide symmetrical high frequency attenuation obtained by means of shunt capacitors 730 and with good low frequency response obtained by direct coupling by the use of complementary type transistors in tandem. The 90° phase relation which is obtained irrespective of frequency due to the resistive current flowing into transistor 775 and the capacitive current flowing into transistor 776 together with the high frequency roll-off, produce an S-curve with the cross-over at the frequency of oscillator 718. This S-curve is always centered at the frequency of oscillator 718 since the 90° lead or lag determined by the relative frequencies on line E and terminal 707 produces a zero or 180° phase relation in the inputs to demodulator 715 due to the additional 90° relative shift in circuits 711 and 712. Consequently, the output of the phase demodulator 715 will be positive or negative depending on the relative frequencies on line E and terminal 707 and this D.C. output integrated in integrator 717 servos the oscillator 718 to the frequency where the spectrum components on line E which produce a positive output from demodulator 715 just balance those producing a negative output. This discriminator-type characteristic is obtained without the use of any tuned circuits and is always symmetrical. Hence, the output of the circuit 715 will be zero whenever the S-curve is symmetrically positioned over the power spectrum of the Doppler signal. The frequency of oscillator 718 is, therefore, precisely the center frequency of the Doppler spectrum.

Figure 7E:
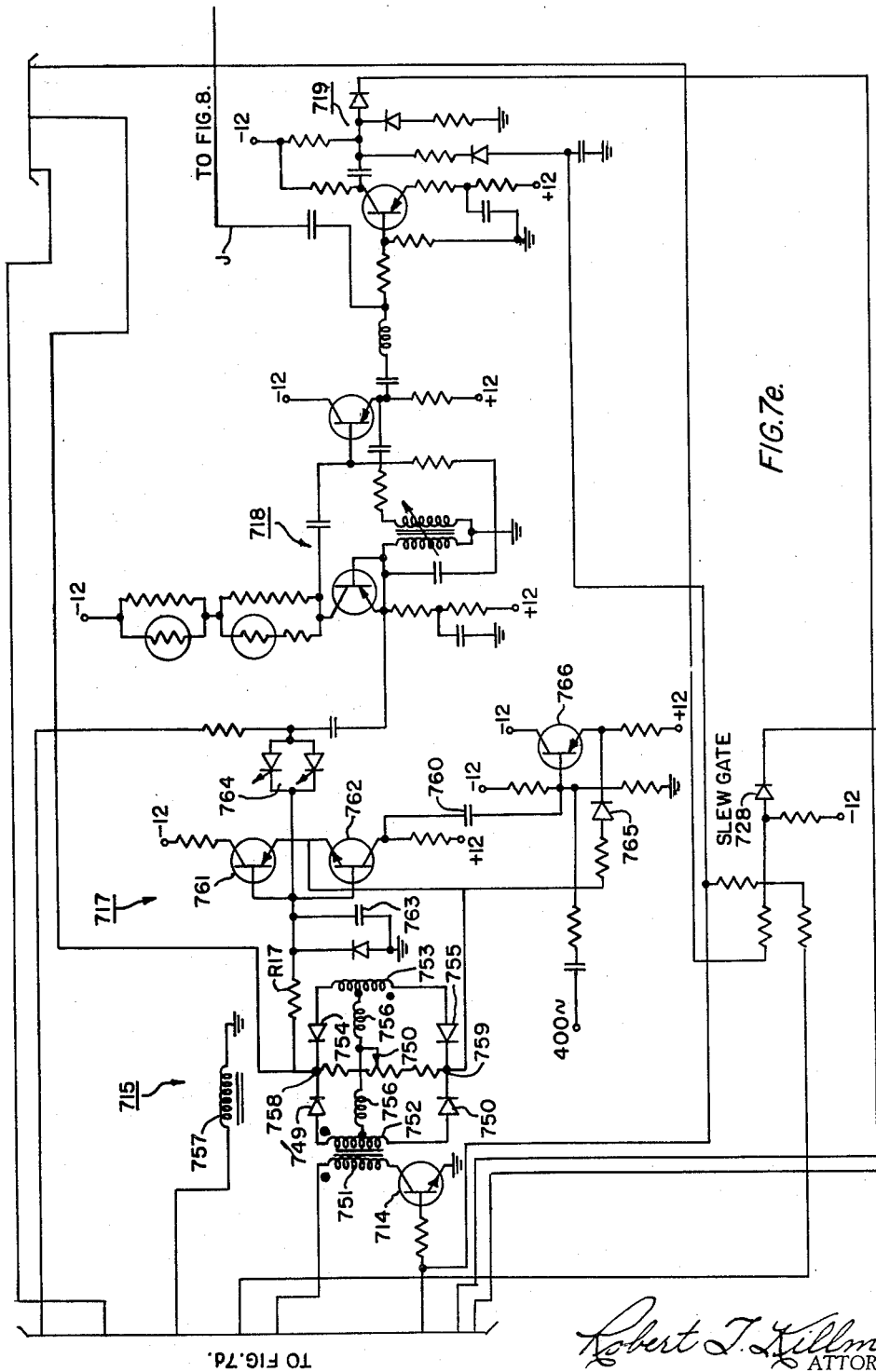

In FIG. 7e the synchronous demodulator 715 and the integrator 717 are shown in detail. Switched audio signals from the amplifier 713 are applied to a primary 751 of a transformer having a secondary 752 which energizes the balanced demodulator 715 comprising bridge connected diodes 749, 750 and an additional secondary 753 connected to diodes 754, 755. The phase of secondaries 752, 753 is opposite as indicated. The addition of secondary 753 and diodes 754, 755 makes the circuit a full wave phase detector which utilizes both polarities of the input waves and is insensitive to distortion since it is introduced symmetrically. The respective mid taps of the secondary windings 752 and 753 are connected to a secondary winding 756 which is energized from a primary winding 757 to which the amplifier 716 supplies the unswitched audio signal. Since two inputs are required to produce an output only one input needs to be switched. The output of the demodulator is taken between terminals 758 and 759 which are connected by a resistance branch having a balancing adjustment tap 750 connected to the mid tap of secondary 756. This output is supplied to an integrator circuit comprising complementary transistors 761, 762 connected relative to an integrator capacitor 763 in a Miller feedback circuit. The integrator 717 consists of two complementary transistor circuits 761 and 762. For a given D.C. polarity from the demodulator 715 only one of the transistors 761, 762 conducts. If, for instance, a negative voltage is coming out of the demodulator, transistor 761 charges storage capacitor 763. The transistor 762 is back-biassed and appears as a high impedance from the emitter of transistor 761 to the positive supply voltage. As the voltage increases across capacitor 763 the emitter voltage of transistor 761 follows and adds an increasing voltage to the voltage coming from the demodulator 715. This produces a linear rise across capacitor 763 wth respect to time. During the OFF time of the tracking loop there is no information coming from the demodulator 715 and the integrator then has to hold the charge across capacitor 763. The boot strap feedback increases the time constant of capacitor 763 and resistor R17 when the voltage across the capacitor 763 tries to change. This provides an opposing effect which prevents the capacitor from discharging. The voltage on the capacitor 763 is applied to Varicap capacitors 764 which vary capacitance in accordance with the voltage applied thereacross and thereby are capable of controlling the oscillation frequency of oscillator 718 in accordance with the voltage on the capacitor 763.

During the slew operation when the oscillator 718 has reached a frequency in the neighborhood of 520 kc. it is desirable to discharge the integration capacitor 763 and recycle the search operation beginning at the 500 kc. frequency. For this purpose a discharge circuit comprising a diode 765 is connected to be back-biassed by connection to the emitter of a transistor 766. Transistor 766 is normally biassed ON with a positive potential on its base. Since this transistor is in an ON condition the voltage on the emitter is approximately the same as the potential at the base. Diode 765 therefore has a positive potential at its cathode and over the normal frequency range the voltage across capacitor 763 varies from zero corresponding to about 500 kc. to plus 4 volts at 520 kc. The voltage at the emitters of the transistors 761, 762 have approximately the same potential and this means that the diode 765 is normally cut off between 500 kc. and 520 kc. As soon as the voltage across capacitor 763 reaches the potential that appears at the cathode of diode 765 this diode will start to conduct and will discharge storage capacitor 763 through the base of transistor 762, through diode 765, through the collector junction of transistor 766 to minus 12 in a regenerative cycle. The resultant drop in collector voltage on transistor 762 couples through capacitor 760 to transistor 766, making this action regenerative. A 400~ signal is applied to the base of transistor 766 to aid the discharge action for slow slew rates.

*Frequency combiner*

The frequency combiner 80 is shown in detail in FIG. 8. The input signals to the combiner 80 are the monochromatic tracker frequencies of 500 kc. plus $f_{BL}$, $f_{BR}$, $f_{FL}$, or $f_{FR}$ corresponding to the center of the Doppler spectra on the upper sideband signal on line E for the back-left, back-right, front-left and front-right beam positions, respectively. These signals are supplied on lines J from the frequency tracker 70 and are applied to input transistors 801, 802, 803 and 804, respectively. From the emitters of the transistors 801–804 are taken the four beam frequency signals and applied on line K to the flag alarm circuit 90.

The collectors of transistors 801 and 802 have tuned circuit loads 805, 806, respectively, which drive the diagonal terminals of a ring multiplier circuit 807. Across one diagonal of the ring 807 is a tuned circuit 808 which has a mid-point 809 in the capacitive branch and a center tap 811 in the inductive branch. The sum of the frequencies applied to transistors 801 and 802 appears at the tap 809 and this signal which is a frequency of one megacycle plus $f_{FR}$ plus $f_{BL}$ is amplified in a transistor 812. The signal in the collector circuit of transistor 812 has the amplitude modulation thereon removed by a shunt Zener diode 813 and capacitor 814 and is applied to the input of a transistor 815. The Zener diode 813 has a Zener response to about 2.5 megacycles. This circuit suppresses sideband energy in the wave to remove modulation resulting from distortion in previous circuits. The sidebands due to this modulation are, therefore, suppressed in a manner such that the modulation does not recur in subsequent stages.

The transistors 803, 804 operate into collector tuned load circuits 816, 817 which provide balanced signals connected across the diagonals of a ring circuit 818 to produce the sum frequency in the manner described in connection with the ring multiplier 807. The sum frequency from the ring circuit 818 is derived from a mid tap 819 on the capacitive branch of a tuned circuit 821. The sum frequency of one megacycle plus $f_{FL}$ plus $f_{BR}$ is amplified in a transistor 822 with amplitude modulation removed by the circuit of Zener diode 823. This signal is applied to the base of a transistor 824. The transistors 815 and 824 drive tuned collector load circuits 825 and 826, respectively, which are connected across the diagonals of a diode ring multiplier 827. The sum frequency of two megacycles plus $f_{FR}$ plus $f_{FL}$ plus $f_{BR}$ plus $f_{BL}$ is extracted from a point 828 of a tuned circuit 829 connected across the ring 827. The difference frequency of $f_{FR}$ plus $f_{BL}$ minus $f_{FL}$ minus $f_{BR}$ is derived from a tap 831 on the inductive branch of tuned circuit 829. The signal from the tap 828 is amplified in a transistor 832. Applied to the emitter of transistor 832 is a two megacycle signal derived from a frequency quadrupler circuit 833 which quadruples the 500 kc. frequency from the 500 kc. oscillator 606. This 500 kc. signal is applied to the combiner 80 from the receiver 60 over line L. The transistor 832 mixes the signals applied to its base and emitter and couples these signals to a peak diode detector circuit 834 which detects the beat envelope resulting from mixing in transistor 832. The remaining audio components are applied to a transistor 835 which is connected as an emitter follower. The filtered output of the emitter follower 835 appears at terminal 836 as the frequency component $f_x$ which is equal to $f_{FR}$ plus $f_{BL}$ plus $f_{FL}$ plus $f_{BR}$.

The difference signal at terminal 831 is amplified in a transistor 837 and after filtering appears at a terminal 838 as the frequency $f_y$ which is equal to $f_{FR}$ plus $f_{BL}$ minus $f_{FL}$ minus $f_{BR}$.

The difference frequency $f_{FR}$ minus $f_{BL}$ appearing at tap 811 is applied to a transistor 839 and appears at an output terminal 841 as a square wave of frequency $$\frac{f_z}{2}$$

The vertical frequency component is derived from information obtained from two beams only since a high order accuracy for this frequency component is not required.

The circuits of transistors 839 and 837 are both connected in substantially the same way and their performance can be understood from the following description. Transistor 839 is an NPN transistor which is connected with its emitter at the same voltage level as the center taps on transformers 805 and 808. The base by virtue of being connected to the ring is, for no signal, at the same potential. Consequently, the transistor 839 is in a cut-off state. When the audio component generated by the ring and derived at tap 811 is applied to the base of the transistor 839 it either switches the transistor ON or switches it more OFF than it was with the zero bias condition. Because the signal at the base of 839 is much cleaner than the signal at the base of 837, there were no precautions taken in 839 to reduce noisy output at the collector of 839 which is $$\frac{f_z}{2}$$

The $$\frac{f_z}{2}$$

signal normally appears as a square wave by virtue of the switching action of 839. In transistor 837 the signal applied to the base is somewhat noisy due to distortion components from all of the rings that have operated on the signal. This distortion takes the form of actual audio disturbances related to the Doppler signal itself. Consequently they can be very dangerous in the $f_y$ circuit because they will resemble $f_y$ to a certain extent and may without precautions mask it. The worst condition for these noise signals is when the $f_y$ signal is very close to zero frequency. The noise component is higher in frequency in this case and may cause false counts on the $f_y$ input circuit that is in the computer. The noise in the $f_y$ output is suppressed to a point where the hysteresis switch which it feeds will ignore it by the use of the feedback network 845 which consists of a resistor and two condensers. The purpose of this network is to give the maximum gain of which the transistor is capable. In other words, making it act as a switch, whenever the audio component on the base of 837 is a very low frequency in the zero to 10 cycle region. The network 845 is designed so that higher frequency signals are suppressed by the negative feedback circuit which is capacitively coupled so that it has no feedback at D.C. The feedback circuit 845 is designed with a response characteristic which gives the transistor maximum gain at or around D.C. rolling it off gradually to a plateau level over the range $f_y$ is expected to have and thereafter rolling off at 3 db per octave in such a way to suppress a two megacycle component which is also inherent in the signal reaching the base of transistor 837. The operation of both transistors 839 and 837 because they switch from saturation to cut-off affects the level at the center taps of tank circuits 805 and 808 and the result is that instead of the tank circuits being sourced from a constant D.C. potential they are sourced from a potential which resembles a square wave.

Referring to transistor 839 as typical, it acts as a switch which is floating—it follows the D.C. level at which the bridge is operating but it has a response to D.C. which means that although the operating point of the transistor driven circuits for the ring 807 can change they will not affect the switching point of transistor 839 since the audio component is impressed automatically at the D.C. level of the emitter. Consequently, the transistor 839 is a zero crossing switch. It always has an output of a square wave and not an asymmetrical square wave. The consequence of this behavior is that the square wave out of 839 is always symmetrical regardless of the level at which the transistor is working.

The frequency component applied to the base of transistor 824 is connected from the emitter of transistor 824 to the base input of a transistor 842 and a one megacycle component obtained from the multiplier circuit 833 is applied to the emitter of transistor 842 where these frequencies are mixed. These mixed frequencies are applied to a peak diode detector circuit 843 to recover the beat envelope and amplify in transistor 844 the sum frequency $f_{FL}$ plus $f_{BR}$ which appears at terminal 844 as $f_L$.

*The flag alarm circuit*

The flag alarm circuit 90, shown in detail in FIG. 9 comprises a first ring modulator 901 which is supplied two input frequencies 500 kc. plus $f_{FR}$ and 500 kc. plus $f_{BR}$. The ring 901 supplies the sum of these frequencies at an output 902. Another ring modulator 903 is supplied two input frequencies 500 kc. plus $f_{FL}$ and 500 kc. plus $f_{BL}$ and supplies at an output 904 the sum of these frequencies. The frequencies appearing at the outputs 902 and 904 are combined in resistive mixer 910 and applied to a beat detector 905 similar to diode circuit 834 which produces at an output 906 the difference between the signals derived from outputs 902, 904. The combination of frequencies appearing at the output 906, namely, $f_{FR}$ plus $f_{BR}$ minus $f_{FL}$ minus $f_{BL}$, is, for normal operation of the system always very nearly equal to zero. If any individual term in this combination of frequencies should be incorrect the sum obviously would no longer be zero and this characteristic is utilized as an alarm indication. For this purpose the signal at the output 906 is applied through a hysteresis switch 907, a single shot multivibrator 908, an integrator 909 and suitable amplifier circuits 911 to control a flag alarm relay 912.

The output of the circuit 908 is fed into an integrator 909 which is a capacitor that integrates the total up and down time of the single shot 908 and drives an emitter follower which is connected to NOR input on transistor 914. Whenever the voltage that is stored at integrator 909 reaches a high enough level, transistor 914 will switch. There is feedback from transistor 915 to the base of transistor 914 so that there will not be a poorly defined class A region for transistor 914. Under the conditions when integrator 909 changes slowly the feedback from transistor 915 introduces somewhat of a hysteresis switch effect into the performance of transistor 914. The transistor 914 acting as a switch then can drive transistor 915 as a switch. The transistor 915 has its collector source through a resistor 925 from transistor 916 whose function is to act as a protective circuit in the event that the minus 12 volt source fails allowing plus twelve volts to continue in the circuit. Transistor 915 feeds a base leak transistor 917 which serves to either ground the base of transistor 918 or connect the base of transistor 918 to plus 12 volts. Transistor 917 can be considered as an overdriven emitter follower which is either thoroughly cut-off or switched ON. When transistor 917 is turned ON it grounds the base of transistor 918. The emitter of transistor 918 is sourced from a silicon power diode 926 which has a stand-off potential of approximately 6/10 of a volt so that grounding the base of transistor 918 essentially puts half a volt back-bias on the transistor 918 and insures that it is thoroughly cut off. The transistor 918 serves as a driver for the relay 912 which is connected to plus 28 volts. The diode 919 across the relay is normally not conducting and only conducts when transistor 918 has switched the relay coil OFF in which case diode 919 suppresses the high voltage transient which should tend to destroy transistor 918. Also connected to the collector of transistor 918 is a 50 volt Zener diode 920. This Zener diode 920 serves the function of preventing any voltage higher than 50 volts across the transistor 918 since the aircraft power system is capable of going to much higher voltages. In the case that the Zener diode 920 is conducting the potential is held at 50 volts by virtue of a series impedance of coil 912 which furnishes its current.

Returning to the transistor 916 which is a safeguard put into the circuit for preventing the false indication of good operation, i.e. the relay 912 being turned on in the event that a minus 12 volt failure occurs. The transistor 916 is connected with its emitter to plus 12 volts and its base is tied by means of a resistor 927 to plus 12 volts and by means of another resistor 928 to Zener diode 921. This Zener diode 921 has a 15 volt Zener level and is connected at the opposite terminal to minus 12 volts. The purpose of the Zener diode 921 in controlling transistor 916 is to supply current to the base of transistor 916 sufficient to saturate it whenever minus 12 volts is present. If minus 12 volts is not present there will be insufficient drop across the Zener 921 to cause any conduction. Then the resistor 927 which is connected between the base of 916 and its emitter will serve to cut off transistor 916 and interrupt positive voltage to the driver transistor 918. Diode 922 is shown in conjunction diode 921 and is merely an insurance diode to make sure that if the minus 12 volt supply fails in an open state no potential will be applied such that transistor 916 would be turned on. Diode 922 then serves the purpose as a ground clamp for the minus 12 volt line at the Zener diode 921 junction point.

The alarm relay 912 is normally energized for proper operation of the system. Energization of the relay 912 applies a positive 12 volts to line M for the purposes hereinbefore set forth. Upon the failure of the frequency of the output of mixer 905 to be substantially zero the signal output on line 906 will produce from the output of amplifier 911 a signal to de-energize the relay 912. The input from AND circuit 729 on line 913 also provides a signal for de-energizing relay 912 and indicating that the system is not tracking all four beams.

The flag alarm circuit of FIG. 9 normally operates with respect to a nominal threshold value to permit slight deviation of the frequency output of mixer 905 before alarm is indicated. This is established by the integration time constant of 909. In order to prevent numerous alarms which may be caused by flying the aircraft over a particular point source type reflector, a modification may be provided. A point source reflector tends to produce in the Doppler spectrum a strong signal of a particular frequency which may be different from the spectrum center frequency which the system is designed to track. Accordingly, the occurrence of a strong signal from a point source reflector may institute alarm signals and tracking of the particular frequency resulting from the point reflector. In order to avoid this a gradual reduction of the sensitivity of the servo circuits in the ground speed and drift angle computers is employed. In particular, a voltage derived on line 931 provides a variable amplitude signal corresponding to the frequency output of mixer 905. As the frequency output of mixer 905 increases the magnitude of the voltage level on line 931 increases and may be applied to decrease the gain of servo amplifier 1087 in the ground speed system and servo amplifier 1114 in the drift angle system. This action will permit the effect of the strong signal to be tolerated without initiating an alarm unless the disturbance produces a frequency output from mixer 905 of the order of 500 cycles per second at which time the threshold for the initiation of the alarm may be arranged to operate. This threshold is established by various means. For example, if the pulse width from single shot 908 is varied and the RC time constant of integrator 909 is constant, narrow pulse widths will require a higher PRF to produce threshold voltage in integrator 909 than would wider pulse widths. With constant pulse width similar variation may be achieved by varying the discharge time constant of integrator 909. The operation of the system with this gradual reduction in the gain of the servo amplifiers as above described tolerates slight deviations which are transient in character without reinstituting slewing in the frequency tracker circuits and erroneous tracking of strong signals from point reflectors. For a sufficient frequency deviation, however, indicating that error exists in the output of mixer 905, the system reverts to slew operation to acquire signals and the output of the ground speed and drift angle computers are locked at the last available good data value.

*Ground speed computer—general description*

The computer 100 performs computations which yield the ground speed and drift angle of the aircraft in response to the frequency components $f_x$, $f_y$ and $f_{z/2}$ applied to the input thereof. Ground speed is computed as a frequency which is digitally related to ground speed in knots by means of the digital computer, the logic of which is shown in FIG. 10. The component $f_{z/2}$ is applied through a hysteresis switch 1001, the frequency component $f_y$ through a hysteresis switch 1002 and the component $f_x$ through a hysteresis switch 1003. The output of the switch 1003 passes through a three stage counter 1004 to divide the frequency $f_x$ by the factor 8 in order that the magnitude of the frequency components processed by the digtal computer circuits may be of the same general order. The processed signals from the hysteresis switches are applied to individual gates 1005, 1006 and 1007 for sequential application to the input of the computer circuit proper. The gates 1005, 1006 and 1007 are under the control of a programmer 1008. Signals gated through the gates 1005, 1006 and 1007 are applied to an OR circuit 1009 the output of which is applied to a plurality of cascaded delay devices 1010. The output of the OR circuit 1009 is inverted and applied to a nine stage A register 1011 which has the ONE output of each stage applied respectively to a plurality of gates 1012. The outputs of the gates 1012 are applied to respective successive stages of a register 1013 in a manner to complement the first nine stages of register 1013 for each ONE output of the nine stages of the register 1011. The register 1013 is an 18 stage counter the output of which is applied on line 1014 to an error gate circuit 1015. The error gate circuit 1015 supplies an integrator circut 1016 which varies the frequency of a ground speed oscillator 1017 the output of which passes to a frequency doubler 1018 and a sea state correction circuit 1019. The modified ground speed frequency from the sea state correction circuit 1019 is applied as the input to an 11 stage clock counter 1021. The clock counter 1021 produces an output on line 1022 which controls the programmer 1008.

The programmer 1008 is a two stage counter which generates sequential gating waveforms for the gates 1005, 1006 and 1007 which define counting intervals or phases $\Phi_z$, $\Phi_y$, $\Phi_x$ and $\Phi_w$. The gate 1007 is also on during the $\Phi_w$ interval. An output of the programmer 1008 is applied on lines 1023, 1024, 1025 to the counter 1021 to preset the counter 1021 in accordance with the complement of the gate length applied to the respective gates 1005, 1006 and 1007. The $\Phi_x$, $\Phi_y$ and $\Phi_z$ gate control waves from the programmer 1008 are applied to an OR circuit 1026 the output of which provides the reset pulse for the register 1011. The output of the $\Phi_z$ gating line of the programmer 1008 is applied as the reset pulse for the B register 1013.

The operation of the circuit of FIG. 10 can be briefly summarized as follows. The ground speed components of the aircraft are represented by the $f_{x/8}$, $f_y$ and $f_{z/2}$ frequencies applied to the register 1011 sequentially by the gate actions of gates 1005, 1006 and 1007. For each computing cycle the frequencies $f_{x/8}$, $f_y$ and $f_{z/2}$ will be entered into the register 1011 for a period determined by the enabled interval of the corresponding gate. The register 1011 accumulates the counts corresponding to the input frequencies and the interval during which it is applied. For each count applied to the register 1011 the existing number is transferred into the register 1013. Accordingly, the register 1013 accumulates a total $$\frac{m^2+m}{2}$$

where $m$ is equal to the total count in register 1011.

Since the register 1011 is reset at the beginning of each $z$, $y$ and $x$ phase and since register 1013 is reset only at the beginning of the $z$ phase, the total in register 1013 at the end of the $x$ phase is the sum of the separate $$\frac{m^2+m}{2}$$

counts for the $\Phi_z$, $\Phi_y$, $\Phi_x$. The output of register 1013 is compared with the gate control waves from the programmer 1008 by the error gates 1015.

The ground speed oscillator 1017 is controlled to apply an adjustable frequency to the counter 1021. Since the programmer 1008 is controlled by counter 1021 the enabled length of gates 1005, 1006 and 1007 is dependent on the frequency of the ground speed oscillator 1017. The time required for register 1013 to become full is dependent on the enabled length of gates 1005, 1006, 1007 and the $f_{x/8}$, $f_y$ and $f_{z/2}$ frequencies. Thus register 1013 will fill at the same time programmer 1008 completes its $\Phi_z$, $\Phi_y$ and $\Phi_x$ portion of its cycle only when the ground speed oscillator 1017 is at the frequency corresponding to the ground speed of the aircraft. The error gates 1015 operate to servo the frequency of oscillator 1017 to this value and this frequency may be extracted on line 1028 as an accurate measure of ground speed without errors of the analog type.

*Ground speed computer—detailed description*

The detailed operation of the ground speed computer of FIG. 10 can be understood with reference to the logic diagrams wherein FIG. 10a is the computer input and programmer; FIG. 10b is the clock counter and ground speed counter; FIG. 10c is the ground speed oscillator; FIG. 10d is a counter phase diagram; and FIG. 10e shows timing waveforms. As shown in FIG. 10a the frequency component $f_{z/2}$ is applied to a hysteresis switch 1001, the frequency component $f_y$ is applied to a hysteresis switch 1002 and the frequency component $f_x$ is applied to a hysteresis switch 1003. The output of the switch 1003 is applied to a 3 stage counter 1004 and single shot 1000 giving 80 μs. pulses at a rate of $f_{x/8}$. The $f_{x/8}$ output is applied to the gate 1007, the $f_y$ output is applied to gate 1006 and the $f_{z/2}$ output is applied to gate 1005.

The count of the particular input frequency by the registers 1013 and 1011 proceeds by accumulating the count in register 1011 equal to the number of cycles applied at the input thereof and in register 1013 accumulating a total equal to the square of the count in register 1011 plus the count in register 1011, the quantity times ½. As indicated in FIG. 10, this can be accomplished by means of individual delay devices 1010 and gates 1012 to complement the first nine stages of register 1013 for each ONE output of the nine stages of register 1011 at the end of each count. The arrangement shown in FIG. 10 provides a predetermined delay provided by the devices 1010 for each stage of register 1011, in order that when a ONE in register 1011 is to be applied to complement the corresponding stage in register 1013, any carry which may result from such complementing action in register 1013 may take place before the next succeeding stage in register 1011 applies a signal through its corresponding gate circuit 1012 to the succeeding stage in the register 1013. This arrangement involves greater delay than is necessary in the computation since for those stages of register 1011 which have no ONE output, i.e. the stage is set to ZERO no change will take place in the corresponding stage of the B register 1013 and consequently no time delay is required to permit the transfer of a CARRY in the B register.

In FIG. 10b an improved transfer circuit is shown which involves instead of the delay devices 1010 and the gates 1012 a plurality of single shot circuits 1070. In FIG. 10b the first stage of the single shots 1070 is shown schematically with connections to the logic diagrams for the first stage of the registers 1011, 1013 shown to describe the operation of this modification. The single shots 1070 comprise an input ORN circuit 1071 having the output coupled to the input of a second ORN circuit 1072 the output of which is applied on line 1073 to the input of the flip-flop corresponding stage in the register 1013. The ORN circuit 1072 has a minus 12 volt bias on terminal 1074 and is coupled on line 1075 to the output of the ONE side of the corresponding flip-flop stage in register 1011.

The operation of the single shots 1070 may be explained as follows. Transistor 1072 is normally conducting while transistor 1071 is normally nonconducting. Upon the occurrence of a negative input signal from the OR circuit 1009 transistor 1071 conducts bringing its collector to ground potential and applying a positive signal to the input of transistor 1072. Transistor 1072 being normally conducting will be cut off by the signal applied from transistor 1071 only if on line 1075 a ground potential exists corresponding to a ONE output from the connected stage of register 1011. If the stage in register 1011 connected to line 1075 is set to ZERO such that line 1075 is negative then this negative potential in combination with the negative potential supplied at terminal 1074 makes the transistor 1072 incapable of being cut off by the positive signal applied from transistor 1071. Accordingly, for a ZERO set in the stage of register 1011 the output of transistor 1071 as applied on line 1076 to the next succeeding single shot 1070 will merely be an inverted duplication of the input signal and of short duration. No output to the register 1013 on line 1073 will occur for this condition since the transistor 1072 remained in conduction. If the stage in register 1011 is set to a ONE output such that line 1075 is at ground potential, the positive signal from transistor 1071 applied to the input of transistor 1072 is then sufficient to cut off transistor 1072 resulting in single shot feedback action on line 1077 which regeneratively produces conventional single shot action maintaining transistor 1071 in conduction and transistor 1072 cut-off for a predetermined time established by the time constant of the circuit. This time represents the time delay introduced in the system since the termination of a single shot period will result in transistor 1071 becoming once again nonconductive and applying a negative going signal on the output line 1076 to the succeeding single shot stage. The output on line 1073 for single shot action applies a negative signal to the input of the flip-flop stage in register 1013 thereby changing the state of that stage whenever a ONE is set in the corresponding stage in the register 1011. The operation of the first nine stages in registers 1011 and 1013 proceeds therefore with substantially no delay where a ZERO is set in a stage in register 1011 and with sufficient delay introduced by the corresponding single shot 1070 whenever a ONE is set in a stage in 1011. The ONE set in a stage of counter 1011 is effective to complement or change the state of the corresponding stage in register 1013 and the delay of the single shot 1070 for this action permits any CARRY in register 1013 to be registered prior to the application of a negative signal to the succeeding single shot for reading the condition of the succeeding stage in register 1011. The total accumulated in counter 1013 is the same as indicated for FIG. 10, namely, $$\frac{m^2+m}{2}$$

It will be noted that the solution of the ground speed equation as described hereinbefore under the heading Theory of Operation requires that the sums of the squares of the velocity components be obtained. The instrumentation of this solution as described to this point has produced the quantities of the form $$\frac{m^2+m}{2}$$

which is in error by the term $m$ in addition to the factor ½. This error is quite small for large values of $m$ and can be approximately compensated by adjustment of the proportionality constants in the system. An exact solution can be obtained, however, by the simple expedient of disabling the count transfer circuit between the first stage of registers 1011 and 1013. If line 1073 were broken as by opening switch 1080 between the first stages of counters 1011 and 1013 the count in register 1013 will be $m^2/2$ with an accuracy of one-half count.

The sum of the squares of the velocity components is obtained during the $\Phi_z$, $\Phi_y$ and $\Phi_x$ counting phases established by the programmer 1008. The input on line 1022 to the programmer 1008 from the clock counter 1021 operates a flip-flop 1031 the output of which operates a flip-flop 1032. Each of the flip-flops 1031 and 1032 have output emitter followers on the ZERO and ONE outputs thereof with the ZERO output of flip-flop 1031 connected to a line 1 the ONE output of flip-flop 1031 is connected to a line 2. The ZERO output of flip-flop 1032 is connected to a line 3 and the ONE output of flip-flop 1032 is connected to a line 4. The operation of flip-flops 1031 and 1032 provide the four conditions which establish the $\Phi_z$ phase during which the frequency $f_{z/2}$ is counted, the $\Phi_y$ phase during which the frequency $f_y$ is counted, and the $\Phi_x$ phase during which the frequency $f_{x/8}$ is counted. The fourth state established by the flip-flops 1031 and 1032 is the $\Phi_w$ phase and the four phases $\Phi_z$, $\Phi_y$, $\Phi_x$ and $\Phi_w$ constitute one complete operating cycle for the ground speed computer. The condition of lines 1, 2, 3 and 4 for the phases $\Phi_z$, $\Phi_y$, $\Phi_x$ and $\Phi_w$ is shown in FIG. 10a'.

The $\Phi_z$ phase is initiated at time $t_z$ for ground outputs on lines 1 and 3 which produces an output from ORN circuit 1033 which fires a single shot 1034 which produces an output pulse on line 1035 which starts the $f_{z/2}$ count in the clock counter 1021 at a complemented count which is set to fill the clock counter 1021 after one hundred forty-nine counts. This preset of the clock counter 1021 is obtained by the connections to the respective stages of the clock counter 1021 from line 1023 in FIG. 10b. The output on line 1035 is also applied through a driver circuit 1036 to reset the B register 1013. At the end of one hundred forty-nine counts the counter 1021 produces an output which appears on line 1022 to set the flip-flop 1031 so that ground outputs appear on line 2 and line 3. A ground output on line 2 produces through ORN circuit 1037 an output on line 1038 which initiates the $\Phi_y$ phase at time $t_y$. The output on line 1038 complements the stages of counter 1021 connected to line 1024 which sets the counter 1021 to be at full count for four hundred forty-one counts which is the count length of the $\Phi_y$ phase. At the end of four hundred forty-one counts an output is produced from the counter 1021 on line 1022 which produces the state in flip-flops 1031, 1032 to establish ground outputs on lines 1 and 4. Ground outputs on lines 1 and 4 produce an output through ORN circuit 1039 which produces an output on line 1041 which initiates the $\Phi_x$ phase at time $t_x$. An output on line 1041 produces a pulse on line 1025 which sets the counter 1021 to a state which will result in the counter being full after one thousand three hundred seventy-nine counts which is the count length of the $\Phi_x$ phase. At the end of the $\Phi_x$ phase the counter 1021 produces an output which triggers the flip-flops 1031 to a state in which lines 2 and 4 are ground and the output on line 2 initiates through ORN circuit 1037, line 1038, and the line 1024 the $\Phi_w$ phase at time $t_w$ which is identical in count length with the $\Phi_y$ phase, namely, four hundred forty-one counts to fill the counter 1021. At the end of phase $\Phi_w$ the output of the counter 1021 re-establishes the initial condition of flip-flops 1031 and 1032 to the condition corresponding to time $t_z$ and the initiation of the $\Phi_z$ phase.

The computer output is employed to control the frequency of the ground speed oscillator 1017 through a pair of error gates 1042 and 1043. The error gate 1042 passes $f_{x/8}$ signals received on line 1040 to decrease the frequency of the oscillator 1017 for ground input signals received from the ONE output (line 2) of flip-flop 1031, a ground output from the ZERO output of the final stage of the B register indicating Not Full condition for the B register, and a ground output on line 4 in the programmer which prevents error gate operation during the $\Phi_z$ and $\Phi_y$ phases. The error gate 1043 passes $f_{x/8}$ signals received on line 1040 to increase the frequency of the ground speed oscillator 1017 for ground signals from the ONE output of the final stage of the B register indicating the register is Full, a ground output from the ZERO output (line 1) of flip-flop 1031 in the programmer and a ground output on line 4. The gates 1042 and 1043, therefore, are conditioned to operate at the transition of the $\Phi_x$ to $\Phi_w$ phase and depending upon the condition of the B register as being Full or Not Full. This operation can be seen in FIG. 10d which is a plot of the counts in clock counter 1021 plotted as abscissa against counts in the B register as ordinates. The equation for ground speed will be solved as long as the two registers contain the counts corresponding to a point 1050 which represents the condition for the B register being Full at the same time the clock counter has counted the predetermined number of counts in the $\Phi_z$, $\Phi_y$ and $\Phi_x$ phases. If this condition exists a plot of the counts in the B register and in the clock counter 1021 proceeds along the characteristic 1051. The curve 1051 comprises three exponential portions in the respective $\Phi_z$, $\Phi_y$ and $\Phi_x$ phases. If the ground speed oscillator 1017 is too low in frequency the clock counter 1021 will not accumulate counts rapidly enough to reach the point 1050 before the B register is Full. This condition is indicated by the curve 1052 which crosses the B register Full axis at a point 1053. From the point 1053 to the end of the $\Phi_x$ phase the conditions exist in which the B register is Full and the $\Phi_x$ phase is still in progress. These conditions are sensed by the gate 1043 as enabling conditions to pass the $f_{x/8}$ signal from line 1040 to an integrator 1044 with the proper sense to increase the frequency of ground speed oscillator 1017. At the end of the $\Phi_x$ phase the enabling condition established by the $\Phi_x$ phase on lines 1 and 4 ends and the $\Phi_w$ phase condition sensed on line 2 ends the enabled period of gate 1043. Accordingly, the shaded area 1054 represents the region of correction for increasing the frequency of the ground speed oscillator 1017. If the frequency of the ground speed oscillator 1017 is high, the count characteristic proceeds in accordance with a curve such as 1055. For too high ground speed oscillator frequencies the counts in the $\Phi_z$, $\Phi_y$ and $\Phi_x$ phase are accumulated at a sufficiently rapid rate to complete the $\Phi_x$ phase before the B register is Full. This condition corresponds to the point 1056. At this point the gate 1042 is enabled since it is enabled by a B register Not Full signal from the output of the B register 1013 and a signal from the line 2 indicating the beginning of the $\Phi_w$ phase. Thus the gate 1042 is enabled to pass the $f_{x/8}$ signals to the integrator 1044 in the proper polarity to decrease the frequency of the ground speed oscillator 1017. This condition obtains until the counts in the B register reach Full at which time the enabling gate voltage from the B register to the gate 1042 is removed. Accordingly, the decrease ground speed oscillator frequency correction occurs in the region corresponding to the shaded area 1057. When the B register becomes Full the removal of the enabling signal on gate 1042 corresponds with the application of an enabling gate from the B register to gate 1043. However, no enabling signal is present from lines 1 and 4 as was the case during the $\Phi_x$ phase, hence no increase frequency corrective action occurs when the B register fills due to counts along the characteristic 1055. It is apparent, therefore, that the increase and decrease frequency signals to the ground speed oscillator 1017 are such that the system maintains itself to operate along the characteristic 1051 with the time for the counting phases $\Phi_z$, $\Phi_y$ and $\Phi_x$ exactly corresponding with the time for counting the B register Full.

The frequency of the ground speed oscillator 1017 is doubled in the frequency doubler 1018 and applied through the sea state circuit 1019 to the input of the counter 1021. The sea state circuit 1019 comprises a gate 1060 and a flip-flop 1061 comprising cross-coupled ORN circuits 1062 and 1063. The doubled ground speed frequency from the frequency doubler 1018 is applied to an input lead 1064 of gate 1060 and coupled by capacitor 1065 to an input of flip-flop 1062. The capacitor 1065 is also connected through a diode 1066 to ground. For selecting either land or sea operation a switch 1067 is provided having an open position for land and a ground position 1068 for sea conditions. During normal operation over land the switch 1067 is open and the minus 12 volt supply appears on lead 1069. The normal condition of the ORN circuit 1062 is conducting making output lead 1071 ground and enabling the gate 1060 to pass to counter 1021 the ground speed oscillator pulses applied at input lead 1064. These counts are accumulated in the counter 1021. When a predetermined count is reached such as the one hundred twenty-eighth count, an output appears on lead 1072. This signal on lead 1072 is coupled to an input of ORN circuit 1063 and will change the state of flip-flop 1061 making ORN circuit 1063 conductive and ORN circuit 1062 non-conductive only when switch 1067 is at ground position 1068. When ORN circuit 1062 is non-conductive lead 1071 is negative and disables gate 1060 for one cycle from the frequency doubler 1018. The next succeeding cycle, after the flip-flop 1061 has been set from the pulse on lead 1072 to make ORN circuit 1063 conduct, is coupled by capacitor 1065 to the input of ORN circuit 1062 to reset the flip-flop 1061 to make ORN circuit 1062 conduct thereby enabling gate 1060 and permitting succeeding signals from the doubler 1018 to be accumulated in the counter 1021. Thereafter for every one hundred twenty eight counts, one count will be deleted by the action of flip-flop 1061 and gate 1060 just described. This action may be selected by connecting switch 1067 to ground terminal 1068 whenever flying over the smooth surface of the sea and thus introduce a correction in the time required for counter 1021 to accumulate counts. Thus the time for counter 1021 to become full can be made any desired percentage greater than that corresponding to the actual input from the frequency doubler 1018 by connecting line 1072 to an appropriate stage of counter 1021 to correspond with conditions as actually experienced in the form of a shift in the Doppler return frequency from a smooth surface of the sea. Obviously, this arrangement could be extended selectively to provide a plurality of percentage changes in the count accumulated in counter 1021 relative to the input from the doubler 1018 by dropping counts for other selected predetermined counts corresponding to those received on lead 1072.

The system thus described provides an accurate ground speed oscillator frequency which precisely corresponds with ground speed in a predetermined number of cycles per knot. This frequency is maintained irrespective of temperature conditions for the oscillator 1017 or any other factors which normally effect oscillator frequency. Thus, no further circuit stabilization is required to supply ground speed information to the input of the navigational computer in accordance with the present invention. However, in applications where ground speed information must be converted into a shaft rotation, the servo arrangement of FIG. 10f may be employed. By virtue of this circuit the ground speed oscillator frequency is converted to a shaft rotation with temperature compensation provided by an auxiliary oscillator 1081 as hereinafter described. The shaft converter provides true integration of the ground speed data to maintain the frequency of oscillator 1017 at the correct value without an error signal in the computer loop and performs a memory function in the event that the ground speed data is lost.

The digital to shaft converter for the ground speed frequency is shown in FIG. 10f and corresponds generally with the block diagram indicated in FIG. 10c between the error gates 1042, 1043 and the sea state circuit 1019. Signals from error gate 1042 are applied on line 1082 to a transistor 1083 having its collector connected to an integration capacitor 1084. Signals from error gate 1043 after phase inversion in an inverter 1511 are applied to a transistor 1085 and thus with opposite polarity from the collector thereof to the integration capacitor 1084. The integration capacitor 1084 therefore provides both positive and negative integrated quantities representative of the time integral of the error gate signals and with the polarity corresponding to the preponderant signal from error gate 1042 or 1043. This integrated voltage is chopped in a chopper 1086 and applied to a servo amplifier 1087 which drives a motor 1088. The motor 1088 operates a ten-turn precision potentiometer 1089 to supply a voltage at slider 1091 which is an input to a magnetic amplifier 1092. The D.C. potential across potentiometer 1089 is derived from reference oscillator 1081 as follows. The frequency of oscillator 1081 is converted to timing pulses which are compared in a digital phase/frequency discriminator 1093 with an eight kilocycle reference signal obtained from a stable oscillator 1094. The output of the flip-flop 1093 is integrated in an integrator circuit 1095 the output of which is a D.C. voltage which varies in magnitude and sense with the difference in frequency prior to pull-in of the two inputs to the flip-flop 1093. Upon pull-in the circuit converts to a phase detector the output of which is a voltage which provides frequency lock between the two inputs to flip-flop 1093. This voltage is applied to the potentiometer 1089 and oscillator 1081 at the center tap of a transformer similar to transformer 1099.

To prevent loading the potentiometer 1089 by the current drawn from tap 1091 a servo circuit is operated from the magnetic amplifier 1092 to supply a current on line 1096 from a low impedance source. This is accomplished by a servo loop including an amplifier 1097 and phase detector 1098 which produces an output voltage equal to that on tap 1091. This voltage is applied on line 1096 to the mid-tap of a saturable core transformer 1099. The end terminals of the primary of transformer 1099 are connected to the collectors of a pair of transistors 1501, 1502 which are regeneratively cross-coupled and connected from their bases to the terminals of a secondary winding 1503. This circuit oscillates between frequencies of 800 and 8,000 cycles per second depending upon the potential applied on line 1096 as derived from the tap 1091. Opposed phase output signals at this frequency are applied to a pair of diodes 1504, 1505 to constitute the frequency doubler circuit 1018 having an output through ORN circuit 1506. The output of ORN circuit 1506 after passing through the sea state circuit 1019 is applied to the input of counter 1021 to complete the computer feedback loop.

The circuit of FIG. 10f includes in addition to the main computer feedback loop two subsidiary feedback loops. The loop comprising magnetic amplifier 1092, amplifier 1097 and phase detector 1098 has been previously described as a means for eliminating the effect of loading current on the potentiometer 1089. The feedback loop comprising reference oscillator 1081, discriminator 1093 and integrator 1095 produces a D.C. voltage across the potentiometer 1089 which varies as the oscillator 1081 varies in frequency from the eight kilocycle frequency of reference oscillator 1094. Reference oscillator 1081 is identical in structure and environment to ground speed oscillator 1017 and therefore has a similar temperature characteristic. As the temperature of the equipment varies, therefore, reference oscillator 1081 tends to change in frequency and ground speed oscillator 1017 has a tendency to change by a like amount. The phase change in oscillator 1081 however produces a change in the D.C. output of integrator 1095 due to the change in the phase between the frequency of oscillator 1081 and reference oscillator 1094. This change in the D.C. output of integrator 1095 is effective to change the voltage at tap 1091 by an amount which is exactly sufficient to compensate for the frequency change due to temperature which would tend to occur in the ground speed oscillator 1017. Accordingly, as the temperature varies the voltage input to reference oscillator 1081 varies in such a manner as to keep its frequency constant, and the frequency of ground speed oscillator 1071 is, therefore, independent of temperature variations.

The rotational output of motor 1088 is applied through a gear train 1507 to a synchro transformer 1508. The electrical output of the transformer 1508 is transmitted to suitable indicators or other equipment which require an electrical or mechanical rotational signal representative of ground speed. The output of the motor 1088 in adjusting the tap 1091 establishes the frequency of ground speed oscillator 1017 at a value which nulls the computer servo loop and thereby establishes the ground speed equation solution as hereinbefore described. If ground speed data is lost for any reason the last value of ground speed will be maintained by the ground speed oscillator 1017 since the setting of slider 1091 will not change until a new value of ground speed is produced by the system. This action is assured by an input to the servo amplifier 1087 from line 931 which removes motor power and substitutes a D.C. braking potential to the motor whenever the flag alarm circuit indicates loss of data. The temperature compensation provided by oscillator 1081 as hereinabove described eliminates the effect of temperature on the setting of slider 1091 and hence the shaft output of ground speed is also independent of temperature.

*Drift angle system—general description*

The drift angle computation occurs during the $\Phi_x$ phase of the ground speed programmer 1008 as shown in FIGS.

10 and 11a. For this purpose the reset pulse K in FIG. 10e from the ground speed programmer 1008 which opens gate 1007 is also applied on line 1100 to the drift angle programmer flip-flop 1101. This pulse starts the drift angle computation at the instant the $f_{x/8}$ count starts in register 1011. The drift angle programmer receives a stop signal on line 1102 from the register 1011 upon the occurrence of the two hundred fifty-sixth count in register 1011. The drift angle programmer 1101 controls a gate 1103 to which is applied frequency $f_L$ on line 1104. The frequency $f_L$ is supplied to line 1104 from a hysteresis switch 1120 having an input frequency $f_L$ applied thereto from the combiner 80. The frequency $f_L$ is gated by gate 1103 to a flip-flop 1110 which divides the frequency by two and applies it to a weighted counter 1105. The weighted counter 1105 produces a current output which is proportional to the ratio of $(f_{L-x/2})$ to $f_{x/2}$ by comparing the counts during the counting interval in counter 1105 and the counts during the same interval in counter 1011. This current after passing through a current polarity switch 1106 is applied as one input to a summing magnetic amplifier 1107. The amplifier 1107 is supplied with 400-cycle operating power through a 400-cycle gate 1108 which is controlled by a programmer 1101. Gates 1103 and 1108 are enabled in a complementary fashion such that when gate 1103 is enabled and counter 1105 is accumulating counts for the drift angle computation gate 1108 is disabled and the magnetic amplifier 1107 produces no output. At the end of the computation period gate 1103 is disabled and gate 1108 is enabled to apply power to the amplifier 1107 and permit a correction to be made in the drift angle indication corresponding with the most recently computed value. The magnetic amplifier 1107 has inputs from a tangent bridge 1109 and from a pitch and roll multiplier 1111. The multiplier 1111 has inputs from a roll syncro 1112 and pitch synchro 1113. The output of the magnetic amplifier 1107 is amplified in a servo amplifier 1114 the output of which drives a motor 1115. The motor 1115 is mechanically coupled to a generator 1116 and a syncro transmitter 1117. Signals from the generator 1116 are applied to servo amplifier 1114 to establish dynamic braking for the interval between data corrections. The rotary position of the transmitter 1117 is transmitted to any suitable indicator on line 1118 to indicate drift angle. The motor 1115 also drives the potentiometer in tangent bridge 1109 to establish the tangent of the drift angle value which provides a solution for equation 17″ by nulling the closed servo loop.

*Drift angle computer—detailed description*

The detailed circuit of the drift angle computer is shown in FIG. 11a. The programmer 1101, gate 1103, hysteresis switch 1120 and flip-flop 1110 previously described operate the counter 1105. The counter 1105 is shown to comprise nine stages of flip-flop connected ORN circuits each stage of which includes two transistors which are consecutively numbered Q1 to Q18. The counter 1105 has a ONE's current line 1121 and a Complement current line 1122. The ONE's line 1121 is connected through resistors 1123 and Stabistor diodes 1124 to the collector of the odd numbered transistor in each flip-flop stage of counter 1105. The Zero's line 1122 (or Complement line) is connected through resistors 1125 and Stabistor diodes 1126 to the collector of the even numbered transistors in each stage of the counter 1105. The value of resistors 1123 and 1125 are inversely weighted to provide with the precise resistance of the diodes 1124, 1126, respectively, a value associated with each particular counter flip-flop stage which permits a current magnitude to flow in the respective ONE's or Complement lines 1121, 1122 corresponding with the binary value of the particular flip-flop stage. Thus, resistor 1123 and diode 1124 associated with transistor Q1 in the first flip-flop stage has a value of 256 thousand ohms and resistor 1125 and diode 1126 associated with transistor Q2 of the first flip-flop stage has a value of 256 thousand ohms. The corresponding values for resistor 1123 and diode 1124 associated with transistor Q17 in the ninth flip-flop stage is 1000 ohms and the value for resistor 1125 and diode 1126 associated with transistor Q18 in the ninth stage is 1000 ohms. The intermediate values between the first and last flip-flops for the respective resistors 1123 and 1125 progress between these values inversely in accordance with the binary weight of each stage in order to permit a current flow which corresponds with the binary weight of each stage in the respective ONE'S line 1121 and Complement's line 1122.

The count output of the ninth flip-flop stage is applied on line 1127 to a counter circuit comprising transistors Q19 and Q20 connected to have transistor Q20 normally set for conduction and triggered into a condition with transistor Q19 conducting upon the occurrence of the first count output from the flip-flop comprising transistors Q17 and Q18. The output of transistor Q19 on line 1128 is applied to amplifier transistor Q22 and the output of transistor Q20 on line 1129 is applied to amplifier transistor Q21. The signal on line 1128 also applies a count on line 1131 to add a count by switching transistor Q2 at the first overflow count. The output of transistor Q22 passes through an emitter follower Q32 and is applied to the base of a switch transistor Q33. Amplifier Q21 has its output connected to an emitter follower Q34 which drives a switch transistor Q35. Transistors Q21 and Q22 are normally non-conductive during the counting interval due to a blanking gate on line 1132 from program flip-flop 1101.

An input line 1136 supplies gated $f_{L/2}$ frequency to the input of the counter at the first stage thereof. A ONE set line 1137 is connected to line 1100 to set the ONE side of all the flip-flop stages of counter 1105 upon the occurrence of the start signal $tx$ (pulse K in FIG. 10e) for the $f_x$ count to the programmer 1101. The ONE set signal also switches transistor Q20 into conduction thereby switching transistor Q19 out of conduction. Conduction in transistor Q20 causes, but for the blanking gate on line 1132, transistor Q21 to be nonconductive while the ONE's set signal on line 1137 causes transistor Q22 to be conductive. A predetermined D.C. reference voltage from a Zener voltage reference diode 1139 is applied to the collectors of the switch transistor Q33 and Q35. The emitter of transistor Q33 is connected to the Complement current line 1122 and the emitter of transistor Q35 is connected to the ONE's current line 1121.

The operation of the counter 1105 to produce currents having the proper magnitude and sense to correspond to drift angle can be understood by considering two different counts of $f_{L/2}$ one of which is less than the five hundred and twelve count capacity of the counter 1105 and one of which exceeds this count capacity. Initially, when an $f_{L/2}$ count is to begin a ONE set signal on line 1137 sets all of the flip-flops in the ONE condition with even number transistors Q2–Q18 and Q20 conducting as previously noted. The first $f_{L/2}$ count, therefore, flops all of the stages. Succeeding counts of $f_{L/2}$ are then registered in normal counting action. As long as this count is less than five hundred and twelve, transistor Q19 is conducting and, upon read-out transistors Q32 and Q33 are conducting. Read-out occurs when line 1132 unblanks at the end of the drift angle program for which condition the current in the ONES line 1121 will be supplied from the reference voltage source established by the Zener diode 1139 through the collector-to-emitter path of transistor Q33 through Complement line 1122 to a coil 1141 in magnetic amplifier 1107 returning on ONES line 1121 through any of the resistors 1123 and diodes 1124 which are connected to a conducting odd numbered transistor Q1 to Q17, inclusive, which conductive transistors effectively connect the collector electrodes thereof to ground. For this current path the diodes 1124 are poled in the conductive direction so as not to oppose current flow. For this same condition the transistors of even numbers Q2 to Q18 which may be conducting, depending on the particular $f_{L/2}$ count, are not effective to establish a current path through the coil 1141 but merely conduct current from the Zener source 1139 through the collector-emitter path of transistor Q33 any resistors 1125 and diodes 1126 associated with an even numbered conducting transistor Q2 to Q18, inclusive, to ground. The diodes 1124 in circuit with any non-conducting transistors of odd number transistors Q1 to Q17, inclusive, are poled with respect to the minus 12 volt collector supply voltage to be non-conductive thereby preventing any leakage current through a non-conducting transistor from contributing to the magnitude of the drift angle current established by the count in the counter.

At the five hundred and twelve count of $f_{L/2}$ transistor Q20 becomes conductive and on read-out for any subsequent count transistor Q21 becomes conductive making transistors Q34 and Q35 conductive and transistors Q32 and 33 are changed to the non-conductive state. For this condition the current path from the Zener source 1139 is through the collector-emitter path of transistor Q35 the one's current line 1121 to coil 1141 returning on the Complement current line 1122 to any of the resistor 1125 connected through diodes 1126 to even numbered transistors Q2 to Q18, inclusive, which may be conducting and through the collector-emitter path of such conducting transistors to ground. As in the previous case the diodes 1126 are poled in the direction to be conducting for those even numbered transistors Q2 to Q18 which are conducting but are poled to be non-conductive for non-conducting transistors which apply the minus 12 volt collector source voltage to the diode anode. Also, as in the previous case, the path through the collector-emitter junction of transistor Q35 through any of the resistors 1123 associated with conducting odd numbered transistors Q1 to Q17, inclusive, merely goes to ground and does not contribute current through the coil 1141. It will be apparent that for these two cases the current flow through coil 1141 is in opposite directions and thus has sense relative to whether the counter 1105 is counting against its Complement or has been filled once and has started to accumulate an $f_{L/2}$ count in excess of its capacity. In each case the current magnitude will be selected by the count present in the counter at the end of the gating interval for counting $f_{L/2}$ and its value determined by the effective binary weighting resistors.

The magnetic amplifier 1107 comprises three saturable toroidal cores 1140, 1142 and 1143 which are stacked in aligned position to receive individual and common windings thereon. The winding 1141 encircles all of the cores 1140, 1142 and 1143. The amplifier 1107 is energized by a coil 1144 on core 1143 and a coil 1145 on core 1140 which are serially connected to a minus 12 volt D.C. source through circuit 1146 and to the collectors of A.C. gate circuit 1108. The A.C. gate circuit 1108 comprises two transistors 1146 and 1147 which are driven in opposite conductivity states by the gating signal from programmer 1101. The emitter of transistor 1146 is connected to a 2.4 volt A.C. 400 cycle source and the emitter of transistor 1147 is connected to ground. Accordingly, during the computation period transistor 1147 is conductive, effectively grounding through the emitter-collector path of transistor 1147 the A.C. input to the windings 1144, 1145 of amplifier 1107. At the end of the computation period when the new value of drift angle is to be utilized to correct the drift angle indication, transistor 1146 becomes conductive and transistor 1147 becomes non-conductive thereby applying the 2.4 volt A.C. 400 cycle power through the collector-emitter path of transistor 1146 to the windings 1144 and 1145. This switching action does not switch the D.C. component flowing from the 12 volt source through circuit 1146. Thus no D.C. step is present and the switching of switch 1108 does not introduce transients in amplifier 1107.

A current proportional to the tangent of the drift angle is applied to a coil 1148 which encircles all three cores 1140, 1142 and 1143. The current for coil 1148 is derived from the tangent bridge 1109. The bridge 1109 comprises a linear one thousand ohm potentiometer 1149 and two fixed resistors 1151 and 1152. The winding 1148 is connected to the junction of resistors 1151 and 1152 and to the adustable contact 1153 of potentiometer 1149. The tangent bridge 1109 is connected through Stabistor 1199 and resistor 1198 across the stable voltage source supplied by Zener diode 1139. The Stabistor 1199 is similar to the diodes 1124, 1126 in counter 1105 and provides with resistor 1198 temperature compensation for the temperature effect on the current in coil 1141. With the values of resistors 1151 and 1152 each equal to eight hundred twenty ohms and the value of potentiometer 1149 equal to one thousand ohms and with approximately two hundred ohms in the circuit of winding 1148 the bridge 1109 produces a current which corresponds with the tangent of the angle of rotation of the shaft which moves slider 1153.

The amplifier 1107 includes a trim winding 1154 which is supplied with an adjustable current from a bridge circuit 1155. The remaining windings on the amplifier 1107 are a pitch-roll product winding 1156 encircling all of the three cores, five short-circuited turns 1157 encircling all of the three cores and an output winding 1158 encircling only the center core 1142. The shorted turns 1157 couple any A.C. unbalance in the cores 1140 and 1143 into the central core 1142 and thus produce an A.C. output in winding 1158. The windings 1148, 1141, 1156 and 1154 are physically wound as the individual insulated conductors of a tetrafilar wire shown in cross-section in FIG. 11d. This wire is transposed by a uniform twist which rotates the positions of the conductors 360° in each linear foot of wire. The effect of this structure is to provide substantially perfect summing of the currents in the four strands of the tetrafilar wire since each has exactly the same coupling to the magnetic cores.

The output of winding 1158 is proportional to the difference between drift angle and the setting of potentiometer 1149 in amplitude and has a phase which corresponds with the sense of the error. This output current from winding 1158 is applied to the input of servo amplifier 1114. The servo amplifier 1114 drives a motor 1191 in a direction to null the amplifier 1107 by adjusting the position of slider 1153 on potentiometer 1149. The motor 1191 is driven by the output transistors of amplifier 1114 which act as alternately conducting switches for an unfiltered full wave rectified supply. The A.C. for motor operation is derived from the full wave supply and the dissipation in the transistors is low since they act only as switches. A generator 1192 provides rate feedback action by supplying generated signals to an input to amplifier 1114. A synchro transmitter 1193 is also driven by the motor 1191 to transmit drift angle values on lines 1194 to the navigation computer and remote indicators. A switch 1195 provides manual control of the motor 1191 for slewing the system manually to any desired drift angle.

For substantially all conditions of flight for commercial-type aircraft the drift angle will be accurately represented by position of slider 1153 without introducing any corrections for pitch and roll. For the occurrence of either pitch or roll, correction of the drift angle indication is likewise not required. Whenever pitch and roll occur at the same time, however, a more accurate representation of drift angle can be obtained by introducing a correction related to the pitch and roll data. This correction improves the accuracy of the system when flying a typical commercial airline profile and furthermore extends the utility of the system to applications where the aircraft is frequently subject to violent maneuvers such as military fighter aircraft and the like in which the simultaneous occurrence of pitch and roll is commonplace.

The pitch and roll product correction is derived in the multiplier 1111. The multiplier 1111 is a magnetic amplifier having three saturable toroidal cores 1161, 1162 and 1163. The cores are stacked to permit common and separate windings to be placed thereon. The core 1161 has a winding 1164 thereon and the core 1163 has a winding 1165 thereon the windings 1164 and 1165 being serially connected and supplied on line 1166, 1167 with the X and Y voltages of a roll synchro, not shown, the difference thereof being an A.C. voltage which varies in magnitude and reverses phase as the sine of the angle of roll. A D.C. input to the multiplier 1111 is applied to a pitch control winding 1168 which encircles all three cores. This current to the winding 1168 is derived in accordance with the output of a pitch synchro, not shown, which supplies on lines 1169, 1171 A.C. voltages the difference thereof being a voltage which varies in magnitude and reverses phase as the sine of the angle of pitch of the aircraft. The voltages on lines 1169 and 1171 relative to conductor 1172 are full wave rectified with opposite polarity in the A.C. to D.C. converter 1173. The output of the circuit 1173 therefore appears on lines 1174, 1175 for application to coil 1168 as a current the magnitude of which is proportional to the magnitude of the sine of the angle of pitch and the direction of which corresponds in sense with the direction of pitch.

Additional windings on the cores of amplifier 1111 include a winding 1176 on core 1162 and a winding 1177 on core 1163 the windings 1176 and 1177 being serially connected to a D.C. bias supply. Five shorted turns 1178 encircle all three cores 1161, 1162 and 1163 thereby couplying any A.C. unbalance in cores 1162 and 1163 to the core 1161. On core 1161 is a winding 1179 which provides an output proportional to the pitch-roll product. A trim winding 1181 encircles all three cores of the product device 1111 and is supplied with an adjustable D.C. current from a bridge circuit 1182. The output of winding 1179 is an A.C. signal the amplitude and phase of which represent the pitch-roll correction product. Since this signal is derived from the two phases of the roll synchro applied on lines 1166, 1167 and the two polarities of D.C. control applied on lines 1174, 1175, the output phase of winding 1179 will have a phase which can be identified as associated with signals of either of the two phases and of either of the two polarities of D.C. This device in effect is a four-quadrant multiplier in the phase-polarity plane since the outgoing signal will have one phase for components in the first and third quadrants and the opposite phase for for components in the second and fourth quadrants. The signal from winding 1179 is applied to a phase demodulator 1183 to derive a direct current on lines 1184, 1185 to be applied to the winding 1156 of the amplifier 1107 the polarity of which represents a true four-quadrant product of the pitch and roll terms. This correction applied to the winding 1156 of the amplifier 1107 corrects the drift angle calculation in accordance with the term $\sin P \sin R$ in Equation 17″.

Navigation computer

A navigation computer suitable for employing the data derived by the Doppler system of the present invention is shown in FIG. 13. The computer utilizes drift angle information from the setting of the tangent bridge 1109 which provides a mechanical shaft rotation indicated at 1301 corresponding with the rotation of movable contact 1153 in the tangent bridge 1109. This rotational information is applied to a differential resolver 1302. An electrical input to the differential 1302 is obtained from a heading source 1303 which provides a reference signal relative to a fixed bearing. The output of the differential 1302 is the sum of the heading angle and drift angle and is applied to a second differential resolver device 1304. A mechanical input to the device 1304 permits a desired track angle to be selected for the course to be flown. This input is applied mechanically at 1305. The device 1304 produces an output which is the difference between the heading plus drift angle input and the selected track angle input thereby providing an output to a synchro control transformer 1306 which is the track error or the difference between the actual track and the selected track angle. The control transformer 1306 has a mechanical output 1307 which is maintained at a setting corresponding to the track error signal by means of a servo loop including servo amplifier 1308 and servo motor 1309. The motor 1309 rotates the mechanical input 1307 to the control transformer 1306 to a position to maintain a zero electrical output to the amplifier 1308 and thereby maintains the setting of mechanical element 1307 equal to the angular track error signal applied to the transformer 1306. This mechanical angle is applied to a mechanical resolver 1311 where it is effective to modify a shaft rotation applied to an input 1312 such that the mechanical shaft rotation outputs 1313 and 1314 are the cosine and sine components of the rotation of shaft 1312. Thus if the shaft 1312 is rotating at a rate R the output on line 1313 will be $R \cos \theta$ where $\theta$ is the angular position of shaft 1307. The corresponding rate of rotation of shaft 1314 will be $R \sin \theta$.

The input to the shaft 1312 is directly proportional to ground speed and is obtained as follows. The signal $f_{GS}$ from the ground speed oscillator 1017 is applied to a divider circuit 1315 which reduces the frequency by a factor of twenty four and applies a signal which is of the order of three hundred cycles per second to a three-phase driver 1316. The three-phase driver 1316 develops three-phase signals from the divider 1315 and drives a three-phase motor 1317 at a synchronous speed proportional to the actual ground speed. This speed of rotation of the motor 1317 is effective to rotate the shafts 1313 and 1314 in accordance with the product of ground speed and the cosine and sine components of the track error angle $\theta$. The rotation of these shafts is accumulated in bi-directional revolution counters 1318, 1319. The counter 1318 reads the integration of speed along the track selected by the selected track angle device 1305. Alternatively, the counter 1318 can be set to the desired course distance and the input 1313 reversed to substract from this value. The indicator 1318 would then read miles to go as in FIG. 2. The counter 1319 accumulates a total which is the integration of speed transverse to the track and thus indicates offset from the desired track at any instant. The counter 1319 is connected to an indicator 1320 which has L and R indications which change whenever the counter goes through zero. The two indications L or R indicate whether the offset is left or right of the desired track.

FIG. 12 is a logic diagram showing the generation of three phase voltages for operating the synchronous motor 1317. The ground speed oscillator frequency, $f_{gs}$, is applied to a count down circuit 1315 comprising three flip-flops 1201, 1202 and 1203. The output of flip-flop 1203 which is one-eighth the frequency of $f_{gs}$ applied to the input of flip-flop 1201 is applied to the input of the three phase driver 1316 which comprises three flip-flops 1204, 1205 and 1206. The ONE output of flip-flop 1206 is coupled on line 1207 to the ONE input of flip-flop 1205 making the three flip-flops 1204, 1205 and 1206 count down by a factor of six due to the action of a ONE output of flip-flop 1206 resetting flip-flop 1205. The ONE outputs of flip-flops 1204, 1205 and 1206 are indicated at A, B and C, respectively, and the waveforms appearing at these ONE outputs are shown in FIG. 12a. The resetting signal on line 1207 results in the modification of the normal count-down waveform as indicated in waveforms B and C.

The outputs of flip-flops 1204, 1205 and 1206 are connected through a matrix 1208 to the inputs of four ORN circuits 1211, 1212, 1213 and 1214. The outputs of the ORN circuits 1211, 1212, 1213 and 1214 and selected points in the matrix 1208 are added at the points 1215, 1216 and 1217. The point 1215 develops the sum of the output of ORN circuit 1211 and the ONE output of flip-flop 1205 which is waveform B. The output at point 1216 is the sum of the output of ORN circuit 1212 and the waveform C. The output at point 1217 is the combined outputs of ORN circuits 1213 and 1214. The outputs at the terminals 1215, 1216 and 1217 can be described from the waveform FIG. 12a since for any negative input to the ORN circuits 1211–1214 a positive output will be obtained. The output of ORN circuit 1211 therefore can be seen to be negative during count 3 since for all the remaining counts ORN circuit 1211 is conducting. This condition follows since the input to ORN circuit 1211 from A produces condition for counts 2, 4 and 6; the input to ORN circuit 1211 from waveform B produces conduction of counts 4 and 5; and the input to ORN circuit 1211 from the ZERO side of flip-flop 1206 produces conduction for counts 4, 5, 6 and 7. Thus only for count 3 is ORN circuit 1211 non-conducting to produce a negative output applied to 1215. The waveform B applied to output terminal 1215 is negative for counts 4 and 5. These negative outputs and the negative output of ORN circuit 1211 make terminal 1215 negative for counts 3, 4 and 5 of each counting cycle. In similar manner it can be shown that terminal 1216 is negative for counts 7, 2 and 3 and terminal 1217 is negative for counts 5, 6 and 7. The resulting waveforms have the phase relations of a three phase supply and are applied to transistor drivers 1218, 1219 and 1220 which control power amplifiers 1221, 1222 and 1223, respectively. The amplifiers 1221, 1222 and 1223 supply three phase power to the three phase winding of motor 1317 thereby causing it to run at a synchronous speed proportional to the input frequency, fgs, applied to flip-flop 1201.

FIG. 6a shows the schematic and logic representation of an ORN circuit. If any input is negative the output is at ground level. Only if all inputs are at ground level will the output be negative. This circuit performs a negative-OR (NOR) function and is used throughout the description of the present invention. Since the output is the inverse of the input, the ORN circuit is an inverter circuit.

The output of one ORN controlling the input of another ORN is an OR circuit.

The output of two ORN circuits controlling inputs to another ORN circuit is an AND circuit.

Figure 6B:
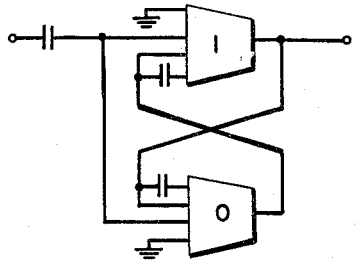

In FIG. 6b two ORN circuits are cross coupled to make a flip-flop counter stage having a ONE and ZERO side. The capacitors provide the storage which makes the stage change state for a pulse input to both stages.

Figure 6C:
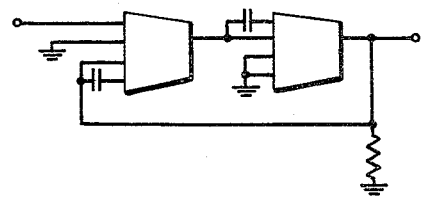

In FIG. 6c a hysteresis switch is shown. For a sine wave input this circuit will switch regeneratively at a predetermined amplitude and thus produce a square wave output of the same frequency.

Figure 6D:
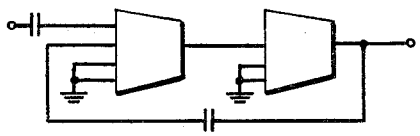

In FIG. 6d a single shot is shown which produces a pulse output of predetermined length for a trigger input signal. The duration of the output pulse is determined by the time constants of the regenerative path.

FIG. 15 shows an improved circuit for de-energizing the computer servos and initiating a flag alarm indication. The circuit of FIG. 15 corresponds generally with FIG. 9 up to the hysteresis switch 907. The squarewave output of switch 907 is differentiated and amplified in a transistor 931. The output pulses from transistor 931 are rectified by a diode 932 and produce a D.C. level on the emitter of a common collector transistor 933 which is proportional to the recurrence rate of the input pulses coming to transistor 931.

The emitter of transistor 933 is normally near −12 volts with no signal input from the combiner 905. As the frequency from combiner 905 increases the transistor 933 approaches −6 volts and a 12 volt Zener diode 934 stops conduction. This action interrupts the current through a transistor 935 thereby removing D.C. power from the servo amplifiers 1087 and 1114. As the frequency of the flag combiner output 905 increases further, a larger positive voltage is generated on the output of transistor 933. When the output of transistor 933 becomes positive with respect to ground, a transistor amplifier 936 conducts and actuates a flag indicator. The input circuit of transistor 936 contains an integrating RC network to smooth any transient voltages so the flag indication will be actuated only when the average value of frequency from the combiner 905 exceeds a pre-set level. The flag alarm relay 912 is in the collector circuit of the output of a hysteresis switch 937.

The hysteresis switch 937 has an input from a hysteresis switch 938 which is operated from an AND circuit 939 the inputs of which are derived from the phase lock detector amplifiers 727.

The operation of the circuit of FIG. 15 provides two thresholds the lower one being effective to disable the servo amplifiers 1087 and 1114 and the higher one producing the flag alarm indication. This circuit provides an alternative mode of operation to that of FIG. 9 where the potential on line 931 is applied to the servo amplifiers to reduce the gain in the manner of an AGC circuit.

The calibration of the system of the present invention with respect to the computations performed on the Doppler data is accomplished by means of the pre-set count entered in the clock counter 1012 for the $\Phi_z$, $\Phi_y$ and $\Phi_x$ counting phases. The count length of these counting phases provides for selection of the proportionality constants relating the frequency of the ground speed oscillator and the actual Doppler data. Consequently, the factor affecting the relation between these quantities, such as, for example, the various frequency divisions which occur in the system can be compensated in the output of the system. The system can also be recalibrated for change in the antenna beam angles by selecting the pre-set of counter 1021 to compensate for the change in the Doppler frequencies.

While a particular preferred embodiment of the present invention has been disclosed in detail it will be apparent that the invention may be practiced otherwise than as herein disclosed. Modifications and equivalents of the disclosed apparatus will be apparent to those skilled in the art without departing from the spirit of the invention which is limited only by the scope of the appended claims.

What is claimed is:

1. A Doppler navigation system comprising a fixed antenna array; a feed system for said array; electrical means including said array and said feed system for determining a plurality of positions for a directive pattern of said array; means for controlling said electrical means to direct said pattern sequentially to said positions; a microwave oscillator having a low-Q resonator with a substantially flat response region on each side of resonance; an AFC loop having a predetermined cutoff frequency for maintaining the frequency of said oscillator fixed; means for frequency modulating said oscillator with a modulation frequency above said predetermined cutoff frequency and deviation within said regions; means for changing said modulation frequency in synchronism with the sequential positions of said pattern; means for coupling microwave energy from said oscillator to said feed system; means for isolating energy received by said array from energy transmitted by said array; a mixer; means for coupling said received energy and a portion of said microwave energy from said oscillator to said mixer; means for selecting a higher order harmonic of said modulation frequency from the output of said mixer; means for mixing said harmonic with the same order harmonic of said modulation frequency to recover the Doppler spectrum on said received energy; a stable sub-carrier source; means for amplitude modulating said sub-carrier with said spectrum; a spectrum center tracker for generating a frequency equal to the frequency center of power of an input spectrum; means for applying said Doppler spectrum modulated sub-carrier to the input of said tracker; means for sequentially operating said tracker in synchronism with the positions of said antenna pattern to generate a center-frequency for the Doppler spectrum for each said position; means for maintaining each of said center-frequencies during the intervals when the corresponding Doppler spectrum is not applied to said tracker; means for combining said center-frequencies to obtain separate frequencies representative of the velocity components of the aircraft; means for combining said center-frequencies to obtain a frequency which is substantially invariant when all of said center-frequencies are present, means responsive to said invariant frequency to indicate when substantial deviation occurs in said invariant frequency, means responsive to said frequencies representative of velocity components for generating a frequency directly proportional to ground speed; means responsive to frequencies related to forward and transverse velocity components for generating a current representative of the magnitude and sense of the drift angle; means for modifying said current in accordance with a function of the product of pitch and roll; and a utilization device for said ground speed frequency and said drift angle current.

2. A Doppler navigation system comprising a fixed antenna array having a plurality of contiguous waveguides providing a lower planar surface with an array of radiating means distributed over said surface to form a pencil beam, a feed system having means for feeding said waveguides from one end with a predetermined phase progression between adjacent waveguides and means for feeding said waveguides with the opposite phase progression, electrical means for selectively feeding said array with said predetermined and opposite phase progressions to determine a plurality of positions for the directive pattern of said array, a microwave oscillator having a low-Q resonator with a substantially flat response region on each side of resonance; an AFC loop having a predetermined cutoff frequency for maintaining the frequency of said oscillator fixed; means for frequency modulating said oscillator with a modulation frequency above said predetermined cutoff frequency and deviation within said regions; means for changing said modulation frequency in synchronism with the sequential positions of said pattern; means for coupling microwave energy from said oscillator to said feed system; means for isolating energy received by said array from energy transmitted by said array; a mixer; means for coupling said received energy and a portion of said microwave energy from said oscillator to said mixer; means for selecting a higher order harmonic of said modulation frequency from the output of said mixer; means for mixing said harmonic with the same order harmonic of said modulation frequency to recover the Doppler spectrum on said received energy; a stable sub-carrier source; means for amplitude modulating said sub-carrier with said spectrum; a spectrum center tracker for generating a frequency equal to the frequency center of power of an input spectrum; means for applying said Doppler spectrum modulated sub-carrier to the input of said tracker; means for sequentially operating said tracker in synchronism with the positions of said antenna pattern to generate a center-frequency for the Doppler spectrum received for each said position; means for maintaining each of said center-frequencies during the intervals when the corresponding Doppler spectrum is not applied to said tracker, means for combining said center-frequencies to obtain separate frequencies representative of the velocity components of the aircraft; means for combining said center-frequencies to obtain a frequency which is substantially invariant when all of said center-frequencies are present, means responsive to said invariant frequency to indicate when substantial deviation occurs in said invariant frequency, means responsive to said frequencies representative of velocity components for generating a frequency directly proportional to ground speed; means responsive to frequencies related to forward and transverse velocity components for generating a current representative of the magnitude and sense of the drift angle; means for modifying said current in accordance with a function of the product of pitch and roll; and a utilization device for said ground speed frequency and said drift angle current.

3. A Doppler navigation system comprising a fixed antenna array having a plurality of contiguous waveguides providing a lower planar surface with an array of radiating means distributed over said surface to form a pencil beam, a feed system including a pair of power dividers, means for alternately switching, the input of said feed system to said dividers, a first set of hybrid couplers connected to the respective outputs of one of said dividers, a second set of hybrid couplers connected to the respective outputs of the other said dividers, and means coupling a pair of phase spaced outputs from each output of each said hybrid to a pair of physically spaced ones of said waveguides, the pairs of outputs from each hybrid being interdigited to provide a uniform phase progression across successive waveguides in said array for feeding one of said pair of power dividers and the opposite progression for feeding the other said divider, electrical means including said array and said feed system for determining a plurality of positions for a directive pattern of said array; means for controlling said electrical means to direct said pattern sequentially to said positions; a microwave oscillator having a low-Q resonator with a substantially flat response region on each side of resonance; an AFC loop having a predetermined cutoff frequency for maintaining the frequency of said oscillator fixed; means for frequency modulating said oscillator with a modulation frequency above said predetermined cutoff frequency and deviation within said regions; means for changing said modulation frequency in synchronism with the sequential postions of said pattern; means for coupling microwave energy from said oscillator to said feed system; means for isolating energy received by said array from energy transmitted by said array; a mixer; means for coupling said received energy and a portion of said microwave energy from said oscillator to said mixer; means for selecting a higher order harmonic of said modulation frequency from the output of said mixer; means for mixing said harmonic with the same harmonic of said modulation frequency to recover the Doppler spectrum on said received energy; a stable sub-carrier source; means for amplitude modulating said sub-carrier with said spectrum; a spectrum center tracker for generating a frequency equal to the frequency center of power of an input spectrum; means for applying said Doppler spectrum modulated sub-carrier to the input of said tracker; means for sequentially operating said tracker in synchronism with the positions of said antenna pattern to generate a center-frequency for the Doppler spectrum received for each said position; means for maintaining each of said center-frequencies during the intervals when the corresponding Doppler spectrum is not applied to said tracker, means for combining said center-frequencies to obtain separate frequencies representative of the velocity components of the aircraft; means for combining said center-frequencies to obtain a frequency which is substantially invariant when all of said center-frequencies are present, means responsive to said invariant frequency to indicate when substantial deviation occurs in said invariant frequency, means responsive to said frequencies representative of velocity components for generating a frequency directly proportional to ground speed; means responsive to frequencies related to forward and transverse velocity components for generating a current representative of the magnitude and sense of the drift angle; means for modifying said current in accordance with a function of the product of pitch and roll; and a utilization device for said ground speed frequency and said drift angle current.

4. A fixed antenna array comprising a plurality of contiguous waveguides providing a lower planar surface with an array of radiating means distributed over said surface to form a pencil beam, a feed system including a pair of power dividers, means for alternately switching the input of said feed system to said dividers, a first set of hybrid couplers connected to the respective outputs of one of said dividers, a second set of hybrid couplers connected to the respective outputs of the other one of said dividers, and means coupling a pair of phase spaced outputs from each output of each said hybrid to a respective pair of physically spaced ones of said waveguides, the pairs of outputs from each hybrid being interdigited to provide a uniform phase progression across successive waveguides in said array for feeding one of said pair of power dividers and the opposite progression for feeding the other said divider.

5. A shiftable beam antenna comprising a plurality of rectangular waveguides having longitudinal slot arrays in one broad wall, means supporting said waveguides in side-by-side positions with said arrays in a common plane, a plurality of pairs of hybrid couplers each having two phase spaced outputs and two inputs, the relative phase between said outputs reversing for power applied alternately to said two inputs, means for feeding corresponding inputs of said pairs with a phase spaced progression, means for alternatively feeding the other inputs of said pairs with an opposite phase spaced progression, and means coupling the outputs of said couplers to alternate ones of said waveguides with the outputs from said pairs interdigitated.

6. A Doppler navigation system comprising a fixed antenna array, a feed system for said array, electrical means including said array and said feed system for determining four positions for a directive pattern of said array, a pair of flip-flops operating in quadrature phase at a common frequency, means for controlling said electrical means to direct said pattern sequentially to said four positions in accordance with the four conditions determined by the state of said flip-flops, a microwave oscillator having a low-Q resonator with a substantially flat response region on each side of resonance, an AFC loop having a predetermined cutoff frequency for maintaining the frequency of said oscillator fixed, means for frequency modulating said oscillator with a modulation frequency above said predetermined cutoff frequency and deviation within said regions, means for changing said modulation frequency in synchronism with the sequential positions of said pattern, means for coupling microwave energy from said oscillator to said feed system, means for isolating energy received by said array from energy transmitted by said array, a mixer, means for coupling said received energy and a portion of said microwave energy from said oscillator to said mixer, means for selecting a higher order harmonic of said modulation frequency from the output of said mixer, means for mixing said harmonic with the same order harmonic of said modulation frequency to recover the Doppler spectrum on said received energy, a stable sub-carrier source, means for amplitude modulating said sub-carrier with said spectrum, a spectrum center tracker for generating a frequency equal to the frequency center of power of an input spectrum, means for applying said Doppler spectrum modulated sub-carrier to the input of said tracker, means for sequentially operating said tracker in synchronism with the positions of said antenna pattern to generate a center-frequency for the Doppler spectrum received for each said position, means for maintaining each of said center-frequencies during the intervals when the corresponding Doppler spectrum is not applied to said tracker, means for combining said center-frequencies to obtain separate frequencies representative of the velocity components of the aircraft, means for combining said center-frequencies to obtain a frequency which is substantially invariant when all of said center-frequencies are present, means responsive to said frequencies representative of velocity components for generating a frequency directly proportional to ground speed, means responsive to frequencies related to forward and transverse velocity components for generating a current representative of the magnitude and sense of the drift angle, means for modifying said current in accordance with a function of pitch and roll, and a utilization device for said ground speed frequency and said drift angle current.

7. A Doppler navigation system comprising a fixed antenna array; a feed system for said array; electrical means including said array and said feed system for determining four positions for a directive pattern of said array; a pair of flip-flops operating in quadrature phase at a common frequency; and means for controlling said electrical means to direct said pattern sequentially to said four positions in accordance with the four conditions determined by the state of said flip-flops.

8. Apparatus according to claim 7 in which an output of one of said flip-flops is applied as an input to the other flip-flop to assure one sense of progression for said beam positions.

9. A Doppler navigation system comprising a fixed antenna array, a feed system for said array, electrical means including said array and said feed system for determining a plurality of positions for a directive pattern of said array, means for controlling said electrical means to direct said pattern sequentially to said positions, a fixed tuned microwave klystron having a low-Q resonator with power mode having substantially flat response region on each side of resonance, an AFC loop having a predetermined cutoff frequency for maintaining the frequency of said oscillator fixed, said loop including a high-Q cavity tuned to a predetermined frequency within said power mode, means coupling a portion of the output of said klystron to said cavity, a detector coupled to said cavity, means for amplifying the output of said detector, and a phase comparator having the output of said amplifier as one input and producing an output to control the frequency of said klystron; means for frequency modulating said klystron with a modulation frequency above said predetermined cutoff frequency and deviation within said regions; means for applying said modulation frequency as a reference phase to the other input of said phase comparator; means for changing said modulation frequency in synchronism with the sequential positions of said pattern; means for coupling microwave energy from said oscillator to said feed system; means for isolating energy received by said array from energy transmitted by said array; a mixer; means for coupling said received energy and a portion of said microwave energy from said oscillator to said mixer; means for selecting a higher order harmonic of said modulation frequency from the output of said mixer; means for mixing said harmonic with the same order harmonic of said modulation frequency to recover the Doppler spectrum on said received energy; a stable sub-carrier source; means for amplitude modulating said sub-carrier with said spectrum; a spectrum center tracker for generating a frequency equal to the frequency center of power of an input spectrum; means for applying said Doppler spectrum modulated sub-carrier to the input of said tracker; means for sequentially operating said tracker in synchronism with the positions of said antenna pattern to generate a center-frequency for the Doppler spectrum received for each said position; means for maintaining each of said center frequencies during the intervals when the corresponding Doppler spectrum is not applied to said tracker; means for combining said center-frequencies to obtain separate frequencies representative of the velocity components of the aircraft; means for combining said center-frequencies to obtain a frequency which is substantially invariant when all of said center-frequencies are present; means responsive to said invariant frequency to indicate when substantial deviation occurs in said invariant frequency; means responsive to said frequencies representative of velocity components for generating a frequency directly proportional to ground speed;

means responsive to frequencies related to forward and transverse velocity components for generating a current representative of the magnitude and sense of the drift angle; means for modifying said current in accordance with a function of pitch and roll; and a utilization device for said ground speed frequency and said drift angle current.

10. A Doppler navigation system comprising a fixed antenna array; a feed system for said array; electrical means including said array and said feed system for determining a plurality of positions for a directive pattern of said array; means for controlling said electrical means to direct said pattern sequentially to said positions; a microwave oscillator having a low-Q resonator with a substantially flat response region on each side of resonance; an AFC loop having a predetermined cutoff frequency for maintaining the frequency of said oscillator fixed; means for frequency modulating said oscillator with a modulation frequency above said predetermined cutoff frequency and deviation within said regions; a voltage tuned oscillator for generating said modulation frequency, means for generating a multilevel squarewave having durations of said levels which are an integral multiple of the period for said beam to occupy said plurality of positions, means for synchronizing said squarewave with the period of said beam; means for coupling microwave energy from said oscillator to said feed system; means for isolating energy received by said array from energy transmitted by said array; a mixer; means for coupling said received energy and a portion of said microwave energy from said oscillator to said mixer; means for selecting a higher order harmonic of said modulation frequency from the output of said mixer; means for mixing said harmonic with the same order harmonic of said modulation frequency to recover the Doppler spectrum on said received energy; a stable sub-carrier source; means for amplitude modulating said sub-carrier with said spectrum; a spectrum center tracker for generating a frequency equal to the frequency center of power of an input spectrum; means for applying said Doppler spectrum modulated sub-carrier to the input of said tracker; means for sequentially operating said tracker in synchronism with the positions of said antenna pattern to generate a center-frequency for the Doppler spectrum received for each said position; means for maintaining each of said center-frequencies during the intervals when the corresponding Doppler spectrum is not applied to said tracker; means for combining said center-frequencies to obtain separate frequencies representative of the velocity components of the aircraft; means for combining said center-frequencies to obtain a frequency which is substantially invariant when all of said center-frequencies are present; means responsive to said invariant frequency to indicate when substantial deviation occurs in said invariant frequency, means responsive to said frequencies representative of velocity components for generating a frequency directly proportional to ground speed; means responsive to frequencies related to forward and transverse velocity components for generating a current representative of the magnitude and sense of the drift angle; means for modifying said current in accordance with a function of pitch and roll; and a utilization device for said ground speed frequency and said drift angle current.

11. In a Doppler system means for directing a beam of microwave energy in a plurality of directions sequentially, means for recovering Doppler data from energy returned from said beams, means for frequency modulating said microwave energy and means for changing the modulating frequency in integral relation to the sequence of said beam.

12. A Doppler system comprising a microwave oscillator, means for frequency modulating said oscillator, means for changing said modulation frequency in stepwise increments periodically, means for radiating microwave energy from said oscillator and receiving reflected energy, a mixer, means for coupling said received energy and a portion of said microwave energy from said oscillator to said mixer, means for selecting a higher order harmonic of said modulation frequency from the output of said mixer, means for mixing said harmonic with the same order harmonic of said modulation frequency to recover the Doppler spectrum on said received energy, a sub-carrier oscillator, means for modulating the sub-carrier from said sub-carrier oscillator with said Doppler spectrum, a single side band filter for selecting one side band of the modulated sub-carrier, means for developing an automatic beam control potential in accordance with the signal level of said side band, a frequency tracker coupled to said filter for tracking said side band, and means for slewing said tracker at a rate controlled by said potential.

13. A Doppler navigation system comprising a fixed antenna array; a feed system for said array; electrical means including said array and said feed system for determining a plurality of positions for a directive pattern of said array; means for controlling said electrical means to direct said pattern sequentially to said positions; a microwave oscillator having a low-Q resonator with a substantially flat response region on each side of resonance; an AFC loop having a predetermined cutoff frequency for maintaining the frequency of said oscillator fixed; means for frequency modulating said oscillator with a modulation frequency above said predetermined cutoff frequency and deviation within said regions; means for changing said modulation frequency in synchronism with the sequential positions of said pattern; means for coupling microwave energy from said oscillator to said feed system; means for isolating energy received by said array from energy transmitted by said array; a mixer; means for coupling said received energy and a portion of said microwave energy from said oscillator to said mixer; means for selecting a higher order harmonic of said modulation frequency from the output of said mixer; means for mixing said harmonic with the same order harmonic of said modulation frequency to recover the Doppler spectrum on said received energy, a stable sub-carrier source; means for amplitude modulating said sub-carrier with said spectrum; a spectrum center tracker having a pair of mixers, means for coupling a signal to each mixer of said pair with 90° relative phase shift, means for coupling a second signal to said pair of mixers, a balanced demodulator, means for coupling the outputs of said mixers with 90° additional relative phase shift to said balanced demodulator, means for integrating the output of said balanced demodulator, means for generating a frequency in accordance with the output of said integrator, means for coupling said frequency as one input signal to said pair of mixers, and means for applying said Doppler spectrum modulated sub-carrier as the other signal input to said pair of mixers; means for sequentially operating said tracker in synchronism with the positions of said antenna pattern to generate a center-frequency for the Doppler spectrum received for each said position; means for maintaining each of said center-frequencies during the intervals when the corresponding Doppler spectrum is not applied to said tracker; means for combining said center-frequencies to obtain separate frequencies representative of the velocity components of the aircraft; means for combining said center-frequencies to obtain a frequency which is substantially invariant when all of said center-frequencies are present; means responsive to said invariant frequency to indicate when substantial deviation occurs in said invariant frequency, means responsive to said frequencies representative of velocity components for generating a frequency directly proportional to ground speed; means responsive to frequencies related to forward and transverse velocity components for generating a current representative of the magnitude and sense of the drift angle; means for modifying said current in accordance with a function of pitch and roll; and a utilization device for said ground speed frequency and said drift angle current.

14. A signal spectrum center tracker comprising a pair of mixers, means for coupling a signal to each mixer of said pair with 90° relative phase shift, means for coupling a second signal to said pair of mixers, a balanced demodulator, means for coupling the outputs of said mixers with 90° additional relative phase shift to said balanced demodulator, means for integrating the output of said balanced demodulator, means for generating a frequency in accordance with the output of said integrator, means for coupling said frequency as one input signal to said pair of mixers, and means for applying said signal spectrum as the other signal input to said pair of mixers.

15. A Doppler navigation system comprising a fixed antenna array; a feed system for said array; electrical means including said array and said feed system for determining a plurality of positions for a directive pattern of said array; means for controlling said electrical means to direct said pattern sequentially to said position, a microwave oscillator having a low-Q resonator with a substantially flat response region on each side of resonance; an AFC loop having a predetermined cutoff frequency for maintaining the frequency of said oscillator fixed; means for frequency modulating said oscillator with a modulation frequency above said predetermined cutoff frequency and deviation within said regions; means for changing said modulation frequency in synchronism with the sequential positions of said pattern; means for coupling microwave energy from said oscillator to said feed system; means for isolating energy received by said array from energy transmitted by said array; a mixer; means for coupling said received energy and a portion of said microwave energy from said oscillator to said mixer; means for selecting a higher order harmonic of said modulation frequency from the output of said mixer; means for mixing said harmonic with the same order harmonic of said modulation frequency to recover the Doppler spectrum on said received energy; a stable sub-carrier source; means for amplitude modulating said sub-carrier with said spectrum; a spectrum center tracker for generating a frequency equal to the frequency center of power of an input spectrum; means for applying said Doppler spectrum modulated sub-carrier to the input of said tracker; a separate adjustable oscillator in said tracker for each of said beam positions, individual means for adjusting said oscillators, means for sequentially coupling said individual adjusting means for tracking in synchronism with said beam positions respectively, means for slewing the frequency of each said coupled oscillator when said oscillator frequency does not coincide with the center of the input spectrum, and means for interrupting said slewing when said oscillator frequency approaches said spectrum center; means for maintaining each of said center-frequencies during the intervals when the corresponding Doppler spectrum is not applied to said tracker; means for combining said center-frequencies to obtain separate frequencies representative of the velocity components of the aircraft; means for combining said center-frequencies to obtain a frequency which is substantially invariant when all of said center-frequencies are present; means responsive to said invariant frequency to indicate when substantial deviation occurs in said invariant frequency; means responsive to said frequencies representative of velocity components for generating a frequency directly proportional to ground speed; means responsive to frequencies related to forward and transverse velocity components for generating a current representative of the magnitude and sense of the drift angle; means for modifying said current in accordance with a function of pitch and roll; and a utilization device for said ground speed frequency and said drift angle current.

16. Apparatus according to claim 15 in which said interrupting means comprises means for frequency modulating said adjustable oscillators at an audio frequency, means for detecting said audio frequency in the output of said tracker, a phase detector coupled to the source of said audio frequency and said detected audio frequency and responsive only to detected audio frequency of fixed phase relative to said source for interrupting said slewing.

17. A Doppler navigation system comprising a fixed antenna array; a feed system for said array; electrical means including said array and said feed system for determining four positions for a directive pattern of said array, said four positions each being symmetrically located to the front and back and to the right and left of said array; means for controlling said electrical means to direct said pattern sequentially to said positions; a microwave oscillator having a low-Q resonator with a substantially flat response region on each side of resonance; an AFC loop having a predetermined cutoff frequency for maintaining the frequency of said oscillator fixed; means for frequency modulating said oscillator with a modulation frequency above said predetermined cutoff frequency and deviation within said regions; means for changing said modulation frequency in synchronism with the sequential positions of said pattern; means for coupling microwave energy from said oscillator to said feed system; means for isolating energy received by said array from energy transmitted by said array; a mixer; means for coupling said received energy and a portion of said microwave energy from said oscillator to said mixer; means for selecting a higher order harmonic of said modulation frequency from the output of said mixer; means for mixing said harmonic with the same order harmonic of said modulation frequency to recover the Doppler spectrum on said received energy; a stable sub-carrier source; means for amplitude modulating said sub-carrier with said spectrum; means for applying said Doppler spectrum modulated sub-carrier to the input of said tracker; means for sequentially operating said tracker in synchronism with the position of said antenna pattern to generate a center-frequency for the Doppler spectrum received for each said position; means for maintaining each of said center-frequencies during the intervals when the corresponding Doppler spectrum is not applied to said tracker; means for obtaining the sum of the center-frequencies for all of said beams representative of forward velocity, means for obtaining the differences between the sums of the diagonally opposite beam center frequencies representative of transverse velocity, and means for obtaining the difference between the forward and rearward beam center-frequencies representative of vertical velocity; means for combining said center-frequencies to obtain a frequency which is substantially invariant when all of said center-frequencies are present; means responsive to said invariant frequency to indicate when substantial deviation occurs in said invariant frequency, means responsive to said frequencies representative of velocity components for generating a frequency directly proportional to ground speed; means responsive to frequencies related to forward and transverse velocity components for generating a current representative of the magnitude and sense of the drift angle; means for modifying said current in accordance with a function of pitch and roll; and a utilization device for said ground speed frequency and said drift angle current.

18. Apparatus according to claim 17 and including means for obtaining the difference between the sums of the left and right beam center frequencies to provide a substantially invariant frequency when all of said center frequencies are present.

19. A Doppler navigation system comprising a fixed antenna array; a feed system for said array; electrical means including said array and said feed system for determining a plurality of positions for a directive pattern of said array; means for controlling said electrical means to direct said pattern sequentially to said positions; a microwave oscillator having a low-Q resonator with a substantially flat response region on each side of resonance; an AFC loop having a predetermined cutoff frequency for maintaining the frequency of said oscillator fixed; means for frequency modulating said oscillator with a modulation frequency above said predetermined cutoff frequency and deviation within said regions; means for changing said modulation frequency in synchronism with the sequential positions of said pattern; means for coupling microwave energy from said oscillator to said feed system; means for isolating energy received by said array from energy transmitted by said array; a mixer; means for coupling said received energy and a portion of said microwave energy from said oscillator to said mixer; means for selecting a higher order harmonic of said modulation frequency from the output of said mixer; means for mixing said harmonic with the same order harmonic of said modulation frequency to recover the Doppler spectrum on said received energy; a stable sub-carrier source; means for amplitude modulating said sub-carrier with said spectrum; a spectrum center tracker for generating a frequency equal to the frequency center of power of an input spectrum; means for applying said Doppler spectrum modulated sub-carrier to the input of said tracker; means for sequentially operating said tracker in synchronism with the positions of said antenna pattern to generate a center-frequency for the Doppler spectrum received for each said position; means for maintaining each of said center-frequencies during the intervals when the corresponding Doppler spectrum is not applied to said tracker; means for combining said center-frequencies to obtain separate frequencies representative of the velocity components of the aircraft; means for combining said center-frequencies to obtain a frequency which is substantially invariant when all of said center-frequencies are present; means for developing a control potential in accordance with deviation of said invariant frequency from a predetermined value; means responsive to said frequencies representative of velocity components for generating a frequency directly proportional to ground speed; means responsive to frequencies related to forward and transverse velocity components for generating a current representative of the magnitude and sense of the drift angle; means for reducing the sensitivity of said means for generating ground speed and drift angle values in response to a predetermined level of said control potential corresponding to a first value of said deviation; alarm means for indicating the occurrence of a second predetermined level of said control potential corresponding to a second larger value of said deviation; means for modifying said current in accordance with a function of pitch and roll; and a utilization device for said ground speed frequency and said drift angle current.

20. In a Doppler system means for generating a frequency which is substantially invariant when Doppler data from all of a plurality of antenna beams are being received, means for developing a control potential in accordance with deviation of said invariant frequency from a predetermined value, means for processing said Doppler data, means for reducing the sensitivity of said processing means in response to a predetermined level of said control potential corresponding to a first value of said deviation and alarm means for indicating the occurrence of a second predetermined level of said control potential corresponding to a second larger value of said deviation.

21. A Doppler navigation system comprising a fixed antenna array; a feed system for said array; electrical means including said array and said feed system for determining a plurality of positions for a directive pattern of said array; means for controlling said electrical means to direct said pattern sequentially to said positions; a microwave oscillator having a low-Q resonator with a substantially flat response region on each side of resonance; an AFC loop having a predetermined cutoff frequency for maintaining the frequency of said oscillator fixed; means for frequency modulating said oscillator with a modulation frequency above said predetermined cutoff frequency and deviation within said regions; means for changing said modulation frequency in synchronism with the sequential positions of said pattern; means for coupling microwave energy from said oscillator to said feed system; means for isolating energy received by said array from energy transmitted by said array; a mixer; means for coupling said received energy and a portion of said microwave energy from said oscillator to said mixer; means for selecting a higher order harmonic of said modulation frequency from the output of said mixer; means for mixing said harmonic with the same order harmonic of said modulation frequency to recover the Doppler spectrum on said received energy; a stable sub-carrier source; means for amplitude modulating said sub-carrier with said spectrum; a spectrum center tracker for generating a frequency equal to the frequency center of power of an input spectrum; means for applying said Doppler spectrum modulated sub-carrier to the input of said tracker; means for sequentially operating said tracker in synchronism with the positions of said antenna pattern to generate a center-frequency for the Doppler spectrum received for each said position; means for maintaining each of said center-frequencies during the intervals when the corresponding Doppler spectrum is not applied to said tracker; means for combining said center-frequencies to obtain separate frequencies representative of the velocity components of the aircraft; means for combining said center-frequencies to obtain a frequency which is substantially invariant when all of said center-frequencies are present; means responsive to said invariant frequency to indicate when substantial deviation occurs in said invariant frequency; means for generating a ground speed frequency, means for counting said ground speed frequency, means for counting said frequencies representative of velocity components for predetermined intervals corresponding to the time for counting predetermined number of cycles of said ground speed frequency, means for obtaining the sum of the squares of the counts of said frequencies representative of velocity components, means for comparing the magnitude of said sum of the squares with the count of said ground speed frequency, and means responsive to said comparing means for adjusting said ground speed frequency to obtain a predetermined relation between said magnitude and said count compared by said comparing means to establish a predetermined relation between said ground speed frequency and actual ground speed; means responsive to frequencies related to forward and transverse velocity components for generating a current representative of the magnitude and sense of the drift angle; means for modifying said current in accordance with a function of pitch and roll; and a utilization device for said ground speed frequency and said drift angle current.

22. In a Doppler system means for obtaining separate frequencies representative of the velocity components of the aircraft, means for generating a ground speed frequency, means for counting said ground speed frequency, means for counting said frequencies representative of velocity components for predetermined intervals corresponding to the time for counting predetermined number of cycles of said ground speed frequency, means for obtaining the sum of the squares of the counts of said frequencies representative of velocity components, means for comparing the magnitude of said sum of the squares with the count of said ground speed frequency, and means responsive to said comparing means for adjusting said ground speed frequency to obtain a predetermined relation between said magnitude and said count compared by said comparing means to establish a predetermined relation between said ground speed frequency and actual ground speed.

23. Means for generating a frequency representative of the magnitude of a quantity equal to the square root of the sum of the squares of a plurality of components comprising means for generating a variable frequency, means for counting said frequency, means for deriving frequencies in accordance with the magnitude of said components, means for counting said derived frequencies for predetermined intervals corresponding to the time for counting pretetermined number of cycles of said generated frequency, means for obtaining the sum of the squares of the counts of said derived frequencies, means for comparing the magnitude of said sum of the squares with the count of said generated frequency, and means responsive to said comparing means for adjusting said variable frequency to obtain a predetermined relation between said magnitude and said count compared by said comparing means whereby said adjusted variable frequency is directly related to said magnitude.

24. A Doppler navigation system for an aircraft comprising a fixed antenna array; a feed system for said array; electrical means including said array and said feed system for determining four positions for a directive pattern of said array directed symmetrically forward and rearward and symmetrically located on opposite sides of the heading of said aircraft; means for controlling said electrical means to direct said pattern sequentially to said positions; a microwave oscillator having a low-Q resonator with a substantially flat response region on each side of resonance; an AFC loop having a predetermined cutoff frequency for maintaining the frequency of said oscillator fixed; means for frequency modulating said oscillator with a modulation frequency above said predetermined cutoff frequency and deviation within said regions; means for changing said modulation frequency in synchronism with the sequential positions of said pattern; means for coupling microwave energy from said oscillator to said feed system; means for isolating energy received by said array from energy transmitted by said array; a mixer; means for coupling said received energy and a portion of said microwave energy from said oscillator to said mixer; means for selecting a higher order harmonic of said modulation frequency from the output of said mixer; means for mixing said harmonic with the same order harmonic of said modulation frequency to recover the Doppler spectrum on said received energy; a stable sub-carrier source; means for amplitude modulating said sub-carrier with said spectrum; a spectrum center tracker for generating a frequency equal to the frequency center of power of an input spectrum; means for applying said Doppler spectrum modulated sub-carrier to the input of said tracker; means for sequentially operating said tracker in synchronism with the positions of said antenna pattern to generate a center frequency for the Doppler spectrum received for each said position; means for maintaining each of said center-frequencies during the intervals when the corresponding Doppler spectrum is not applied to said tracker; means for combining said center-frequencies to obtain separate frequencies representative of the velocity components of the aircraft; means for combining said center-frequencies to obtain a frequency which is substantially invariant when all of said center-frequencies are present; means responsive to said invariant frequency to indicate when substantial deviation occurs in said invariant frequency; means responsive to said frequencies representative of velocity components for generating a frequency directly proportional to ground speed; means for counting one of said frequencies representative of the forward velocity component, means for combining said center-frequencies to obtain a separate frequency equal to the sum of the Doppler frequencies from a diagonal pair of said beams, means for counting said separate frequency from said diagonal pair, means for comparing the counts of said separate frequency accumulated during the period of a predetermined count of said froward velocity component frequency, means for generating a first current of magnitude and polarity corresponding to the difference between said counts and the sense of said difference, a rotatable shaft, means for generating a second current proportional to the tangent of the angle of said shaft, and means responsive to the difference between said currents for altering said angle to produce a null; means for modifying said null in accordance with a function of pitch and roll; and a utilization device for said ground speed frequency and said angle of said shaft.

25. Apparatus according to claim 24 in which said means for modifying said null includes a magnetic amplifier, means for applying inputs to said magnetic amplifier proportional to the sine of the angle of pitch and the sine of the angle of roll, means for deriving an output from said magnetic amplifier proportional to the product of said inputs, means for generating a third current in accordance with said product, and means for introducing said last named current to modify said null.

26. In a Doppler system a digital difference to analog converter for determining the magnitude and sense of the drift angle comprising means for counting one digital quantity proportional to the sum of the Doppler shifts on a diagonal beam pair, means for counting a second digital quantity proportional to half the frequency representing heading velocity, means for comparing the counts of said one digital quantity accumulated during the period of a predetermined count of said second digital quantity and means for producing an analogue quantity from the count of said one digital quantity having magnitude and sense corresponding to the difference between said counts and the sense of said difference.

27. Apparatus according to claim 1 in which said utilization device comprises means for selecting a desired track angle, means for combining heading and drift angle data to obtain true course angle, means for determining the difference angle between selected track angle and said course angle, means for driving a shaft at a speed directly proportional to said group speed frequency, means for resolving said shaft rotation into two shaft rotations proportional respectively to the sine and cosine of said difference angle and a pair of indicators for indicating numbers respectively proportional to the number of rotations of said two shafts.

28. A navigation system for giving continuous data of position relative to a predetermined track comprising means for deriving a frequency directly proportional to ground speed, means for deriving a quantity representative of drift angle, means for selecting a desired track angle, means for combining heading and drift angle data to obtain true course angle, means for determining the difference angle between said selected track angle and said course angle, means for driving a shaft at a speed directly proportional to said ground speed frequency, means for resolving said shaft rotation into two shaft rotations proportional respectively to the sine and cosine of said difference angle, a pair of indicators for indicating numbers respectively proportional to the number of rotations of said two shafts to show distance offset and distance along track respectively, and a third indicator for showing the sense of said offset.

29. Apparatus according to claim 25 in which said current responsive means for producing a null is a second magnetic amplifier having a tetrafilar transposed winding thereon, a source of adjustable current, and means for coupling said first, second, third and adjustable currents to the respective strands of said tetrafilar winding.

30. A magnetic amplifier comprising a saturable magnetic core, a winding of plural strands of wire insulated from one another and twisted about a common axis, said winding wound on said core, and means for supplying separate currents to the strands of said winding.

31. Apparatus according to claim 22 including radar means for obtaining said separate frequencies and means for selectively modifying the count of said ground speed frequency to compensate for the effect of the surface beneath said aircraft on said separate frequencies.

32. In a Doppler system fixed antenna means for radiating a plurality of beams, means for deriving frequencies equal to the Doppler shift on each of said beams, means responsive to said frequencies for generating a frequency directly proportional to ground speed, a motor driven in synchronism with said last-named frequency and means for counting the revolutions of said motor.

33. A dual Doppler installation for an aircraft comprising a single fixed antenna for producing a plurality of directed beams, two complete Doppler radar systems, selective means for energizing said antenna to transmit microwave energy from either one of said systems, and receiver means in each said system responsive to reflective energy resulting from transmission by either system.

34. A frequency lock detector for a spectrum center tracker generating a frequency equal to the frequency center of power of an input spectrum comprising means for applying a sub-carrier modulated by said spectrum to an input to said tracker, an adjustable oscillator of frequency near said sub-carrier, means for adjusting the frequency of said oscillator, a source of audio frequency, means for frequency modulating said adjustable oscillator at said audio frequency, means for slewing the frequency of said adjustable oscillator, means for synchronously demodulating said spectrum with said adjustable frequency, means for detecting said audio frequency in the demodulated output of said last named means, a phase detector coupled to said source of audio frequency and said detected audio frequency, and means responsive to said detected audio frequency of fixed phase relative to said source for interrupting said slewing.

35. A Doppler radar system comprising means for radiating and receiving four directed beams of microwave energy located in both forward and rearward directions and positioned symmetrically on opposite sides of the center-line of an aircraft, means for obtaining Doppler frequencies from each of said beams, means for obtaining the sum of said center-frequencies for all of said beams representative of forward velocity, means for obtaining the difference between the sums of diagonally opposite beam center-frequencies representative of transverse velocity, means for obtaining the difference between the forward and rearward beam center-frequencies representative of vertical velocity, means for combining all of said center-frequencies to obtain a frequency which is substantially invariant when all of said center-frequencies are present and means responsive to said invariant frequency to indicate when substantial deviation occurs in said invariant frequency.

36. A Doppler radar system comprising means for locating four downwardly directed energy beams symmetrically fore and aft, and right and left of the axis of said aircraft, means for combining Doppler frequency data from all of said beams to obtain a frequency which is substantially invariant when all of said center frequencies are present and of correct value, and means responsive to said invariant frequency to indicate when substantial deviation occurs in said invariant frequency.

37. In a Doppler system means for generating a frequency which is substantially invariant when Doppler data from all of a plurality of antenna beams are being received, means responsive to deviation of said invariant frequency from a predetermined value, and alarm means for indicating the occurrence of said deviation.

38. A pair of antennas as defined in claim 4, means for mounting said antennas with the pencil beams therefrom both downwardly directed and with one of said antennas reversed with respect to the other in the horizontal plan view thereof, a microwave switch means for each of said antennas to couple microwave energy from the input thereof alternately between the inputs of said pair of power dividers on each antenna, and a third microwave switch means for coupling microwave energy from the input thereof alternately to the inputs of the microwave switch means for said antennas.

39. A shiftable beam antenna comprising a plurality of rectangular waveguides each having a longitudinal slot array in one broad wall, means supporting said waveguides in side-by-side positions with said arrays in a common plane, a first plurality of pairs of hybrid couplers each having two phase spaced outputs and two inputs, the relative phase between said outputs reversing for power applied alternately to said two inputs, a second plurality of pairs of hybrid couplers similar to said first plurality, the two phase spaced outputs of each hybrid of said second plurality supplying corresponding inputs on a pair of hybrids of said first plurality, a first power divider means for coupling microwave energy with predetermined power and phase distribution to a corresponding input on one of the hybrids in each pair of said second plurality, a second power divider means for coupling microwave energy with said predetermined power but reversed phase distribution to a corresponding input on the other of the hybrids in each pair of said second plurality, and microwave switch means for coupling microwave energy alternately to said first and second power divider means.

40. A duplicate set of the apparatus according to claim 39 and means for coupling microwave energy alternately to the microwave switch coupling means of each apparatus of said set.

41. In a Doppler system antenna means for directing a beam of microwave energy in any one of four discrete angular positions relative to a downward reference axis fixed relative to an aircraft, means for recovering Doppler data from energy returned from said beams, means for frequency modulating microwave energy transmitted on said beams, means for changing in random step-wise increments the modulation frequency of said energy transmitted to produce a plurality of intervals of distinct modulation frequency, and means for operating said antenna means to direct said beam to said four positions sequentially during each of said intervals.

42. In a Doppler system antenna means for sequentially directing a beam of microwave energy in any one of four discrete angular positions relative to a downward reference axis fixed relative to an aircraft said positions being front-right, back-right, back-left and front left, means for recovering Doppler data from energy returned from said beams, means for adding frequencies corresponding to said data from the front-left and back-left positions of said beam and subtracting therefrom frequencies corresponding to said data from the front-right and back-right positions of said beam to produce a resultant value, and means responsive to deviation of said resultant value from a predetermined value.

43. A Doppler navigation system for an aircraft comprising means for directing microwave energy toward the surface of the earth, means for deriving velocity data in the form of frequencies proportional to the velocity components of said aircraft from energy returned from said surface, means for generating a local frequency representative of ground speed by combining said frequencies proportional to velocity components in predetermined digital count relation to said local frequency, and selectively operable means for altering said digital count relation between said data and said local frequency to compensate for the influence of varying conditions of the surface of the earth on the data derived from said energy returned.

44. A shiftable beam antenna comprising a plurality of rectangular waveguides having longitudinal slot arrays in one broad wall, means supporting said waveguides in side-by-side positions with said arrays in a common plane, a plurality of pairs of hybrid couplers each having two phase spaced outputs and two inputs, the relative phase between said outputs reversing for power applied alternately to said two inputs, means for feeding corresponding inputs of said pairs with a phase spaced progression, means for alternatively feeding the other inputs of said pairs with an opposite phase spaced progression, and means coupling the outputs of said couplers to spaced ones of said waveguides with the outputs from said pairs interdigitated.

45. A fixed antenna array comprising a plurality of contiguous waveguides providing a lower planar surface with an array of radiating means distributed over said surface to form a pencil beam, a feed system including a pair of power dividers, means for alternately switching the input of said feed system to said dividers, a first set of hybrid couplers connected to the respective outputs of one of said dividers, a second set of hybrid couplers connected to the respective outputs of the other one of said dividers, and means coupling a pair of phase spaced outputs from each output of each said hybrid to a respective pair physically spaced ones of said waveguides, the pairs of outputs from each hybrid being interdigited to provide a uniform phase progression across successive waveguides in said array for feeding one of said pair of power dividers and an alternate progression for feeding the other said divider.

46. A shiftable beam antenna comprising a plurality of rectangular waveguides having longitudinal slot arrays in one broad wall, means supporting said waveguides in side-by-side positions with said arrays in a common plane, a plurality of hybrid couplers each having two phase spaced outputs and two inputs, the relative phase between said outputs reversing for power applied alternately to said two inputs, means for feeding corresponding inputs of said couplers with a phase spaced progression, means for alternatively feeding the other inputs of said couplers with an opposite phase spaced progression, and means coupling the outputs of said couplers to spaced ones of said waveguides with the outputs from said pairs interdigitated.

47. A shiftable beam antenna comprising a linear array of radiating elements, a plurality of hybrid couplers each having two phase spaced outputs and two inputs, the relative phase between said outputs reversing for signals coupled alternately to said two inputs, means for feeding corresponding inputs of said couplers with a phase spaced progression, means for alternatively feeding the other inputs of said couplers with a different phase spaced progression, and means coupling the outputs of said couplers to spaced ones of said elements with the outputs of said couplers interdigitated.

48. Apparatus according to claim 47 in which each of said radiating elements is itself a linear array of radiators extending normal to the direction of alignment of said radiating elements, said linear array of elements and linear arrays of radiators thereby providing a surface array of said radiators for producing a pencil beam characteristic for said antenna.

49. Apparatus according to claim 47 and including a second plurality of hybrid couplers equal in number and similar to the first named plurality of hybrid couplers, means coupling in predetermined distribution the outputs of said second plurality of couplers to the inputs of said first named plurality of couplers, said coupling means including fixed relative phase shifting means for one of the outputs of each of said second plurality of couplers.

50. Apparatus according to claim 49 in which all of said hybrid couplers are short slot hybrid couplers having 90° relative phase shift between the two outputs thereof.

51. Apparatus according to claim 50 in which said phase shifting means for said one output of said couplers introduces 45° of phase shift relative to the other output of said couplers.

52. Apparatus according to claim 49 and including means for coupling a first phase spaced progression of microwave signals to the group of inputs consisting of one of the inputs of each of said second plurality of couplers, means for coupling a second phase spaced progression different than said first progression to the group of inputs consisting of the other one of the inputs of each of said second plurality of couplers, and means selectively operable for energizing one or the other said group of the inputs of said second plurality of couplers with said first or second phase spaced progression respectively.

53. Apparatus according to claim 49 and including means for selectively coupling microwave signal means to different inputs of said second plurality of couplers.

54. A shiftable beam antenna comprising a linear array of radiating elements, a matrix of hybrid couplers interconnected to provide a plurality of phase spaced outputs equal in number to the number of said elements and a plurality of inputs, the phase progression at said outputs being different for energy coupled to different ones of said inputs, microwave signal means, and means for coupling said signal means selectively to different ones of said inputs to obtain a different orientation of said beam.

55. An antenna feed matrix comprising a plurality of hybrid couplers each having a plurality of inputs and a like number of outputs, the energy at said outputs being phase displaced with the phase displacement different for microwave signals coupled to different ones of said inputs, means for coupling the outputs of a first plurality of said hybrids to supply an array of radiating elements with the outputs from each hybrid coupled to spaced elements of said array, and means including phase shift means for coupling the outputs of a second plurality of said hybrids to supply microwave energy of a first phase progression to the inputs of said first plurality of hybrids upon energization of one of the inputs of said second plurality of hybrids and to supply a second phase progression upon energization of a different one of the inputs of said second plurality of hybrids.

56. A shiftable beam antenna comprising a linear array of radiating elements, a plurality of hybrid couplers each coupler having two phase spaced outputs and two inputs, the relative phase between said outputs reversing for signals coupled alternately to said two inputs, means coupling the outputs of a first group of said couplers to spaced elements of said array with the two outputs of each coupler in said group interdigitated with the other outputs of said group, means coupling the outputs of a second group of said couplers to the inputs of said first group, and means for selectively coupling microwave signal means to different inputs of said second group, the coupling between said first and second groups including relative phase shift means for the two outputs of each hybrid coupler of said second group.

57. A fixed antenna having two input connections comprising a plurality of contiguous rectangular waveguides providing a lower planar surface with an array of radiating means distributed over said surface to form a pencil beam, a first feed system coupled to alternate ones of said waveguides and a second feed system coupled to the remaining ones of said waveguides, said first and second feed systems including rectangular waveguide sections and short slot couplers mounted in two layers above said contiguous waveguides to form an assembly with an overall height approximately three times the height of one of said waveguides, said feed systems each being coupled to said two input connections and providing opposite phase progressions across said contiguous waveguides for microwave signals coupled to one or the other of said input connections.

58. Apparatus according to claim 57 and including switch means mounted on said assembly and connected to switch microwave signals alternately between said two input connections.

59. A pair of antennas as defined in claim 58 and including a third switch means connected to switch microwave signals alternately between said switch means mounted on said assemblies.

60. A tracker according to claim 14 in which the circuit for coupling signals to said mixers with 90° relative phase shift provides 45° lagging phase shift to signals applied to one of said mixers and 45° leading phase shift to signals applied to the other mixer.

61. Apparatus according to claim 60 in which said means for coupling the outputs of said mixers to said balanced demodulator provides said additional 90° relative phase shift independent of signal frequency and each coupling circuit has the same baseband response characteristic with a uniform high frequency cut off to define a discrimination S-response curve centered at said generated frequency.

62. A spectrum modulated carrier center tracker comprising a spectrum modulator carrier input circuit, first and second balanced mixers, a tracker frequency input circuit, means for coupling signals from both of said input circuits to each of said mixers with opposite sense 45° relative phase shift introduced between the signals applied to each of said mixers, a balanced demodulator, separate baseband coupling channels connecting the outputs of said mixers to the inputs of said demodulator, said coupling channels providing 90° relative phase shift independent of frequency to baseband signals from said mixers and a uniform high frequency cut off to define a discriminator S-response curve centered with respect to the frequency applied to said tracker frequency input circuit, means for deriving an error signal from said balanced demodulator representative of the difference between said tracker frequency and the center of the spectrum applied to said spectrum modulated carrier input circuit, a tunable oscillator, means responsive to said error signal for tuning said oscillator to reduce said error signal to zero and means coupling the frequency generated by said oscillator to said tracker frequency input circuit.

63. Apparatus according to claim 62 and including means for applying a slewing audio frequency to the inputs of said balanced demodulator to develop a slewing signal output therefrom for varying the frequency of said oscillator.

64. Apparatus according to claim 63 and including means for frequency modulating said oscillator with a second audio frequency, means for selectively detecting said second audio frequency in the output of said balanced demodulator when said oscillator frequency is adjusted to the center of said spectrum, and means responsive to detection of said second audio frequency for interrupting the application of said slewing audio frequency.

65. Apparatus according to claim 64 in which said means for selectively detecting said second audio frequency includes a frequency selective coupling circuit and a coherent phase detector responsive to both the frequency modulation signal and the detected signal of said second audio frequency.

66. A frequency lock detector circuit for a tracking oscillator comprising an adjustable frequency oscillator means for slewing said oscillator, an audio frequency source, means for frequency modulating said oscillator at said audio frequency, means for detecting said audio frequency when said tracking oscillator has been slewed to the frequency of an incoming signal, a phase detector coupled to said audio frequency source and said detected audio frequency for detecting only fixed relative phase signals applied thereto, and means responsive to the detection of said fixed phase signals for interrupting said slewing.

67. A frequency combiner comprising a first diode ring having tuned input circuits connected across the respective diagonals of the ring, a parallel tuned output circuit tuned to the sum of the frequencies of said tuned input circuits and connected across one of the diagonals of the ring, said output circuit having a tapped inductor and a tapped capacitor, means for coupling to said input circuits signals of the frequency to which said input circuits are tuned, a direct connection to the capacitor tap of said tuned output circuit for deriving a high frequency output signal equal to the sum of said input frequencies, and a direct connection to the tap of said inductor for deriving a low frequency output signal equal to the difference of said input frequencies.

68. Apparatus according to claim 67 in which the low frequency output signal connection to the top of said inductor has a D.C. reference to the mid-points of the inductors of both said tuned input circuits.

69. In a symmetrical four quadrant beam Doppler system having front-left, front-right, back-right and back-left beams for deriving corresponding Doppler data frequencies appearing as a single sideband component of a common sub-carrier frequency, the combination comprising a first ring circuit for mixing said front-right and back-left data frequencies to produce first sum and difference frequencies, a second ring circuit for mixing said front-left and back-right data frequencies to produce second sum and difference frequencies, a third ring circuit for mixing said first and second sum frequencies to produce third sum and difference frequencies, means for coupling said third difference frequency from said third ring, means for mixing said third sum frequency with the fourth harmonic of said sub-carrier frequency, and means for selecting the difference frequency output of the last named mixing means.

70. Apparatus according to claim 69 in which said means for coupling said third difference frequency from said third ring includes a degenerative feed-back circuit for reducing the components above approximately ten cycles per second included with said third difference frequency.

71. In a Doppler system an antenna fixed relative to the vehicle in which the system is installed, means including said antenna for directing a plurality of beams symmetrically relative to the vertical axis of said vehicle, means for deriving signals from each of said beams which vary in accordance with the Doppler frequency shift of the respective beams, means for combining all of said signals to obtain an algebraic sum which is equal to zero when all of said signals are present and of correct value for the current velocity of said vehicle.

72. Apparatus according to claim 71 and including indicator means responsive to deviation of said sum from zero by a predetermined amount.

73. In a Doppler system means for generating a signal which is substantially zero only when Doppler data from all of a plurality of antenna beams are being received and of correct value, and means responsive to deviation of said signal from zero by a predetermined amount.

74. Apparatus according to claim 73 in which said signal is a frequency generated by algebraic combination of frequencies corresponding to the Doppler frequency shift signals received on each of said beams.

75. A four quadrant multiplier comprising first, second and third saturable cores, a first winding encircling all of said cores second and third windings on said second and third cores respectively, means for producing a direct bias flux in all of said cores, a winding for coupling unbalance fluxes in any of said cores to the remainder of said cores, means for coupling a biphase signal to said second and third windings connected in series, means for coupling a bipolar current to said first winding, an output winding on said first core, and means for coupling a four-quadrant product signal from said output winding on said first core.

76. A four quadrant multiplier comprising first, second and third saturable cores, a first winding encircling all of said cores and second and third windings on said second and third cores respectively, means for producing a direct bias flux in all of said cores, a winding for coupling unbalance fluxes in any of said cores to the remainder of said cores, means for coupling a biphase signal to said second and third windings connected in series, means for coupling a bipolar current to said first winding, an output winding on said first core, a phase detector, means for coupling said output winding and a reference phase derived from said biphase signal as inputs to said phase detector, and means responsive to a four-quadrant product signal coupled to the output of said phase detector.

77. A four quadrant multiplier comprising first, second and third saturable cores, a first winding encircling all of said cores second and third windings on said second and third cores respectively, means for producing a direct bias flux in all of said cores, a winding for coupling unbalance fluxes in any of said cores to the remainder of said cores, a source of A.C. signals having magnitude proportional to a first factor and phase sense in accordance with the sign of said first factor, a source of unidirectional signals having magnitude proportional to a second factor and polarity in accordance with the sign of said second factor, means for coupling said A.C. signals to said second and third windings, means for coupling said unidirectional signals to said first winding, a phase detector, means for energizing said phase detector with a reference phase corresponding to the phase of said A.C. signals, an output winding on said first core, means for coupling said output winding to be detected by said phase detector, and means responsive to the output of said phase detector.

78. A four quadrant multiplier comprising a plurality of saturable cores, means for coupling an A.C. signal to produce a flux component in said cores of magnitude proportional to a first factor and phase in accordance with the phase sense of said A.C. signal, means for coupling a unidirectional pulsating signal to produce a flux component in said cores of magnitude proportional to a second factor and direction in accordance with the direction of said unidirectional signal, means for intercoupling said cores to produce a resultant flux proportional in magnitude to the product of said factors, said resultant flux having a first phase for one phase of said A.C. signal and one polarity of said pulsating signal and the same one phase for reversal of both the phase and polarity of said signals and a phase opposite to said first phase for all other phase-polarity conditions of said signals, an output winding coupled to said resultant flux, and means for phase demodulating the signal from said output winding relative to the phase of said A.C. signal.

79. Apparatus according to claim 78 in which said A.C. signal varies as to the sine of the angle of roll and said pulsating signal varies as the sine of the angle of pitch relative to a horizontal reference plane.

80. A precision oscillator circuit comprising a tunable oscillator tunable over a substantial frequency range, a source of error signal representative of the difference between the frequency of said oscillator and a data signal, a position servomechanism responsive to said error signal for positioning a movable element, means for deriving a tuning signal for said oscillator in accordance with the position of said movable element, a reference oscillator having a frequency-temperature characteristic substantially identical with that of said tunable oscillator, both of said oscillators having the same environment, means for deriving from said reference oscillator a control signal representative of environmental changes which affect the frequency of said oscillator, means responsive to said control signal to eliminate frequency changes induced in said tunable oscillator due to environmental variations without altering the position of said movable element, and means for applying the frequency of said tunable oscillator to reduce said error signal.

81. Apparatus according to claim 80 in which said means for deriving a control signal comprises a stable oscillator, a phase discriminator coupled to said stable oscillator and said reference oscillator for producing an output in accordance with the phase difference therebetween, and means for integrating the output of said phase discriminator to produce said control signal.

82. In a Doppler navigation system means for generating a ground speed frequency comprising a ground speed oscillator tunable over a substantial frequency range, means for comparing the frequency of said oscillator with Doppler data representing ground speed and producing an error signal in accordance with the difference therebetween, a servomechanism responsive to said error signal for positioning a movable element, means for tuning said oscillator in accordance with the position of said tunable element, a reference oscillator substantially identical with said ground speed oscillator and subject to the same environmental conditions, means for deriving a control signal from said reference oscillator representative of environment induced frequency variational effects in said reference oscillator, and means responsive to said control signal to eliminate the effect of environment changes on the frequency of said ground speed oscillator without altering the position of said movable element.

83. In a Doppler navigation system means for generating a ground speed frequency comprising a ground speed oscillator tunable over a substantial frequency range, means for comparing the frequency of said oscillator with Doppler data representing ground speed and producing an error signal in accordance with the difference therebetween, a servomechanism responsive to said error signal for positioning a movable element, means for tuning said oscillator in accordance with the position of said tunable element, a reference oscillator substantially identical with said ground speed oscillator and subject to the same environmental conditions, a stable oscillator, a phase detector coupled to compare the phase of said reference and stable oscillators and produce a signal representing the phase difference therebetween, means for deriving a frequency control signal from the signal output of said phase detector and applying said frequency control signal to both said reference control oscillator and said ground speed oscillator to eliminate frequency variations due to environmental variations irrespective of the tuned frequency of said ground speed oscillator.

84. In a Doppler navigation system means for generating a ground speed frequency comprising a ground speed oscillator electrically tunable over a substantial frequency range, means for comparing the frequency of said oscillator with Doppler data representing ground speed and producing an error signal in accordance with the difference therebetween, a potentiometer, a servomechanism responsive to said error signal for positioning a movable contact on said potentiometer, means for coupling said movable contact to supply an adjustable voltage for tuning said ground speed oscillator, a reference oscillator substantially identical with said ground speed oscillator and subject to the same environmental conditions, a stable oscillator, a phase detector coupled to compare the phase of said reference and stable oscillators and produce a signal representing the phase difference therebetween, means for integrating the signal output of said phase detector to produce a control voltage, and means connecting said control voltage to one end of said potentiometer and to the tuning control input of said reference oscillator for compensating the voltage at said movable contact for temperature variations irrespective of the position of said contact on said potentiometer.

85. Apparatus according to claim 84 in which said means for coupling said movable contact to supply an adjustable voltage for tuning said ground speed oscillator includes a servo loop current generator for eliminating loading effects on said potentiometer.

86. Apparatus according to claim 84 and including means for maintaining the position of said movable contact fixed for the duration of predetermined signal conditions applied to said servomechanism.

87. Apparatus according to claim 14 in which said integrator comprises a pair of complementary polarity transistors having joined emitters with the collector-emitters paths serially connected between opposite polarity voltage sources, a connection joining the bases of said transistors, connections including an integration resistor for connecting the output of said demodulator between said joined bases and joined emitters, an integration capacitor connected to ground from the junction of said resistor and the transistor terminals to which said resistor is connected, and direct connections from across said capacitor providing the output of said integrator.

88. A Doppler navigation system comprising means for sequentially transmitting FM/CW signals in an X-beam configuration from an antenna fixed relative to the vehicle carrying said system, means for deriving Doppler frequency shift data from reflections of said signals returned on the beams of said antenna, frequency tracker means for producing continuous frequencies corresponding respectively to said Doppler frequency shift data for each of said beams, means for combining said continuous frequencies to obtain an alarm frequency equal to the difference between the sum of said continuous frequencies for both left beams and the sum of said continuous frequencies for both right beams, means responsive to said alarm frequency being different from zero by predetermined amount, and operational digital computer means responsive to said continuous frequencies for computing navigation quantities representing the motion of said vehicle.

89. A Doppler navigation system comprising FM/CW signal means, a shiftable-beam antenna having a linear array of radiating elements fixed relative to the vehicle carrying said system, a matrix of hybrid couplers interconnected to provide a plurality of phase spaced outputs equal in number to the number of said elements and a plurality of inputs, the phase progression at said outputs being different for energy coupled to different ones of said inputs, means for coupling said signal means selectively to different ones of said inputs to obtain sequential beams in an X-beam configuration for said antenna, means for deriving Doppler frequency shift data from reflections of signals on each of said beams, frequency tracker means for producing continuous frequencies corresponding respectively to said Doppler frequency shift data for each of said beams, and operational digital computer means responsive to said continuous frequencies for computing navigation quantities representing the motion of said vehicle.

90. A Doppler navigation system comprising means for sequentially transmitting FM/CW signals in an X-beam configuration from an antenna fixed relative to the vehicle carrying said sytem, means for deriving Doppler frequency shift data from reflections of said signals returned on the beams of said antenna, frequency tracker means for producing continuous frequencies corresponding respectively to said Doppler frequency shift data for each of said beams, means for combining said continuous frequencies to obtain a velocity component frequency proportional to the heading component of velocity of said vehicle, means for adding such continuous frequencies for a diagonal pair of said beams to obtain a diagonal sum frequency, a counter programmed to count said diagonal sum frequency during the interval required for a predetermined count of one-half said velocity component frequency, said counter having a capacity equal to said predetermined count, analogue read-out means for producing an analogue quantity corresponding selectively to the count or the complement of the count in said counter at the end of said interval, means responsive to the absence of an overflow count from said counter for selecting the analogue of said complement and responsive to an overflow count from said counter for selecting the analogue of said count, and means responsive to the selected analogue quantity for indicating the magnitude and sense of the drift angle.

91. In a Doppler navigation system means for obtaining continuous frequencies corresponding to the Doppler frequency shift data on a pair of diagonally positioned beams, means for obtaining a velocity component frequency proportional to the heading component of velocity of said vehicle, means for adding said continuous frequencies to obtain a diagonal sum frequency, a predetermined capacity counter programmed to count said diagonal sum frequency during the interval required for a predetermined count of a frequency proportional to said heading frequency, the relation between said diagonal sum frequency and said frequency proportional to said heading frequency being such that said counter is filled within one count of overflow when the drift angle is zero, analogue read-out means for producing an analogue quantity corresponding selectively to the count or the complement of the count in said counter at the end of said interval, means responsive to the absence of an overflow count from said counter for selecting the analogue of said complement and responsive to an overflow count from said counter for selecting the analogue of said count, and means responsive to the selected analogue quantity for indicating the magnitude and sense of the drift angle.

References Cited by the Examiner

UNITED STATES PATENTS

| | | | |
|---|---|---|---|
| 1,948,209 | 2/34 | Fichandler | 323—89.1 |
| 2,744,683 | 5/56 | Gray | 343—7 |
| 2,911,641 | 11/59 | Kohler | 343—8 |
| 2,923,000 | 1/60 | Wolinsky | 343—8 |
| 2,947,983 | 8/60 | Whitfield | 343—8 |
| 2,949,603 | 8/60 | Logue | 343—8 |
| 2,981,944 | 4/61 | Washburne | 343—9 |
| 2,982,956 | 5/61 | Meyer | 343—8 |
| 3,011,110 | 11/61 | Yu-Chi Ho et al. | 318—28 |
| 3,023,407 | 2/62 | Basim | 343—8 |

OTHER REFERENCES

The Radio Amateur's Handbook, 1956 edition, page 294. Published by the American Radio Relay League, West Hartford, Conn.

CHESTER L. JUSTUS, *Primary Examiner.*